(12) United States Patent
Toyama et al.

(10) Patent No.: US 7,016,502 B2
(45) Date of Patent: Mar. 21, 2006

(54) ENCODER AND DECODER

(75) Inventors: Keisuke Toyama, Tokyo (JP); Shiro Suzuki, Kanagawa (JP); Minoru Tsuji, Chiba (JP)

(73) Assignee: Sony Corporation, Tokyo (JP)

( * ) Notice: Subject to any disclaimer, the term of this patent is extended or adjusted under 35 U.S.C. 154(b) by 260 days.

(21) Appl. No.: 10/204,298

(22) PCT Filed: Dec. 21, 2001

(86) PCT No.: PCT/JP01/11254

§ 371 (c)(1),
(2), (4) Date: Oct. 25, 2002

(87) PCT Pub. No.: WO02/052732

PCT Pub. Date: Jul. 4, 2002

(65) Prior Publication Data

US 2003/0112979 A1 Jun. 19, 2003

(51) Int. Cl.
*H04R 5/00* (2006.01)

(52) U.S. Cl. .......................... 381/23; 341/50; 704/500
(58) Field of Classification Search .................. 381/22, 381/23; 341/160, 50, 51, 139; 704/225, 704/501, 502, 503, 504, 500
See application file for complete search history.

(56) References Cited

U.S. PATENT DOCUMENTS

| 5,731,767 A | * | 3/1998 | Tsutsui et al. ................ 341/50 |
| 5,901,234 A | * | 5/1999 | Sonohara et al. ........... 381/104 |
| 5,974,379 A | * | 10/1999 | Hatanaka et al. ........... 704/500 |

FOREIGN PATENT DOCUMENTS

| JP | 4-504192 | 7/1992 |
| JP | 8-54899 | 2/1996 |
| JP | 8-181617 | 7/1996 |
| WO | WO 90/09022 | 8/1990 |

* cited by examiner

*Primary Examiner*—Vivian Chin
*Assistant Examiner*—Justin Michalski
(74) *Attorney, Agent, or Firm*—Sonnenschein, Nath & Rosenthal LLP

(57) ABSTRACT

The present invention relates to an encoding device for saving the number of bits of codes. In step S11, the differential value between a normalization coefficient $B_i$ to be encoded and a normalization coefficient $B_{i-1}$ for an encoding unit $A_{i-1}$ in a band adjacent to the lower side of an encoding unit $A_i$ corresponding to the normalization coefficient $B_i$ is computed. In step S12, reference is made to a table in which a differential value having a high frequency of occurrence is associated with a code having a small number of bits, and a code corresponding to the computed differential value is read. In step S13, it is determined whether or not all normalization coefficients B have been encoded. If it is determined that all normalization coefficients B have been encoded, in step S14, the code read in step S12 is output. The present invention is applicable to an audio recorder.

38 Claims, 49 Drawing Sheets

FIG. 5

| INDEX | $B_0$ | $B_1$ | $B_2$ | $B_3$ | $B_4$ | $B_5$ | $B_6$ | $B_7$ | $B_8$ | $B_9$ | $B_{10}$ | $B_{11}$ | $B_{12}$ | $B_{13}$ | $B_{14}$ | $B_{15}$ | $B_{16}$ | $B_{17}$ | $B_{18}$ | $B_{19}$ | $B_{20}$ | $B_{21}$ | $B_{22}$ | $B_{23}$ | $B_{24}$ | $B_{25}$ | $B_{26}$ |
|---|---|---|---|---|---|---|---|---|---|---|---|---|---|---|---|---|---|---|---|---|---|---|---|---|---|---|---|
| | 54 | 53 | 46 | 42 | 40 | 40 | 39 | 42 | 43 | 45 | 45 | 46 | 44 | 46 | 46 | 49 | 48 | 47 | 44 | 42 | 44 | 40 | 41 | 38 | 40 | 37 |

FIG. 9

| | $B_0$ | $B_1$ | $B_2$ | $B_3$ | $B_4$ | $B_5$ | $B_6$ | $B_7$ | $B_8$ | $B_9$ | $B_{10}$ | $B_{11}$ | $B_{12}$ | $B_{13}$ | $B_{14}$ | $B_{15}$ | $B_{16}$ | $B_{17}$ | $B_{18}$ | $B_{19}$ | $B_{20}$ | $B_{21}$ | $B_{22}$ | $B_{23}$ | $B_{24}$ | $B_{25}$ | $B_{26}$ | |
|---|---|---|---|---|---|---|---|---|---|---|---|---|---|---|---|---|---|---|---|---|---|---|---|---|---|---|---|---|
| INDEX | 54 | 53 | 46 | 42 | 40 | 40 | 39 | 42 | 43 | 45 | 45 | 46 | 44 | 46 | 46 | 49 | 48 | 47 | 44 | 44 | 42 | 40 | 41 | 38 | 40 | 37 | | |
| DIFFERENTIAL VALUE | | −1 | −7 | −4 | −2 | 0 | −1 | 3 | 1 | 2 | 0 | 1 | −2 | 2 | 0 | 3 | −1 | −1 | −3 | 0 | −2 | −2 | 1 | −3 | 2 | −3 | 3 | |
| TABLE $B_B$ | 6 | 3 | 9 | 4 | 3 | 2 | 3 | 9 | 3 | 4 | 2 | 3 | 4 | 2 | 2 | 9 | 3 | 3 | 3 | 3 | 3 | 3 | 3 | 3 | 3 | 3 | 3 | → 100 BITS |
| TABLE $C_B$ | 6 | 3 | 9 | 9 | 3 | 2 | 3 | 4 | 3 | 3 | 2 | 3 | 3 | 3 | 2 | 4 | 3 | 3 | 4 | 3 | 3 | 3 | 3 | 3 | 4 | 3 | 4 | → 96 BITS |
| TABLE $D_B$ | 6 | 3 | 8 | 6 | 3 | 2 | 3 | 4 | 3 | 3 | 2 | 3 | 3 | 3 | 2 | 4 | 3 | 3 | 4 | 2 | 3 | 3 | 3 | 3 | 4 | 3 | 4 | → 92 BITS |
| TABLE $E_B$ | 6 | 3 | 10 | 7 | 3 | 2 | 3 | 4 | 3 | 3 | 2 | 3 | 3 | 3 | 2 | 4 | 3 | 3 | 4 | 2 | 3 | 3 | 3 | 3 | 4 | 3 | 4 | → 95 BITS |

FIG. 10

| DIFFERENTIAL VALUE | CODE | NUMBER OF BITS |
|---|---|---|
| ⋮ | ⋮ | ⋮ |
| −4 | 1111 | 4 |
| −3 | 111 | 3 |
| −2 | 011 | 3 |
| −1 | 010 | 3 |
| 0 | 00 | 2 |
| 1 | 101 | 3 |
| 2 | 1110 | 4 |
| ⋮ | ⋮ | ⋮ |

FIG. 11

| DIFFERENTIAL VALUE WITH HIGH PROBABILITY OF APPEARANCE | CODE | NUMBER OF BITS |
|---|---|---|
| −4 | 1111 | 4 |
| −3 | 110 | 3 |
| −2 | 011 | 3 |
| −1 | 010 | 3 |
| 0 | 00 | 2 |
| 1 | 101 | 3 |
| 2 | 1110 | 4 |
| OTHER | 100 + ORIGINAL (6 BITS) | 9 |

FIG. 12

| $b_0$ | $b_1$ | $b_2$ | $b_3$ $b_4$ $b_5$ $b_6$ $b_7$ $b_8$ |
|---|---|---|---|
| 1 | 0 | 0 | NORMALIZATION COEFFICIENTS B |

FIG. 13

| DIFFERENTIAL VALUE WITH HIGH PROBABILITY OF APPEARANCE | CODE | NUMBER OF BITS |
|---|---|---|
| -3 | 1011 | 4 |
| -2 | 111 | 3 |
| -1 | 011 | 3 |
| 0 | 00 | 2 |
| 1 | 010 | 3 |
| 2 | 110 | 3 |
| 3 | 1010 | 4 |
| OTHER | 100 + ORIGINAL (6 BITS) | 9 |

FIG. 14

| DIFFERENTIAL VALUE | CODE | NUMBER OF BITS |
|---|---|---|
| . . . | . . . | . . . |
| −15 TO −12 | 1001 + 100 + 100 [DIFFERENTIAL VALUE + 12] (2 TO 4 BITS) | 12 TO 14 |
| −12 TO −8 | 1001 + 100 + [DIFFERENTIAL VALUE + 8] (2 TO 4 BITS) | 9 TO 11 |
| −7 TO −4 | 1001 + [DIFFERENTIAL VALUE + 4] (2 TO 4 BITS) | 6 TO 8 |
| −3 | 1011 | 4 |
| −2 | 111 | 3 |
| −1 | 011 | 3 |
| 0 | 00 | 2 |
| 1 | 010 | 3 |
| 2 | 110 | 3 |
| 3 | 1010 | 4 |
| 4 TO 7 | 1000 + [DIFFERENTIAL VALUE − 4] (2 TO 4 BITS) | 6 TO 8 |
| 8 TO 11 | 1000 + 100 + [DIFFERENTIAL VALUE − 8] (2 TO 4 BITS) | 9 TO 11 |
| 12 TO 15 | 1000 + 100 + 100 + [DIFFERENTIAL VALUE 12] (2 TO 4 BITS) | 12 TO 14 |
| . . . | . . . | . . . |

FIG. 16

| DIFFERENTIAL VALUE | CODE | NUMBER OF BITS |
|---|---|---|
| ≥ -7 | 1001 + ORIGINAL (6 BITS) | 10 |
| -6 TO -4 | 1000 + [DIFFERENTIAL VALUE + 3] (3 TO 4 BITS) | 7 TO 8 |
| -3 | 1011 | 4 |
| -2 | 111 | 3 |
| -1 | 011 | 3 |
| 0 | 00 | 2 |
| 1 | 010 | 3 |
| 2 | 110 | 3 |
| 3 | 1010 | 4 |
| 4 TO 6 | 1000 + [DIFFERENTIAL VALUE - 4] (2 TO 3 BITS) | 6 TO 7 |
| 7 ≤ | 1001 + ORIGINAL (6 BITS) | 10 |

FIG. 19

| | $B_0$ | $B_1$ | $B_2$ | $B_3$ | $B_4$ | $B_5$ | $B_6$ | $B_7$ | $B_8$ | $B_9$ | $B_{10}$ | $B_{11}$ | $B_{12}$ | $B_{13}$ | $B_{14}$ | $B_{15}$ | $B_{16}$ | $B_{17}$ | $B_{18}$ | $B_{19}$ | $B_{20}$ | $B_{21}$ | $B_{22}$ | $B_{23}$ | $B_{24}$ | $B_{25}$ | $B_{26}$ | |
|---|---|---|---|---|---|---|---|---|---|---|---|---|---|---|---|---|---|---|---|---|---|---|---|---|---|---|---|---|
| INDEX | 54 | 53 | 46 | 42 | 40 | 40 | 39 | 42 | 43 | 45 | 45 | 46 | 46 | 46 | 48 | 49 | 48 | 47 | 44 | 44 | 42 | 40 | 41 | 38 | 40 | 37 | | |
| WEIGHT VALUE | 0 | 0 | 0 | 1 | 1 | 1 | 2 | 2 | 2 | 3 | 3 | 3 | 4 | 4 | 5 | 5 | 5 | 6 | 6 | 6 | 7 | 7 | 7 | 8 | 8 | 8 | 8 | |
| WEIGHTED NORMALIZATION COEFFICIENT BW | 54 | 53 | 46 | 43 | 41 | 41 | 41 | 44 | 45 | 48 | 48 | 49 | 48 | 50 | 50 | 51 | 45 | 53 | 53 | 50 | 50 | 49 | 47 | 48 | 46 | 48 | 45 | |
| DIFFERENTIAL VALUE | | -1 | -7 | -3 | -2 | 0 | -1 | 3 | 1 | 3 | 0 | 1 | -1 | 2 | 0 | 1 | 3 | -1 | 0 | -3 | 0 | -1 | -2 | 1 | -2 | 2 | -3 | |
| TABLE $B_B$ | | 6 | 3 | 3 | 3 | 2 | 2 | 9 | 3 | 9 | 2 | 3 | 3 | 4 | 2 | 3 | 3 | 2 | 3 | 3 | 3 | 3 | 3 | 3 | 3 | 3 | 3 | → 104 BITS |
| TABLE $C_B$ | | 6 | 3 | 9 | 4 | 3 | 2 | 4 | 3 | 4 | 3 | 3 | 2 | 3 | 2 | 3 | 2 | 2 | 4 | 2 | 3 | 3 | 3 | 3 | 3 | 3 | 3 | → 90 BITS |
| TABLE $D_B$ | | 6 | 3 | 3 | 4 | 3 | 2 | 4 | 3 | 4 | 2 | 3 | 2 | 3 | 2 | 3 | 2 | 2 | 4 | 2 | 3 | 3 | 3 | 3 | 3 | 3 | 3 | → 89 BITS |
| TABLE $E_B$ | | 6 | 3 | 10 | 4 | 3 | 2 | 4 | 3 | 4 | 2 | 3 | 2 | 3 | 2 | 3 | 2 | 2 | 4 | 2 | 3 | 3 | 3 | 3 | 3 | 3 | 4 | → 91 BITS |

FIG. 22

| | B₀ | B₁ | B₂ | B₃ | B₄ | B₅ | B₆ | B₇ | B₈ | B₉ | B₁₀ | B₁₁ | B₁₂ | B₁₃ | B₁₄ | B₁₅ | B₁₆ | B₁₇ | B₁₈ | B₁₉ | B₂₀ | B₂₁ | B₂₂ | B₂₃ | B₂₄ | B₂₅ | B₂₆ | |
|---|---|---|---|---|---|---|---|---|---|---|---|---|---|---|---|---|---|---|---|---|---|---|---|---|---|---|---|---|
| INDEX (ONE FRAME BEFORE) | 55 | 54 | 50 | 46 | 46 | 45 | 45 | 44 | 44 | 45 | 44 | 46 | 46 | 43 | 46 | 45 | 47 | 48 | 49 | 47 | 43 | 42 | 40 | 40 | 39 | 38 | 37 | |
| INDEX (CURRENT FRAME) | 54 | 53 | 46 | 42 | 40 | 40 | 39 | 42 | 43 | 45 | 45 | 46 | 46 | 44 | 46 | 49 | 47 | 48 | 47 | 44 | 44 | 42 | 40 | 41 | 38 | 40 | 37 | |
| DIFFERENTIAL VALUE | -1 | -1 | -4 | -4 | -6 | -6 | -6 | -3 | -1 | 0 | 1 | 0 | 0 | 1 | 0 | 1 | -1 | -1 | 0 | 1 | 1 | -1 | 2 | 0 | 0 | 1 | -1 | |
| TABLE B_B | 3 | 3 | 4 | 4 | 9 | 9 | 9 | 3 | 3 | 2 | 3 | 2 | 3 | 2 | 3 | 3 | 3 | 3 | 2 | 3 | 2 | 3 | 3 | 4 | 2 | 3 | 4 | 2 → 96 BITS |
| TABLE C_B | 3 | 3 | 9 | 9 | 9 | 9 | 9 | 4 | 3 | 2 | 3 | 2 | 3 | 3 | 3 | 3 | 3 | 3 | 2 | 3 | 2 | 3 | 3 | 3 | 2 | 3 | 3 | 2 → 105 BITS |
| TABLE D_B | 3 | 3 | 6 | 6 | 7 | 7 | 7 | 4 | 3 | 2 | 3 | 2 | 3 | 2 | 3 | 3 | 3 | 3 | 2 | 3 | 2 | 3 | 3 | 3 | 2 | 3 | 3 | 2 → 93 BITS |
| TABLE E_B | 3 | 3 | 7 | 7 | 8 | 8 | 8 | 4 | 3 | 2 | 3 | 2 | 3 | 2 | 3 | 3 | 3 | 3 | 2 | 3 | 2 | 3 | 3 | 3 | 2 | 3 | 3 | 2 → 98 BITS |

FIG. 25

| | $B_0$ | $B_1$ | $B_2$ | $B_3$ | $B_4$ | $B_5$ | $B_6$ | $B_7$ | $B_8$ | $B_9$ | $B_{10}$ | $B_{11}$ | $B_{12}$ | $B_{13}$ | $B_{14}$ | $B_{15}$ | $B_{16}$ | $B_{17}$ | $B_{18}$ | $B_{19}$ | $B_{20}$ | $B_{21}$ | $B_{22}$ | $B_{23}$ | $B_{24}$ | $B_{25}$ | $B_{26}$ | |
|---|---|---|---|---|---|---|---|---|---|---|---|---|---|---|---|---|---|---|---|---|---|---|---|---|---|---|---|---|
| INDEX ($B_{Li}$) | 55 | 54 | 48 | 47 | 44 | 42 | 44 | 40 | 44 | 44 | 45 | 46 | 45 | 46 | 46 | 47 | 48 | 50 | 47 | 46 | 43 | 42 | 40 | 40 | 40 | 39 | 37 | |
| INDEX ($B_{Ri}$) | 54 | 53 | 46 | 42 | 40 | 40 | 39 | 42 | 43 | 45 | 45 | 46 | 44 | 46 | 46 | 49 | 48 | 47 | 44 | 44 | 42 | 40 | 41 | 38 | 40 | 37 | | |
| DIFFERENTIAL VALUE | 1 | 1 | 2 | 5 | 4 | 2 | 5 | -2 | 1 | -1 | 0 | 0 | 1 | 0 | 0 | -1 | 0 | 2 | 2 | -1 | 0 | 0 | -1 | 2 | -1 | 0 | | |
| TABLE $B_B$ | 3 | 3 | 4 | 9 | 4 | 3 | 9 | 3 | 3 | 3 | 2 | 2 | 3 | 2 | 2 | 3 | 3 | 4 | 4 | 2 | 2 | 2 | 3 | 4 | 3 | 2 | | → 96 BITS |
| TABLE $C_B$ | 3 | 3 | 3 | 9 | 9 | 3 | 9 | 3 | 3 | 3 | 2 | 2 | 3 | 2 | 2 | 3 | 3 | 3 | 3 | 2 | 2 | 2 | 3 | 3 | 3 | 2 | | → 91 BITS |
| TABLE $D_B$ | 3 | 3 | 3 | 7 | 6 | 3 | 7 | 3 | 3 | 3 | 2 | 2 | 3 | 2 | 2 | 3 | 3 | 3 | 3 | 2 | 2 | 2 | 3 | 3 | 3 | 2 | | → 84 BITS |
| TABLE $E_B$ | 3 | 3 | 3 | 7 | 6 | 3 | 7 | 3 | 3 | 3 | 2 | 2 | 3 | 2 | 2 | 3 | 3 | 3 | 3 | 2 | 2 | 2 | 3 | 3 | 3 | 2 | | → 84 BITS |

FIG. 28

| | $B_0$ | $B_1$ | $B_2$ | $B_3$ | $B_4$ | $B_5$ | $B_6$ | $B_7$ | $B_8$ | $B_9$ | $B_{10}$ | $B_{11}$ | $B_{12}$ | $B_{13}$ | $B_{14}$ | $B_{15}$ | $B_{16}$ | $B_{17}$ | $B_{18}$ | $B_{19}$ | $B_{20}$ | $B_{21}$ | $B_{22}$ | $B_{23}$ | $B_{24}$ | $B_{25}$ | $B_{26}$ | |
|---|---|---|---|---|---|---|---|---|---|---|---|---|---|---|---|---|---|---|---|---|---|---|---|---|---|---|---|---|
| INDEX ($B_{Li}$) | 55 | 54 | 48 | 47 | 44 | 42 | 44 | 40 | 44 | 44 | 45 | 46 | 45 | 46 | 46 | 47 | 48 | 50 | 47 | 46 | 43 | 42 | 40 | 40 | 40 | 39 | 37 | |
| INDEX ($B_{Ri}$) | 54 | 53 | 46 | 42 | 40 | 40 | 39 | 42 | 43 | 45 | 45 | 46 | 44 | 46 | 46 | 49 | 48 | 47 | 44 | 44 | 44 | 42 | 40 | 41 | 38 | 40 | 37 | |
| DIFFERENTIAL VALUE LR | 1 | 1 | 2 | 5 | 4 | 2 | 5 | -2 | 1 | -1 | 0 | 0 | 1 | 0 | 0 | -1 | 0 | 2 | -1 | 2 | -1 | 0 | 0 | -1 | 2 | -1 | 0 | |
| DIFFERENTIAL VALUE F | 0 | 1 | 3 | -1 | -2 | 3 | -7 | 3 | -2 | 1 | 0 | 1 | -1 | 0 | 1 | -2 | 3 | -2 | 2 | -3 | -1 | 0 | -1 | 3 | -3 | 1 | | |
| TABLE $B_B$ | 3 | 2 | 3 | 9 | 3 | 3 | 9 | 9 | 3 | 3 | 3 | 3 | 2 | 3 | 3 | 3 | 9 | 3 | 4 | 3 | 3 | 3 | 2 | 3 | 9 | 3 | 3 | → 114 BITS |
| TABLE $C_B$ | 3 | 2 | 3 | 4 | 3 | 3 | 4 | 9 | 4 | 3 | 3 | 3 | 2 | 3 | 3 | 3 | 4 | 3 | 4 | 3 | 3 | 3 | 2 | 3 | 4 | 4 | 3 | → 90 BITS |
| TABLE $D_B$ | 3 | 2 | 3 | 4 | 3 | 3 | 4 | 8 | 4 | 3 | 3 | 3 | 2 | 3 | 3 | 3 | 4 | 3 | 4 | 3 | 3 | 3 | 2 | 3 | 4 | 4 | 3 | → 89 BITS |
| TABLE $E_B$ | 3 | 2 | 3 | 4 | 3 | 3 | 4 | 10 | 4 | 3 | 3 | 3 | 2 | 3 | 3 | 3 | 4 | 3 | 4 | 3 | 3 | 3 | 2 | 3 | 4 | 4 | 3 | → 91 BITS |

FIG. 31

| INDEX | $D_0$ | $D_1$ | $D_2$ | $D_3$ | $D_4$ | $D_5$ | $D_6$ | $D_7$ | $D_8$ | $D_9$ | $D_{10}$ | $D_{11}$ | $D_{12}$ | $D_{13}$ | $D_{14}$ | $D_{15}$ | $D_{16}$ | $D_{17}$ | $D_{18}$ | $D_{19}$ | $D_{20}$ | $D_{21}$ | $D_{22}$ | $D_{23}$ | $D_{24}$ | $D_{25}$ | $D_{26}$ |
|---|---|---|---|---|---|---|---|---|---|---|---|---|---|---|---|---|---|---|---|---|---|---|---|---|---|---|---|
| | 7 | 7 | 6 | 6 | 5 | 5 | 4 | 4 | 4 | 3 | 3 | 2 | 2 | 2 | 3 | 2 | 1 | 1 | 1 | 1 | 1 | 1 | 1 | 2 | 1 | 1 | 1 |

FIG. 34

| | $D_0$ | $D_1$ | $D_2$ | $D_3$ | $D_4$ | $D_5$ | $D_6$ | $D_7$ | $D_8$ | $D_9$ | $D_{10}$ | $D_{11}$ | $D_{12}$ | $D_{13}$ | $D_{14}$ | $D_{15}$ | $D_{16}$ | $D_{17}$ | $D_{18}$ | $D_{19}$ | $D_{20}$ | $D_{21}$ | $D_{22}$ | $D_{23}$ | $D_{24}$ | $D_{25}$ | $D_{26}$ | |
|---|---|---|---|---|---|---|---|---|---|---|---|---|---|---|---|---|---|---|---|---|---|---|---|---|---|---|---|---|
| INDEX | 7 | 7 | 6 | 6 | 6 | 5 | 5 | 4 | 4 | 4 | 3 | 3 | 2 | 2 | 2 | 3 | 2 | 1 | 1 | 1 | 1 | 1 | 1 | 2 | 1 | 1 | 1 | |
| DIFFERENTIAL VALUE | 0 | -1 | 0 | 0 | -1 | 0 | 0 | -1 | 0 | 0 | -1 | 0 | -1 | 0 | 1 | -1 | -1 | 0 | 0 | 0 | 0 | 0 | 0 | 1 | -1 | 1 | 1 | |
| TABLE $A_D$ | 3 | 1 | 3 | 1 | 3 | 1 | 3 | 1 | 3 | 1 | 3 | 1 | 3 | 1 | 3 | 3 | 3 | 1 | 1 | 1 | 1 | 1 | 1 | 3 | 1 | 1 | 1 | → 49 BITS |
| TABLE $B_D$ | 3 | 1 | 2 | 1 | 2 | 1 | 2 | 1 | 1 | 1 | 2 | 1 | 2 | 1 | 2 | 2 | 2 | 1 | 1 | 1 | 1 | 1 | 1 | 2 | 2 | 1 | 1 | → 39 BITS |
| TABLE $C_D$ | 3 | 1 | 3 | 1 | 3 | 1 | 3 | 1 | 3 | 1 | 3 | 1 | 3 | 1 | 3 | 3 | 3 | 1 | 1 | 1 | 1 | 1 | 1 | 3 | 3 | 1 | 1 | → 49 BITS |

FIG. 35

| DIFFERENTIAL VALUE | CODE | NUMBER OF BITS |
|---|---|---|
| −1 | 101 | 3 |
| 0 | 0 | 1 |
| 1 | 100 | 3 |
| OTHER | 11 + ORIGINAL (3 BITS) | 5 |

FIG. 36

| DIFFERENTIAL VALUE | CODE | NUMBER OF BITS |
|---|---|---|
| −1 | 11 | 2 |
| 0 | 0 | 1 |
| 1 | 10 | 2 |

FIG. 37

| DIFFERENTIAL VALUE | CODE | NUMBER OF BITS |
|---|---|---|
| −2 | 1101 | 4 |
| −1 | 101 | 3 |
| 0 | 0 | 1 |
| 1 | 100 | 3 |
| 2 | 1100 | 4 |
| OTHER | 11 + ORIGINAL (3 BITS) | 6 |

FIG. 38

| INDEX | $D_0$ | $D_1$ | $D_2$ | $D_3$ | $D_4$ | $D_5$ | $D_6$ | $D_7$ | $D_8$ | $D_9$ | $D_{10}$ | $D_{11}$ | $D_{12}$ | $D_{13}$ | $D_{14}$ | $D_{15}$ | $D_{16}$ | $D_{17}$ | $D_{18}$ | $D_{19}$ | $D_{20}$ | $D_{21}$ | $D_{22}$ | $D_{23}$ | $D_{24}$ | $D_{25}$ | $D_{26}$ |
|---|---|---|---|---|---|---|---|---|---|---|---|---|---|---|---|---|---|---|---|---|---|---|---|---|---|---|---|
| | 7 | 6 | 7 | 7 | 6 | 6 | 6 | 5 | 4 | 3 | 3 | 2 | 1 | 1 | 1 | 2 | 2 | 1 | 1 | 1 | 1 | 1 | 1 | 1 | 1 | 1 | 1 |
| DIFFERENTIAL VALUE | | -1 | 1 | 0 | -1 | -1 | -1 | 0 | -1 | -1 | 0 | -1 | 0 | 0 | 1 | 0 | 0 | -1 | 0 | 0 | 0 | 0 | 0 | 0 | 0 | 0 | 0 |
| TABLE $B_D$ (no cut) | | 3 | 2 | 2 | 1 | 2 | 1 | 2 | 2 | 2 | 1 | 2 | 1 | 2 | 2 | 1 | 2 | 2 | 1 | 1 | 1 | 1 | 1 | 1 | 1 | 1 | 1 |
| TABLE $B_D$ (cutting) | | 3 | 2 | 2 | 1 | 2 | 1 | 2 | 2 | 2 | 1 | 2 | 1 | 2 | 2 | 1 | 2 | 2 | 1 | 1 | 1 | 1 | 1 | 1 | 1 | 1 | 1 | no encoding → 39 BITS encqu = 16 (5bit)

→ 27 BITS + 5 BITS = 32 BITS

FIG. 39

| INDEX | $D_0$ | $D_1$ | $D_2$ | $D_3$ | $D_4$ | $D_5$ | $D_6$ | $D_7$ | $D_8$ | $D_9$ | $D_{10}$ | $D_{11}$ | $D_{12}$ | $D_{13}$ | $D_{14}$ | $D_{15}$ | $D_{16}$ | $D_{17}$ | $D_{18}$ | $D_{19}$ | $D_{20}$ | $D_{21}$ | $D_{22}$ | $D_{23}$ | $D_{24}$ | $D_{25}$ | $D_{26}$ | |
|---|---|---|---|---|---|---|---|---|---|---|---|---|---|---|---|---|---|---|---|---|---|---|---|---|---|---|---|---|
| | 7 | 6 | 7 | 7 | 6 | 6 | 5 | 4 | 3 | 3 | 2 | 1 | 1 | 1 | 2 | 2 | 2 | 1 | 1 | 0 | 0 | 0 | 0 | 0 | 0 | 0 | 0 | |
| DIFFERENTIAL VALUE | | -1 | 1 | 0 | -1 | 0 | -1 | -1 | -1 | 0 | -1 | -1 | 0 | 0 | 1 | 0 | 0 | -1 | 0 | -1 | 0 | 0 | 0 | 0 | 0 | 0 | 0 | |
| TABLE $B_D$ (no cut) | | 3 | 2 | 2 | 1 | 2 | 1 | 2 | 2 | 2 | 2 | 1 | 2 | 2 | 1 | 2 | 1 | 2 | 1 | 2 | 1 | 1 | 1 | 2 | 1 | 1 | 1 | → 40 BITS |
| TABLE $B_D$ (cutting) | | 3 | 2 | 2 | 1 | 2 | 1 | 2 | 2 | 2 | 2 | 1 | 2 | 2 | 1 | 2 | 1 | 2 | 1 | 2 | 1 | | | | | | | → 30 BITS + 5 BITS = 35 BITS | encqu = 18 (6bit) ← no encoding

FIG. 40

| INDEX | $D_0$ | $D_1$ | $D_2$ | $D_3$ | $D_4$ | $D_5$ | $D_6$ | $D_7$ | $D_8$ | $D_9$ | $D_{10}$ | $D_{11}$ | $D_{12}$ | $D_{13}$ | $D_{14}$ | $D_{15}$ | $D_{16}$ | $D_{17}$ | $D_{18}$ | $D_{19}$ | $D_{20}$ | $D_{21}$ | $D_{22}$ | $D_{23}$ | $D_{24}$ | $D_{25}$ | $D_{26}$ | |
|---|---|---|---|---|---|---|---|---|---|---|---|---|---|---|---|---|---|---|---|---|---|---|---|---|---|---|---|---|
| | 7 | 7 | 7 | 7 | 6 | 5 | 4 | 4 | 3 | 3 | 3 | 2 | 1 | 2 | 1 | 0 | 1 | 1 | 1 | 0 | 1 | 1 | 1 | 0 | 1 | 1 | 1 | |
| DIFFERENTIAL VALUE | 0 | 0 | 0 | -1 | -1 | -1 | 0 | -1 | 0 | 0 | -1 | -1 | 1 | -1 | -1 | 1 | 0 | 0 | -1 | 1 | 0 | 0 | -1 | 1 | 0 | 0 | | |
| TABLE $B_D$ (no cut) | 3 | 1 | 1 | 1 | 2 | 2 | 2 | 1 | 2 | 1 | 1 | 2 | 2 | 2 | 2 | 2 | 1 | 1 | 2 | 2 | 1 | 1 | 2 | 2 | 1 | 1 | 2 | → 43 BITS |
| TABLE $B_D$ (cutting) | 3 | 1 | 1 | 1 | 2 | 2 | 2 | 1 | 2 | 1 | 1 | 2 | 2 | 2 | 2 | 2 | 1 | 1 | 2 | 2 | 1 | 1 | 2 | 2 | | | | → 23 BITS + 5 BITS + 13 BITS = 41 BITS | encqu = 14 (5bit)  1bit encoding

FIG. 41

| INDEX | $D_0$ | $D_1$ | $D_2$ | $D_3$ | $D_4$ | $D_5$ | $D_6$ | $D_7$ | $D_8$ | $D_9$ | $D_{10}$ | $D_{11}$ | $D_{12}$ | $D_{13}$ | $D_{14}$ | $D_{15}$ | $D_{16}$ | $D_{17}$ | $D_{18}$ | $D_{19}$ | $D_{20}$ | $D_{21}$ | $D_{22}$ | $D_{23}$ | $D_{24}$ | $D_{25}$ | $D_{26}$ |
|---|---|---|---|---|---|---|---|---|---|---|---|---|---|---|---|---|---|---|---|---|---|---|---|---|---|---|---|
| | 7 | 7 | 7 | 7 | 6 | 5 | 4 | 4 | 3 | 3 | 3 | 2 | 0 | 2 | 1 | 3 | 1 | 2 | 0 | 0 | 1 | 1 | 2 | 0 | 1 | 1 | 1 |
| DIFFERENTIAL VALUE | 0 | 0 | 0 | -1 | -1 | -1 | 0 | -1 | 0 | 0 | -1 | -2 | 2 | -1 | 2 | -2 | 1 | -2 | 0 | 1 | 0 | 1 | -2 | 1 | 0 | 0 | |
| TABLE $A_D$ (no cut) | 3 | 1 | 1 | 1 | 3 | 3 | 1 | 3 | 1 | 1 | 3 | 4 | 4 | 3 | 4 | 4 | 3 | 4 | 1 | 3 | 1 | 3 | 4 | 3 | 1 | 1 | |
| TABLE $A_D$ (cutting) | 3 | 1 | 1 | 1 | 3 | 3 | 1 | 3 | 1 | 1 | 3 | 3 | 1 | 3 | 4 | 3 | 1 | | | | | | | | | | | encqu = 6 (5bit)

2bit encoding → 67 BITS

TABLE $A_D$ (no cut) → 16 BITS + 5 BITS + 38 BITS = 59 BITS

FIG. 42

| INDEX | $D_0$ | $D_1$ | $D_2$ | $D_3$ | $D_4$ | $D_5$ | $D_6$ | $D_7$ | $D_8$ | $D_9$ | $D_{10}$ | $D_{11}$ | $D_{12}$ | $D_{13}$ | $D_{14}$ | $D_{15}$ | $D_{16}$ | $D_{17}$ | $D_{18}$ | $D_{19}$ | $D_{20}$ | $D_{21}$ | $D_{22}$ | $D_{23}$ | $D_{24}$ | $D_{25}$ | $D_{26}$ | |
|---|---|---|---|---|---|---|---|---|---|---|---|---|---|---|---|---|---|---|---|---|---|---|---|---|---|---|---|---|
| WEIGHT VALUE | 7 | 7 | 6 | 6 | 5 | 5 | 4 | 4 | 4 | 3 | 3 | 3 | 2 | 2 | 2 | 1 | 1 | 1 | 1 | 1 | 1 | 1 | 1 | 1 | 2 | 1 | 1 | |
| SUBTRACTION RESULT | 5 | 5 | 4 | 4 | 3 | 3 | 2 | 2 | 2 | 1 | 1 | 1 | 0 | 0 | 0 | 0 | 0 | 0 | 0 | 0 | 0 | 0 | 0 | 0 | 2 | 1 | 1 | |
| DIFFERENTIAL VALUE | 2 | 2 | 2 | 2 | 2 | 2 | 2 | 2 | 3 | 2 | 2 | 3 | 2 | 2 | 2 | 1 | 1 | 1 | 1 | 1 | 1 | 1 | 1 | 1 | 2 | 1 | 1 | |
| | 0 | 0 | 0 | 0 | 0 | 0 | 0 | 0 | 1 | -1 | 0 | 1 | -1 | 0 | 0 | -1 | 0 | 0 | 0 | 0 | 0 | 0 | 0 | 0 | 1 | -1 | 0 | |
| TABLE $A_D$ | 3 | 1 | 1 | 1 | 1 | 1 | 1 | 1 | 3 | 3 | 3 | 3 | 1 | 3 | 3 | 1 | 1 | 1 | 1 | 1 | 1 | 1 | 1 | 1 | 3 | 3 | 1 | → 47 BITS |
| TABLE $B_D$ | 3 | 1 | 1 | 1 | 1 | 1 | 1 | 1 | 2 | 2 | 2 | 2 | 1 | 2 | 2 | 1 | 1 | 1 | 1 | 1 | 1 | 1 | 1 | 1 | 2 | 2 | 1 | → 38 BITS |

FIG. 44

| | $D_0$ | $D_1$ | $D_2$ | $D_3$ | $D_4$ | $D_5$ | $D_6$ | $D_7$ | $D_8$ | $D_9$ | $D_{10}$ | $D_{11}$ | $D_{12}$ | $D_{13}$ | $D_{14}$ | $D_{15}$ | $D_{16}$ | $D_{17}$ | $D_{18}$ | $D_{19}$ | $D_{20}$ | $D_{21}$ | $D_{22}$ | $D_{23}$ | $D_{24}$ | $D_{25}$ | $D_{26}$ |
|---|---|---|---|---|---|---|---|---|---|---|---|---|---|---|---|---|---|---|---|---|---|---|---|---|---|---|---|
| INDEX (ONE FRAME BEFORE) | 7 | 7 | 7 | 6 | 6 | 6 | 5 | 4 | 5 | 2 | 3 | 4 | 2 | 1 | 2 | 1 | 1 | 1 | 1 | 1 | 1 | 1 | 1 | 1 | 1 | 1 | 1 |
| INDEX (CURRENT FRAME) | 7 | 7 | 6 | 6 | 6 | 5 | 5 | 4 | 4 | 4 | 3 | 3 | 2 | 2 | 2 | 3 | 2 | 1 | 1 | 1 | 1 | 1 | 1 | 2 | 1 | 1 | 1 |
| DIFFERENTIAL VALUE | 0 | 0 | -1 | 0 | -1 | 0 | 0 | -1 | 2 | 0 | -1 | 0 | 1 | 1 | 0 | 0 | 0 | 0 | 0 | 0 | 0 | 0 | 1 | 0 | 1 | 1 |
| TABLE $A_D$ | 1 | 1 | 3 | 1 | 3 | 1 | 1 | 3 | 5 | 1 | 3 | 1 | 3 | 3 | 1 | 1 | 1 | 1 | 1 | 1 | 1 | 1 | 3 | 1 | 1 | 1 |

→ 45 BITS

FIG. 46

| | $D_0$ | $D_1$ | $D_2$ | $D_3$ | $D_4$ | $D_5$ | $D_6$ | $D_7$ | $D_8$ | $D_9$ | $D_{10}$ | $D_{11}$ | $D_{12}$ | $D_{13}$ | $D_{14}$ | $D_{15}$ | $D_{16}$ | $D_{17}$ | $D_{18}$ | $D_{19}$ | $D_{20}$ | $D_{21}$ | $D_{22}$ | $D_{23}$ | $D_{24}$ | $D_{25}$ | $D_{26}$ | |
|---|---|---|---|---|---|---|---|---|---|---|---|---|---|---|---|---|---|---|---|---|---|---|---|---|---|---|---|---|
| INDEX ($D_{Li}$) | 7 | 7 | 6 | 6 | 5 | 5 | 4 | 4 | 4 | 3 | 3 | 2 | 2 | 2 | 1 | 1 | 1 | 1 | 1 | 1 | 1 | 1 | 2 | 1 | 1 | 1 | 1 | |
| INDEX ($D_{Ri}$) | 7 | 6 | 7 | 5 | 6 | 4 | 4 | 4 | 2 | 3 | 3 | 1 | 1 | 2 | 2 | 2 | 1 | 1 | 1 | 1 | 1 | 1 | 1 | 1 | 1 | 1 | 1 | |
| DIFFERENTIAL VALUE | 0 | 1 | -1 | -1 | 0 | -1 | 0 | 0 | 2 | 0 | 0 | 1 | 1 | 1 | 0 | -1 | 0 | 0 | 0 | 0 | 0 | 0 | 1 | 0 | 0 | 0 | 0 | |
| TABLE $A_D$ | 1 | 3 | 3 | 3 | 1 | 3 | 1 | 1 | 5 | 1 | 1 | 3 | 3 | 3 | 1 | 3 | 1 | 1 | 1 | 1 | 1 | 1 | 3 | 1 | 1 | 1 | 1 | → 49 BITS |

FIG. 48

| | $D_0$ | $D_1$ | $D_2$ | $D_3$ | $D_4$ | $D_5$ | $D_6$ | $D_7$ | $D_8$ | $D_9$ | $D_{10}$ | $D_{11}$ | $D_{12}$ | $D_{13}$ | $D_{14}$ | $D_{15}$ | $D_{16}$ | $D_{17}$ | $D_{18}$ | $D_{19}$ | $D_{20}$ | $D_{21}$ | $D_{22}$ | $D_{23}$ | $D_{24}$ | $D_{25}$ | $D_{26}$ |
|---|---|---|---|---|---|---|---|---|---|---|---|---|---|---|---|---|---|---|---|---|---|---|---|---|---|---|---|
| INDEX ($B_{Li}$) | 7 | 7 | 6 | 6 | 5 | 4 | 4 | 4 | 3 | 3 | 3 | 2 | 2 | 2 | 1 | 1 | 1 | 1 | 1 | 1 | 1 | 1 | 1 | 2 | 1 | 1 | 1 |
| INDEX ($B_{Ri}$) | 7 | 6 | 7 | 7 | 5 | 6 | 4 | 4 | 4 | 2 | 3 | 1 | 1 | 2 | 2 | 2 | 1 | 1 | 1 | 1 | 1 | 1 | 1 | 1 | 1 | 1 | 1 |
| DIFFERENTIAL VALUE LR | 0 | 1 | -1 | -1 | 0 | -1 | 0 | 0 | 0 | 2 | 0 | 1 | 1 | 1 | 0 | -1 | 0 | 0 | 0 | 0 | 0 | 0 | 0 | 1 | 0 | 0 | 0 |
| DIFFERENTIAL VALUE F | 1 | -2 | 0 | 1 | -1 | 1 | 0 | 2 | -2 | 0 | 1 | 0 | 0 | -1 | -1 | 0 | 0 | 0 | 0 | 0 | 0 | 0 | 1 | -1 | 0 | 0 |
| TABLE $A_D$ | 1 | 3 | 5 | 1 | 3 | 3 | 5 | 3 | 1 | 5 | 1 | 3 | 3 | 3 | 3 | 1 | 1 | 1 | 1 | 1 | 1 | 1 | 3 | 3 | 1 | 1 | ⟶ 59 BITS |

ENCODER AND DECODER

TECHNICAL FIELD

The present invention relates to encoding devices and decoding devices, and more particularly relates to an encoding device capable of improving the encoding efficiency and to a decoding device.

BACKGROUND OF THE INVENTION

FIG. 1 shows an example of the configuration of a known encoding device.

A band separator 1 separates an input audio signal into a plurality of frequency bands (27 bands in this case) and outputs signals from resultant encoding units $A_0$ to $A_{26}$ to corresponding normalizers 2-1 to 2-27 and to a quantization accuracy determination unit 3 in each predetermined time block (frame). When it is unnecessary to distinguish among the encoding units $A_0$ to $A_{26}$, the encoding units are simply referred to as the "encoding units A". Similar notations are used in other cases.

The band separation by the band separator 1 can be performed by using a filter such as a QMF (Quadrature Mirror Filter) or a PQF (Polyphase Quadrature Filter) or by grouping spectral signals generated by spectral transformation such as MDCT in units of bands.

The encoding units A can be of the same length or can have different lengths, depending on a critical bandwidth.

The normalizer 2-1 detects the signal component having the largest absolute value from the signal from the encoding unit $A_0$ from the band separator 1 and computes a normalization coefficient $B_0$ for the encoding unit $A_0$ using the detected value. The normalizer 2-1 outputs the computed normalization coefficient $B_0$ to a multiplexer 5, and also normalizes the signal of the encoding unit $A_0$ in accordance with a value corresponding to the normalization coefficient $B_0$ and outputs the resultant normalized data $C_0$ to a quantizer 4-1.

As in the normalizer 2-1, the normalizers 2-2 to 2-27 compute normalization coefficients $B_1$ to $B_{26}$ based on the signals from the encoding units $A_1$ to $A_{26}$ and output the normalization coefficients $B_1$ to $B_{26}$ to the multiplexer 5. Also, the normalizers 2-2 to 2-27 generate normalized data $C_1$ to $C_{26}$ and output the normalized data $C_1$ to $C_{26}$ to quantizers 4-2 to 4-27. The normalized data C are values within the range from −1.0 to 1.0.

The quantization accuracy determination unit 3 determines quantization steps for quantizing the normalized data $C_0$ to $C_{26}$ in accordance with the signals of the encoding units $A_0$ to $A_{26}$ from the band separator 1 and outputs quantization accuracy information $D_0$ to $D_{26}$, corresponding to the determined quantization steps, to the corresponding quantizers 4-1 to 4-27. The quantization accuracy determination unit 3 also outputs the quantization accuracy information $D_0$ to $D_{26}$ to the multiplexer 5.

The quantizer 4-1 quantizes the normalized data $C_0$ from the normalizer 2-1 using the quantization step corresponding to the quantization accuracy information $D_0$ from the quantization accuracy determination unit 3 and outputs a resultant quantization coefficient $F_0$ to the multiplexer 5.

As in the quantizer 4-1, the quantizers 4-2 to 4-27 quantize the normalized data $C_1$ to $C_{26}$ using the quantization steps corresponding to the quantization accuracy information $D_1$ to $D_{26}$ from the quantization accuracy determination unit 3 and output resultant quantization coefficients $F_1$ to $F_{26}$ to the multiplexer 5.

The multiplexer 5 encodes the normalization coefficients $B_0$ to $B_{26}$ from the normalizers 2-1 to 2-27 into 6-bit codes and the quantization accuracy information $D_0$ to $D_{26}$ from the quantization accuracy determination unit 3 into 3-bit codes. Also, the multiplexer 5 encodes the quantization coefficients $F_0$ to $F_{26}$ from the quantizers 4-1 to 4-27, multiplexes various resultant data generated by encoding, and generates encoded data. The processing of the multiplexer 5 is performed in units of time blocks (frames).

FIG. 2 shows an example of the configuration of a decoding device for decoding the encoded data generated by the encoding device shown in FIG. 1.

A demultiplexer 21 decodes the encoded data, which is supplied from the encoding device, into the normalization coefficients $B_0$ to $B_{26}$, the quantization accuracy information $D_0$ to $D_{26}$, and the quantization coefficients $F_0$ to $F_{26}$, and outputs the separated pieces of data to corresponding signal component composers 22-1 to 22-27.

The signal component composer 22-1 dequantizes the quantization coefficient $F_0$ from the demultiplexer 21 in accordance with the quantization step corresponding to the quantization accuracy information $D_0$, thus generating the normalized data $C_0$. Also, the signal component composer 22-1 multiplies (denormalizes) the normalized data $C_0$ by a value corresponding to the normalization coefficient $B_0$, thus decoding the signal of the encoding unit $A_0$, and outputs the decoded signal to a band combiner 23.

As in the signal component composer 22-1, the signal component composers 22-2 to 22-27 dequantize the quantization coefficients $F_1$ to $F_{26}$ from the demultiplexer 21 in accordance with the quantization steps corresponding to the quantization accuracy information $D_1$ to $D_{26}$, thus generating the normalized data $C_1$ to $C_{26}$ Also, the signal component composers 22-2 to 22-27 multiply (denormalize) the normalized data $C_1$ to $C_{26}$ by values corresponding to the normalization coefficients $B_1$ to $B_{26}$, thus decoding the signals of the encoding units $A_1$ to $A_{26}$, and output the decoded signals to the band combiner 23.

The band combiner 23 combines the bands of the signals of the encoding units $A_0$ to $A_{26}$ from the signal component composers 22-1 to 22-27, thereby decoding the original audio signal.

In known encoding devices, as described above, the normalization coefficient B corresponding to one encoding unit A is uniformly encoded into, for example, 6-bit data. In other words, the total number of bits of codes for the normalization coefficients $B_0$ to $B_{26}$ corresponding to the encoding units $A_0$ to $A_{26}$ is 162 (=6×27) bits per frame.

In known encoding devices, the quantization accuracy information D corresponding to one encoding unit A is uniformly encoded into, for example, 3-bit data. In other words, the total number of bits of codes for the quantization accuracy information $D_0$ to $D_{26}$ corresponding to the encoding units $A_0$ to $A_{26}$ is 81 (=3×27) bits per frame.

As described above, since many bits are used to encode the normalization coefficients B and the quantization accuracy information D in known encoding devices, the total number of bits of the encoded data is increased. It is thus difficult to improve the encoding efficiency of encoded data.

SUMMARY OF THE INVENTION

In view of the foregoing circumstances, it is an object of the present invention to improve the encoding efficiency.

A first encoding device of the present invention includes band separating means for separating an input acoustic time-series signal into N bands and generating N band signals; normalization coefficient generating means for generating a predetermined normalization coefficient for each of the band signals; normalization means for normalizing the band signals on the basis of the generated normalization coefficients; quantization accuracy information generating means for generating quantization accuracy information for each of the band signals; quantization means for quantizing each of the normalized band signals on the basis of the quantization accuracy information; a plurality of normalization coefficient encoding means for encoding the N normalization coefficients, which are generated by the normalization coefficient generating means; first selection means for selecting one of the normalization coefficient encoding means on the basis of the amount of encoding in a case in which the N normalization coefficients are encoded by each of the normalization coefficient encoding means; and multiplexing means for multiplexing the N normalization coefficients, which are encoded using the normalization coefficient encoding means selected by the first selection means, and each of the band signals, which are output by the quantization means.

The band separating means may generate the N band signals by converting the input acoustic time-series signal into frequency components and separating a resultant spectral signal into N bands.

At least one of the normalization coefficient encoding means may include second selection means for selecting L indexes at high frequencies from among indexes of the N normalization coefficients; computation means for detecting a maximum value and a minimum value of the L selected indexes and computing the difference between the maximum value and the minimum value; encoding means for encoding each of the L normalization coefficients at high frequencies by representing, using a predetermined number of bits, a value obtained by subtracting the minimum value from each of the L selected indexes at high frequencies; and output means for outputting, when the normalization coefficient encoding means is selected, information indicating that the L indexes are specified, the predetermined number of bits, the minimum value, indexes of (N-L) normalization coefficients unselected by the selection means, and the L encoded normalization coefficients.

The encoding device may further include weighting means for adding a predetermined weight value to each index of the normalization coefficients so as to increase the correlation between the indexes of the normalization coefficients. The encoding means may encode the indexes weighted by the weighting means.

At least one of the normalization coefficient encoding means may include differential value computing means for computing a differential value between an index of each of the normalization coefficients and an index of another normalization coefficient that is highly correlated with the index of each of the normalization coefficients; and encoding means for encoding the differential value, which is computed by the differential value computing means.

The normalization coefficient encoding means may include table maintaining means for maintaining a table in which a differential value having a high frequency of occurrence of being computed by the differential value computing means is associated with a code having a small number of bits. The encoding means may encode the differential value, which is computed by the differential value computing means, by reading, from the table, a code corresponding to the differential value.

The table may include codes corresponding to all differential values that can be computed by the computing means.

The table may only include a code corresponding to a differential value having a high frequency of occurrence. For a differential value other than that with a high frequency of occurrence, the encoding means may encode the differential value by outputting an index for the differential value subsequent to a predetermined escape code.

For a differential value other than that with a high frequency of occurrence, the encoding means may repeatedly output a second escape code, the number of repetitions being based on the size of the absolute value of the differential value, subsequent to a first escape code that depends on the sign of the differential value and may read, from the table, a code corresponding to a value obtained by subtracting a predetermined number based on the size of the absolute value of the differential value from the differential value to encode the differential value.

When a differential value other than that with a high frequency of occurrence is within a predetermined range, the encoding means may read, from the table, a code corresponding to a value obtained by subtracting a predetermined number that depends on the sign of the differential value from the differential value and may output the code subsequent to a first escape code, and, when the differential value other than that with a high frequency of occurrence is not within the predetermined range, the encoding means may output an index for the differential value subsequent to a second escape code to encode the differential value.

A normalization coefficient in a band adjacent to a band corresponding to each of the normalization coefficients may be used as another normalization coefficient highly correlated with each of the normalization coefficients.

When all indexes of the normalization coefficients in a band higher than a particular band indicate 0 or 1, the normalization coefficient encoding means may not encode differential values at frequencies higher than the particular band.

When the differential value between indexes of the normalization coefficients in a band higher than a particular band is within a predetermined range, the normalization coefficient encoding means may make the code length of each of the normalization coefficients at frequencies higher than the particular band a predetermined value smaller than the code length of the normalization coefficient at frequencies lower than the particular band.

The encoding device may further include weighting means for adding a predetermined weight value to each index of the normalization coefficients so as to increase the correlation between the indexes of the differential values between the normalization coefficients. The encoding means may encode the indexes weighted by the weighting means.

The weighting means may add a step-by-step weight that gradually increases as the band becomes higher.

A normalization coefficient that is temporarily adjacent to a band corresponding to each of the normalization coefficients may be used as another normalization coefficient highly correlated with each of the normalization coefficients.

The acoustic time-series signal may be a left signal or a right signal of a stereo audio signal. The differential value computing means may compute the differential value between a normalization coefficient of the left signal and a normalization coefficient of the right signal.

A first encoding method of the present invention includes a band separating step of separating an input acoustic time-series signal into N bands and generating N band signals; a normalization coefficient generating step of generating a predetermined normalization coefficient for each of the band signals; a normalization step of normalizing the band signals on the basis of the generated normalization coefficients; a quantization accuracy information generating step of generating quantization accuracy information for each of the band signals; a quantization step of quantizing each of the normalized band signals on the basis of the quantization accuracy information; a plurality of normalization coefficient encoding steps of encoding the N normalization coefficients, which are generated in the normalization coefficient generating step; a selection step of selecting one of the normalization coefficient encoding steps on the basis of the amount of encoding in a case in which the N normalization coefficients are encoded in each of the normalization coefficient encoding steps; and a multiplexing step of multiplexing the N normalization coefficients, which are encoded using the normalization coefficient encoding step selected in the selection step, and each of the band signals, which are output in the quantization step.

A first recording medium of the present invention has a program recorded therein, the program including a band separating step of separating an input acoustic time-series signal into N bands and generating N band signals; a normalization coefficient generating step of generating a predetermined normalization coefficient for each of the band signals; a normalization step of normalizing the band signals on the basis of the generated normalization coefficients; a quantization accuracy information generating step of generating quantization accuracy information for each of the band signals; a quantization step of quantizing each of the normalized band signals on the basis of the quantization accuracy information; a plurality of normalization coefficient encoding steps of encoding the N normalization coefficients, which are generated in the normalization coefficient generating step; a selection step of selecting one of the normalization coefficient encoding steps on the basis of the amount of encoding in a case in which the N normalization coefficients are encoded in each of the normalization coefficient encoding steps; and a multiplexing step of multiplexing the N normalization coefficients, which are encoded using the normalization coefficient encoding step selected in the selection step, and each of the band signals, which are output in the quantization step.

According to a first encoding apparatus and method and to a first recording medium of the present invention, an input acoustic time-series signal is separated into N bands to generate N band signals. A predetermined normalization coefficient for each of the band signals is generated. The band signals are normalized on the basis of the generated normalization coefficients. Quantization accuracy information for each of the band signals is generated. Each of the normalized band signals is quantized on the basis of the quantization accuracy information. The N generated normalization coefficients are encoded. One of normalization coefficient encoding methods is selected on the basis of the amount of encoding in a case in which the N normalization coefficients are encoded. The N normalization coefficients, which are encoded using the selected normalization coefficient encoding method, and each of the band signals are multiplexed.

A second encoding device of the present invention includes band separating means for separating an input acoustic time-series signal into N bands and generating N band signals; normalization coefficient generating means for generating a predetermined normalization coefficient for each of the band signals; normalization means for normalizing the band signals on the basis of the generated normalization coefficients; quantization accuracy information generating means for generating quantization accuracy information for each of the band signals; quantization means for quantizing each of the normalized band signals on the basis of the quantization accuracy information; a plurality of quantization accuracy information encoding means for encoding the N pieces of quantization accuracy information, which are generated by the quantization accuracy information generating means; first selection means for selecting one of the quantization accuracy information encoding means on the basis of the amount of encoding in a case in which the N pieces of quantization accuracy information are encoded by each of the quantization accuracy information encoding means; and multiplexing means for multiplexing the N pieces of quantization accuracy information, which are encoded using the quantization accuracy information encoding means selected by the first selection means, and each of the band signals, which are output by the quantization means.

The band separating means may generate the N band signals by converting the input acoustic time-series signal into frequency components and separating a resultant spectral signal into N bands.

At least one of the quantization accuracy information encoding means may include second selection means for selecting L indexes at high frequencies from among indexes of the N pieces of quantization accuracy information; computation means for detecting a maximum value and a minimum value of the L selected indexes and computing the difference between the maximum value and the minimum value; encoding means for encoding each of the L normalization coefficients at high frequencies by representing, using a predetermined number of bits, a value obtained by subtracting the minimum value from each of the L selected indexes at high frequencies; and output means for outputting, when the quantization accuracy information encoding means is selected, information indicating that the L indexes are specified, the predetermined number of bits, the minimum value, indexes of (N-L) pieces of quantization accuracy information unselected by the selection means, and the L pieces of encoded quantization accuracy information.

The encoding device may further include weighting means for adding a predetermined weight value to each index of the pieces of quantization accuracy information so as to increase the correlation between the indexes of the pieces of quantization accuracy information. The encoding means may encode the indexes weighted by the weighting means.

At least one of the quantization accuracy information encoding means may include differential value computing means for computing a differential value between an index of each of the pieces of quantization accuracy information and an index of another piece of quantization accuracy information that is highly correlated with the index of each of the pieces of quantization accuracy information; and encoding means for encoding the differential value, which is computed by the differential value computing means.

The quantization accuracy information encoding means may include table maintaining means for maintaining a table in which a differential value having a high frequency of occurrence of being computed by the differential value computing means is associated with a code having a small number of bits. The encoding means may encode the differential value, which is computed by the differential value computing means, by reading, from the table, a code corresponding to the differential value.

The table may include codes corresponding to all differential values that can be computed by the computing means.

The table may only include a code corresponding to a differential value having a high frequency of occurrence. For a differential value other than that with a high frequency of occurrence, the encoding means may encode the differential value by outputting an index for the differential value subsequent to a predetermined escape code.

For a differential value other than that with a high frequency of occurrence, the encoding means may repeatedly, output a second escape code, the number of repetitions being based on the size of the absolute value of the differential value, subsequent to a first escape code that depends on the sign of the differential value and may read, from the table, a code corresponding to a value obtained by subtracting a predetermined number based on the size of the absolute value of the differential value from the differential value to encode the differential value.

When a differential value other than that with a high frequency of occurrence is within a predetermined range, the encoding means may read, from the table, a code corresponding to a value obtained by subtracting a predetermined number that depends on the sign of the differential value from the differential value and outputs the code subsequent to a first escape code, and, when the differential value other than that with a high frequency of occurrence is not within the predetermined range, the encoding means may output an index for the differential value subsequent to a second escape code to encode the differential value.

Quantization accuracy information in a band adjacent to a band corresponding to each of the pieces of quantization accuracy information may be used as another piece of quantization accuracy information highly correlated with each of the pieces of quantization accuracy information.

When all indexes of the pieces of quantization accuracy information in a band higher than a particular band indicate 0 or 1, the quantization accuracy information encoding means may not encode differential values at frequencies higher than the particular band.

When the differential value between indexes of the pieces of quantization accuracy information in a band higher than a particular band is within a predetermined range, the quantization accuracy information encoding means may make the code length of each of the pieces of quantization accuracy information at frequencies higher than the particular band a predetermined value smaller than the code length of the quantization accuracy information at frequencies lower than the particular band.

The encoding device may further include weighting means for adding a predetermined weight value to each index of the pieces of quantization accuracy information so as to increase the correlation between the indexes of the differential values between the pieces of quantization accuracy information. The encoding means may encode the indexes weighted by the weighting means.

The weighting means may add a step-by-step weight that gradually increases as the band becomes higher.

Quantization accuracy information that is temporarily adjacent to a band corresponding to each of the pieces of quantization accuracy information may be used as another piece of quantization accuracy information highly correlated with each of the pieces of quantization accuracy information.

The acoustic time-series signal may be a left signal or a right signal of a stereo audio signal. The differential value computing means may compute the differential value between quantization accuracy information of the left signal and quantization accuracy information of the right signal.

A second encoding method of the present invention includes a band separating step of separating an input acoustic time-series signal into N bands and generating N band signals; a normalization coefficient generating step of generating a predetermined normalization coefficient for each of the band signals; a normalization step of normalizing the band signals on the basis of the generated normalization coefficients; a quantization accuracy information generating step of generating quantization accuracy information for each of the band signals; a quantization step of quantizing each of the normalized band signals on the basis of the quantization accuracy information; a plurality of quantization accuracy information encoding steps of encoding the N pieces of quantization accuracy information, which are generated in the quantization accuracy information generating step; a selection step of selecting one of the quantization accuracy information encoding steps on the basis of the amount of encoding in a case in which the N pieces of quantization accuracy information are encoded in each of the quantization accuracy information encoding steps; and a multiplexing step of multiplexing the N pieces of quantization accuracy information, which are encoded using the quantization accuracy information encoding step selected in the selection step, and each of the band signals, which are output in the quantization step.

A second recording medium of the present invention has a program recorded therein, the program including a band separating step of separating an input acoustic time-series signal into N bands and generating N band signals; a normalization coefficient generating step of generating a predetermined normalization coefficient for each of the band signals; a normalization step of normalizing the band signals on the basis of the generated normalization coefficients; a quantization accuracy information generating step of generating quantization accuracy information for each of the band signals; a quantization step of quantizing each of the normalized band signals on the basis of the quantization accuracy information; a plurality of quantization accuracy information encoding steps of encoding the N pieces of quantization accuracy information, which are generated in the quantization accuracy information generating step; a selection step of selecting one of the quantization accuracy information encoding steps on the basis of the amount of encoding in a case in which the N pieces of quantization accuracy information are encoded in each of the quantization accuracy information encoding steps; and a multiplexing step of multiplexing the N pieces of quantization accuracy information, which are encoded using the quantization accuracy information encoding step selected in the selection step, and each of the band signals, which are output in the quantization step.

According to a second encoding device and method and to a second recording medium of the present invention, an input acoustic time-series signal is separated into N bands to generate N band signals. A predetermined normalization coefficient for each of the band signals is generated. The band signals are normalized on the basis of the generated normalization coefficients. Quantization accuracy information for each of the band signals is generated. Each of the normalized band signals is quantized on the basis of the quantization accuracy information. The N pieces of generated quantization accuracy information are encoded. One of quantization accuracy information encoding methods is selected on the basis of the amount of encoding in a case in which the N pieces of quantization accuracy information are encoded. The N pieces of quantization accuracy information, which are encoded using the selected quantization accuracy information encoding method, and each of the band signals are multiplexed.

A first decoding device of the present invention includes demultiplexing means for demultiplexing the multiplexing of at least one band signal with quantization accuracy information and with an encoded normalization coefficient for each band signal; normalization coefficient decoding means for decoding the demultiplexed normalization coefficient; signal generating means for dequantizing each band signal on the basis of the quantization accuracy information and for denormalizing the dequantized signal on the basis of the normalization coefficient, whereby an acoustic time-series signal is generated; and combining means for combining bands of band signals generated by the signal generating means.

A first decoding method of the present invention includes a demultiplexing step of demultiplexing the multiplexing of at least one band signal with quantization accuracy information and with an encoded normalization coefficient for each band signal; a normalization coefficient decoding step of decoding the demultiplexed normalization coefficient; a signal generating step of dequantizing each band signal on the basis of the quantization accuracy information and for denormalizing the dequantized signal on the basis of the normalization coefficient, whereby an acoustic time-series signal is generated; and a combining step of combining bands of band signals generated in the signal generating step.

A third recording medium of the present invention has a program recorded therein, the program including a demultiplexing step of demultiplexing the multiplexing of at least one band signal with quantization accuracy information and with an encoded normalization coefficient for each band signal; a normalization coefficient decoding step of decoding the demultiplexed normalization coefficient; a signal generating step of dequantizing each band signal on the basis of the quantization accuracy information and for denormalizing the dequantized signal on the basis of the normalization coefficient, whereby an acoustic time-series signal is generated; and a combining step of combining bands of band signals generated in the signal generating step.

According to a first decoding device and method and to a third recording medium of the present invention, the multiplexing of at least one band signal with quantization accuracy information and with an encoded normalization coefficient for each band signal is demultiplexed. The demultiplexed normalization coefficient is decoded. Each band signal is dequantized on the basis of the quantization accuracy information, and the dequantized signal is denormalized on the basis of the normalization coefficient, whereby an acoustic time-series signal is generated. Bands of generated band signals are combined.

A second decoding device of the present invention includes demultiplexing means for demultiplexing the multiplexing of at least one band signal with a normalization coefficient and with encoded quantization accuracy information for each band signal; quantization accuracy information decoding means for decoding the demultiplexed quantization accuracy information; signal generating means for dequantizing each band signal on the basis of the quantization accuracy information and for denormalizing the dequantized signal on the basis of the normalization coefficient, whereby an acoustic time-series signal is generated; and combining means for combining bands of band signals generated by the signal generating means.

A second decoding method of the present invention includes a demultiplexing step of demultiplexing the multiplexing of at least one band signal with a normalization coefficient and with encoded quantization accuracy information for each band signal; a quantization accuracy information decoding step of decoding the demultiplexed quantization accuracy information; a signal generating step of dequantizing each band signal on the basis of the quantization accuracy information and for denormalizing the dequantized signal on the basis of the normalization coefficient, whereby an acoustic time-series signal is generated; and a combining step of combining bands of band signals generated in the signal generating step.

A fourth recording medium of the present invention has a program recorded therein, the program including a demultiplexing step of demultiplexing the multiplexing of at least one band signal with a normalization coefficient and with encoded quantization accuracy information for each band signal; a quantization accuracy information decoding step of decoding the demultiplexed quantization accuracy information; a signal generating step of dequantizing each band signal on the basis of the quantization accuracy information and for denormalizing the dequantized signal on the basis of the normalization coefficient, whereby an acoustic time-series signal is generated; and a combining step of combining bands of band signals generated in the signal generating step.

According to a second decoding device and method and to a fourth recording medium of the present invention, the multiplexing of at least one band signal with a normalization coefficient and with encoded quantization accuracy information for each band signal is demultiplexed. The demultiplexed quantization accuracy information is decoded. Each band signal is dequantized on the basis of the quantization accuracy information, and the dequantized signal is denormalized on the basis of the normalization coefficient, whereby an acoustic time-series signal is generated. Bands of generated band signals are combined.

BRIEF DESCRIPTION OF THE DRAWINGS

FIG. 5 is an illustration of examples of normalization coefficients B.

FIG. 9 is an illustration of the operation of the encoder 61-2.

FIG. 10 is an illustration of a table $A_B$.

FIG. 11 is an illustration of a table $B_B$.

FIG. 12 is an illustration of a procedure for obtaining codes shown in the table $B_B$.

FIG. 13 is an illustration of a table $C_B$.

FIG. 14 is an illustration of a table $D_B$.

FIG. 16 is an illustration of a table $E_B$.

FIG. 19 is an illustration of the operation of the encoder 61-3.

FIG. 22 is an illustration of the operation of the encoder 61-4.

FIG. 25 is an illustration of the operation of the encoder 61-5.

FIG. 28 is an illustration of the operation of the encoder 61-6.

FIG. 31 is an illustration of an example of quantization accuracy information D.

FIG. 34 is an illustration of the operation of the encoder 71-2.

FIG. 35 is an illustration of a table $A_D$.

FIG. 36 is an illustration of a table $B_D$.

FIG. 37 is an illustration of a table $C_D$.

FIG. 38 is an illustration of another operation of the encoder 71-2.

FIG. 39 is an illustration of another operation of the encoder 71-2.

FIG. 40 is an illustration of another operation of the encoder 71-2.

FIG. 41 is an illustration of another operation of the encoder 71-2.

FIG. 42 is an illustration of the operation of an encoder 71-3.

FIG. 44 is an illustration of the operation of an encoder 71-4.

FIG. 46 is an illustration of the operation of an encoder 71-5.

FIG. 48 is an illustration of the operation of an encoder 71-6.

DETAILED DESCRIPTION OF THE PRESENTLY PREFERRED EMBODIMENTS

Figure 1:
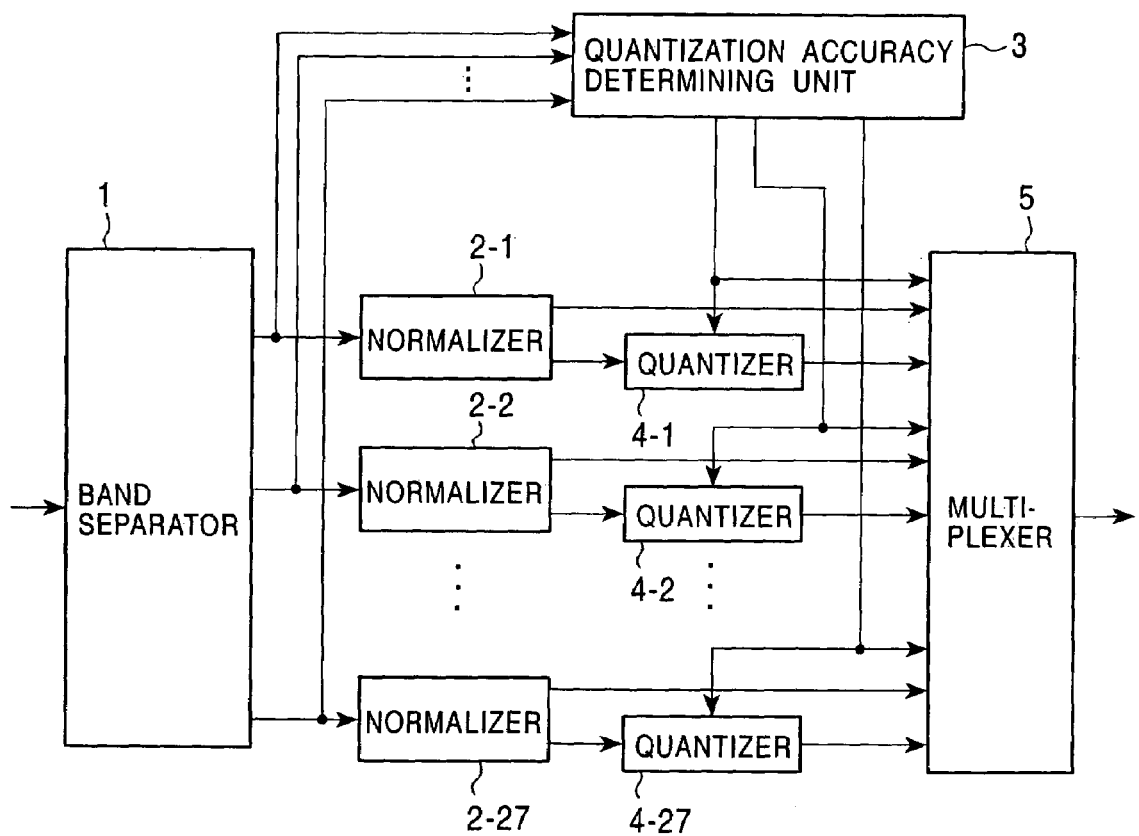
FIG. 1 is a block diagram showing an example of the configuration of a known encoding device.
Figure 3:
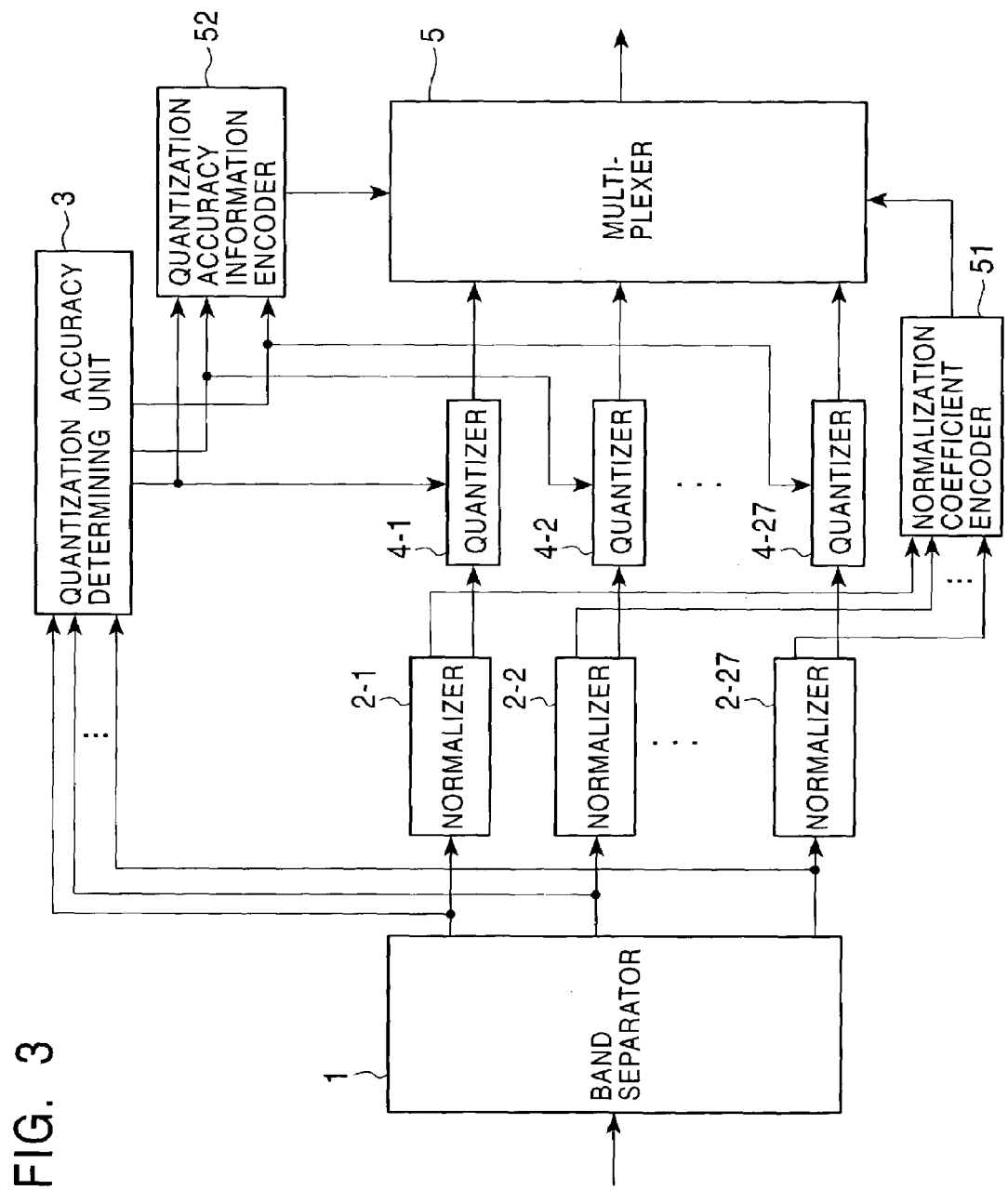
FIG. 3 is a block diagram showing an example of the configuration of an encoding device to which the present invention is applied.

FIG. 3 shows an example of the configuration of an encoding device to which the present invention is applied. In this encoding device, a normalization coefficient encoder 51 and a quantization accuracy information encoder 52 are added to an encoding device shown in FIG. 1. Since the remaining portion is similar to that shown in FIG. 1, a description thereof is appropriately omitted.

Referring to FIG. 3, normalizers 2-1 to 2-27 detect signal components, each having the largest absolute value, from signals of encoding unit $A_0$ to $A_{26}$ output from a band separator 1, compute normalization coefficients $B_0$ to $B_{26}$ for the encoding units $A_0$ to $A_{26}$ using the detected values, and output the computed normalization coefficients to the normalization coefficient encoder 51.

The normalizers 2-1 to 2-27 normalize the encoding units $A_0$ to $A_{26}$ in accordance with values corresponding to the computed normalization coefficients $B_0$ to $B_{26}$, thus generating normalized data $C_0$ to $C_{26}$, and output the normalized data $C_0$ to $C_{26}$ to quantizers 4-1 to 4-27, respectively.

A quantization accuracy determination unit 3 determines quantization steps for quantizing the normalized data $C_0$ to $C_{26}$ in accordance with the encoding units $A_0$ to $A_{26}$ from the band separator 1 and outputs normalization accuracy information $D_0$ to $D_{26}$, corresponding to the determined quantization steps, to the corresponding quantizers 4-1 to 4-27 and to the quantization accuracy information encoder 52.

The normalization coefficient encoder 51 converts the normalization coefficients $B_0$ to $B_{26}$ from the normalizers 2-1 to 2-27 into corresponding predetermined indexes, encodes the indexes by various methods described below, and outputs resultant codes and information relating to the encoding methods to a multiplexer 5. Hereinafter it is assumed that the normalization coefficients B represent converted indexes.

The quantization accuracy information encoder 52 converts the quantization accuracy information $D_0$ to $D_{26}$ from the quantization accuracy determination unit 3 into corresponding predetermined indexes, encodes the indexes by various methods described below, and outputs the indexes to the multiplexer 5. Hereinafter it is assumed that the quantization accuracy information D represent converted indexes.

In this case, a band is separated into 27 sections, thus generating the 27 encoding units A. The present invention is also applicable to cases in which more or fewer encoding units A are generated.

The normalization coefficient encoder 51 will now be described.

Figure 4:
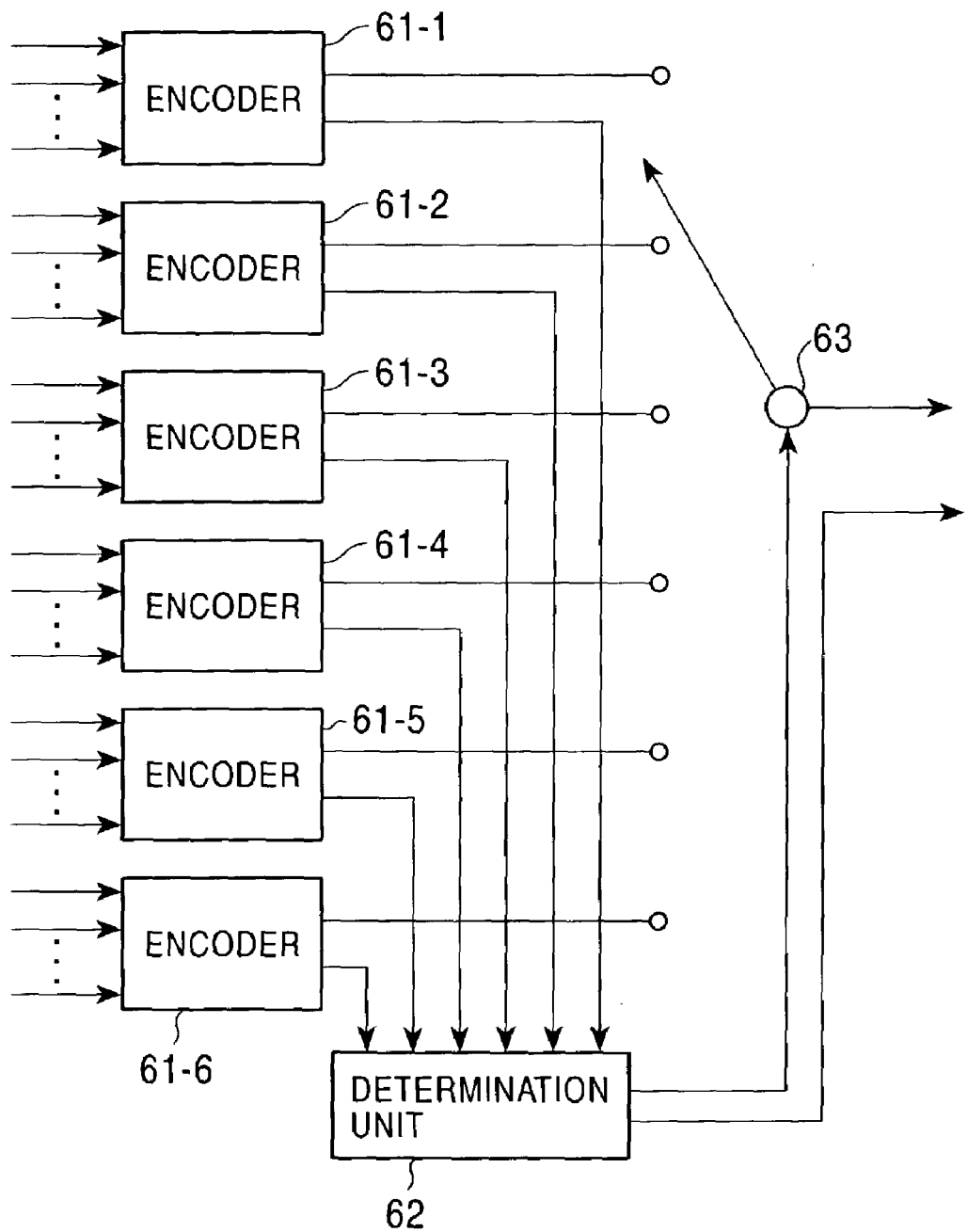
FIG. 4 is a block diagram showing an example of the configuration of a normalization coefficient encoder 51.

FIG. 4 shows an example of the configuration of the normalization coefficient encoder 51. In this case, the normalization coefficient encoder 51 has six encoders 61-1 to 61-6. The number of encoders 61 is not limited to six. It is only required that there be a plurality of encoders 61.

The encoders 61-1 to 61-6 each encode the normalization coefficients $B_0$ to $B_{26}$ by methods described below and output the encoded normalization coefficients $B_0$ to $B_{26}$ to terminals connected to a switch 63. Also, the encoders 61-1 to 61-6 each compute the total number of bits of codes obtained by encoding the normalization coefficients $B_0$ to $B_{26}$ and output the computation results to a determination unit 62.

The determination unit 62 selects the encoder 61 that has output a minimum number of bits of the total number of bits of the codes from the encoders 61-1 to 61-6 and controls the switch 63 so that the code output by the selected encoder 61 can be output to the multiplexer 5. The determination unit 62 outputs information relating to an encoding method for the selected encoder 61 to the multiplexer 5.

Each of the encoders 61-1 to 61-6 will now be described. By way of example, a case in which the normalization coefficients $B_0$ to $B_{26}$ in one frame, such as those shown in FIG. 5, are to be encoded will be described.

An encoding method for the encoder 61-1 will now be described.

Generally, normalization coefficients do not change greatly at higher frequencies. Thus, normalization coefficients for encoding units at higher frequencies often have similar values.

In encoding units in a predetermined band or higher, the encoder 61-1 subtracts, from the normalization coefficient for each encoding unit, a minimum value of the normalization coefficients of these encoding units. As a result, the encoder 61-1 encodes the normalization coefficients and outputs the encoded normalization coefficients. In this case, a normalization coefficient for an encoding unit below a predetermined band is not encoded and is output in its original form.

Figure 6:
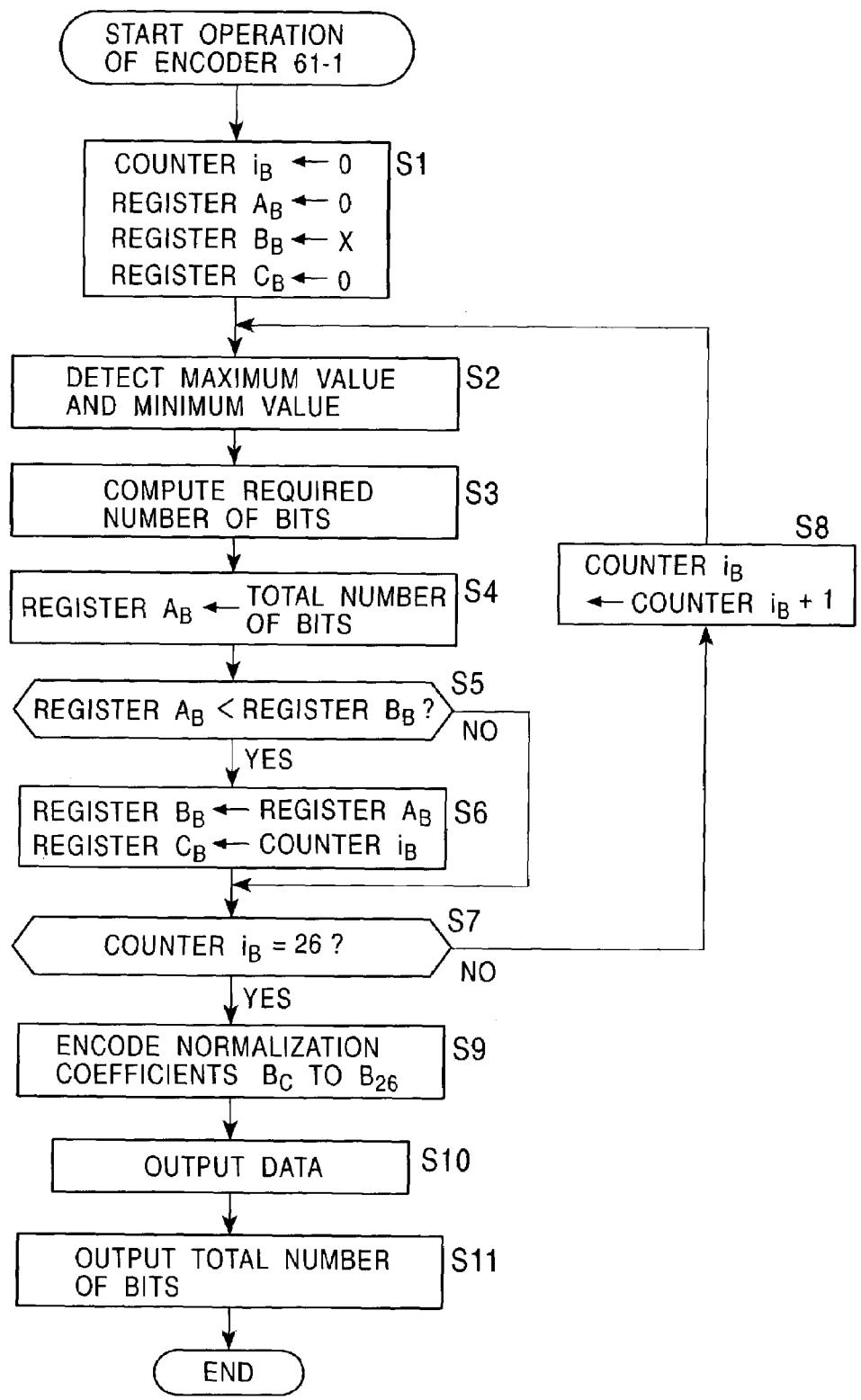
FIG. 6 is a flowchart illustrating the operation of an encoder 61-1.

The operation of the encoder 61-1 is shown in a flowchart of FIG. 6.

In step S1, the encoder 61-1 initializes the value of a built-in counter $i_B$ to 0, the value of a built-in register $A_B$ to 0, the value of a built-in register $B_B$ to the value X, which is sufficiently greater than a value computed in the following step S4, and the value of a built-in register $C_B$ to 0.

In step S2, the encoder 61-1 detects a maximum value and a minimum value of normalization coefficients $B_{i\ (i=0,\ 1,\ \ldots\ 26)}$ to $B_{26}$ (the normalization coefficient corresponding to the encoding unit $A_{26}$ at the highest frequency) specified by the value of the counter $i_B$.

For example, when the counter $i_B=2$, a maximum value and a minimum value of the normalization coefficients $B_2$ to $B_{26}$ are detected. Since the normalization coefficients $B_2$ to $B_{26}$ are values such as those shown in FIG. 5, the value 49 (normalization coefficient $B_{16}$) is detected as the maximum value, and the value 37 (normalization coefficient $B_{26}$) is detected as the minimum value.

In step S3, the encoder 61-1 computes the difference between the maximum value and the minimum value detected in step S2 and obtains the number of bits that can represent the computation result as the required number of bits.

The difference between the maximum value 49 and the minimum value 37 when the counter $i_B=2$ is 12. Thus, 4 bits capable of representing a value up to 16 is regarded as the required number of bits.

In step S4, the encoder 61-1 computes the total number of bits by computing the sum of the number of bits of data representing the value of the counter $i_B$, the number of bits of data representing the minimum value detected in step S2, the number of bits of data representing the required number of bits, which is obtained in step S3, the required number of bits×the number of the normalization coefficients $B_i$ to $B_{26}$, and 6 bits×the number of the normalization coefficients $B_0$ to $B_{i-1}$. The encoder 61-1 stores the computed total number of bits in the register $A_B$ (overwrites).

For example, when the counter $i_B=2$, 126 bits, which is the sum of 5 bits of data representing the value 2 of the counter $i_B$, 6 bits of data representing the minimum value 37, 3 bits of data representing 4 bits, i.e., the required number of bits, the required number of bits (4 bits)×25 (the number of the normalization coefficients $B_2$ to $B_{26}$), and 6 bits×2 (the number of the normalization coefficients $B_0$ and $B_1$), is regarded as the total number of bits and is stored in the register $A_B$.

In step S5, the encoder 61-1 determines whether or not the value of the register $A_B$ is less than the value of the register $B_B$. If it is determined that the value of the register $A_B$ is less than the value of the register $B_B$, in step S6, the encoder 61-1 stores the value of the register $A_B$ in the register $B_B$ (overwrites) and stores the value of the counter $i_B$ at that time in the register $C_B$ (overwrites).

In step S7, the encoder 61-1 determines whether or not the value of the counter $i_B$ is 26. If it is determined that the value of the counter $i_B$ is not 26, in step S8, the encoder 61-1 increments the value of the counter $i_B$ by one and returns to step S2.

Specifically, the processing in steps S2 to S8 is repeated until it is determined in step S7 that the value of the counter $i_B$ is 26. Thus, the minimum value of the total number of bits computed in step S4 is stored in the register $B_B$, and the value of the counter $i_B$ at that time is stored in the register $C_B$.

In the example shown in FIG. 5, the total number of bits is minimized when the counter $i_B=2$. Thus, the total number of bits (126) computed when the counter $i_B=2$ is registered in the register $B_B$, and 2 is registered in the register $C_B$.

When it is determined in step S7 that the value of the counter $i_B$ is 26, in step S9, the encoder 61-1 subtracts the minimum value of the normalization coefficients $B_C$ to $B_{26}$ from each of the normalization coefficients $B_C$ to $B_{26}$ specified by the value of the register $C_B$. As a result, the normalization coefficients $B_C$ to $B_{26}$ are encoded.

In this case, since the register $C_B=2$, the minimum value 37 is subtracted from each of the normalization coefficients $B_2$ to $B_{26}$. In other words, the normalization coefficients $B_2$ to $B_{26}$ are encoded.

In step S10, the encoder 61-1 outputs, to corresponding terminals connected to the switch 63, the value of the register $C_B$ using data having a predetermined number of bits, the minimum value of the normalization coefficients $B_C$ to $B_{26}$ using data having a predetermined number of bits, the required number of bits at that time using data having a predetermined number of bits, each code of the normalization coefficients $B_C$ to $B_{26}$ computed in step S9 using data having the required number of bits, and the normalization coefficients $B_0$ to $B_{C-1}$ using data having a predetermined number of bits.

In this case, the value of the register $C_B$, that is, 2, is output using 5-bit data; the minimum value 37 is output using 6-bit data; the required number of bits, that is, 4 bits, is output using 3-bit data; each code of the normalization coefficients $B_2$ to $B_{26}$ is output using 4-bit data; and the normalization coefficients $B_0$ and $B_1$ (the normalization coefficients B (indexes) themselves) are each output using 6-bit data.

In step S11, the encoder 61-1 assumes the value of the register $B_B$ as the amount of encoding by the encoder 61-1 and outputs the value to the determination unit 62.

In this case, since the total number of bits (126) computed when the counter $i_B=2$ is registered in the register $B_B$, 126 is sent to the determination unit 62. In other words, compared with 162 bits in a known case, 36 bits (=162−126) can be saved while encoding the normalization coefficients B.

An encoding method for the encoder 61-2 will now be described.

Figure 7:
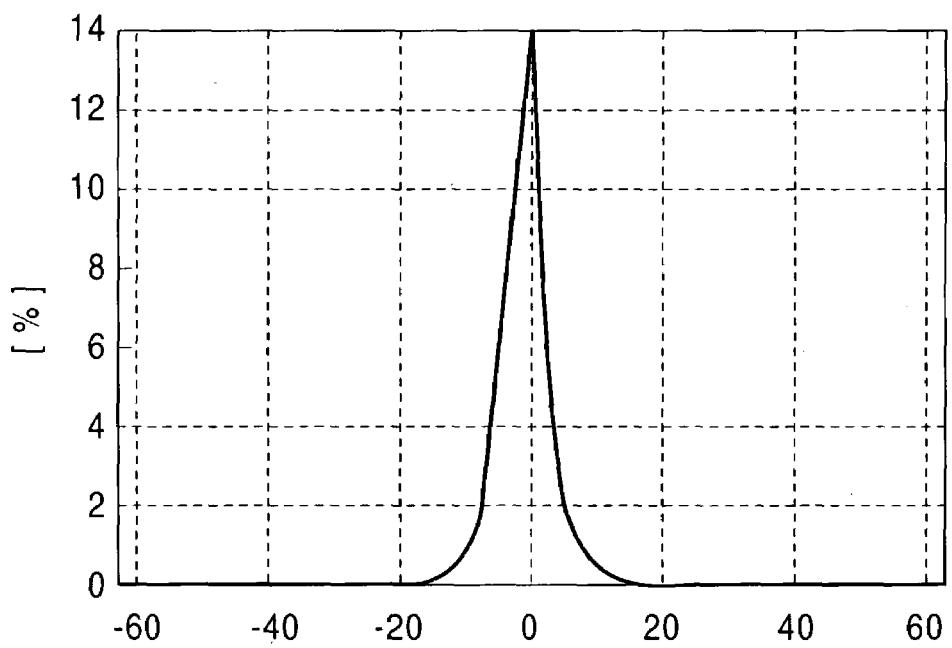
FIG. 7 is an illustration of a probability distribution of differential values.

In many cases, normalization coefficients smoothly vary in the frequency direction, and the correlation in the frequency direction is high. In other words, a particular biased distribution (a distribution in which a differential values near 0 have high probabilities of appearance), such as that shown in FIG. 7, can be obtained from differential values between normalization coefficients corresponding to encoding units in adjacent bands. IDSF denotes the index of a normalization coefficient. The same applies to other drawings.

The encoder 61-2 computes the differential values between normalization coefficients corresponding to encoding units in adjacent bands and allocates a code having a small number of bits to a differential value having a high probability of appearance. Accordingly, normalization coefficients are encoded.

Figure 8:
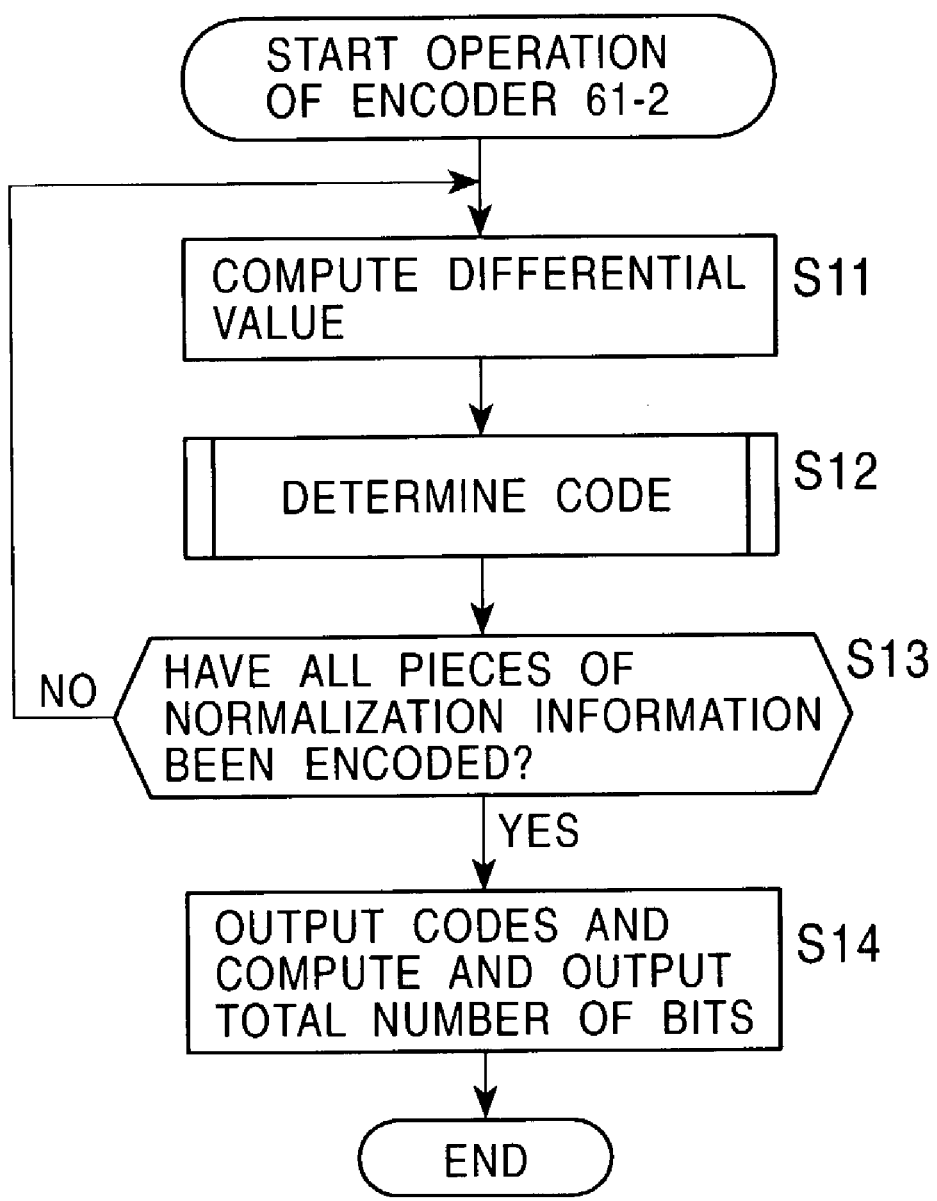
FIG. 8 is a flowchart illustrating the operation of an encoder 61-2.

The operation of the encoder 61-2 is shown in a flowchart of FIG. 8.

In step S11, it is assumed that the encoding unit that corresponds to the normalization coefficient $B_i$ is denoted by $A_I$. The encoder 61-2 computes the differential value between a normalization coefficient $B_{i(i=0, 1, \ldots 26)}$ to be encoded and a normalization coefficient $B_{i-1}$ corresponding to an encoding unit $A_{i-1}$ adjacent to the encoding unit $A_I$ at a lower frequency. For example, as shown in FIG. 9, the differential value corresponding to the normalization coefficient $B_1$ is −1 (=53 (normalization coefficient $B_1$)−54 (normalization coefficient $B_0$)). Indexes in FIG. 9 are the same as those shown in FIG. 5.

In step S12, the encoder 61-2 refers to a table $A_B$ shown in FIG. 10, reads a code corresponding to the differential value computed instep S11, and performs encoding.

In the table $A_B$, computable differential values are coordinated with codes. Of the differential values, differential values (for example, −4 to 2) having a high probability of appearance are coordinated with codes having a small number of bits.(2 bits to 4 bits). Specifically, a code having a small number of bits is allocated to a normalization coefficient B corresponding to a differential value having a high probability of appearance. As a result, the entirety of normalization coefficients B can be encoded by a small number of bits.

In step S13, the encoder 61-2 determines whether or not all the normalization coefficients B have been encoded. If it is determined that not all the normalization coefficients B have been encoded, the encoder 61-2 returns to step S11 and performs similar processing on the next normalization coefficient.

If it is determined in step S13 that all the normalization coefficients B have been encoded, in step S14, the encoder 61-2 outputs the code read in step S12 to a terminal connected to the switch 63, computes the total number of bits required to perform encoding, and outputs the computation result to the determination unit 62. Subsequently, the processing is terminated.

In the table $A_B$ (FIG. 10), all the computable differential values are coordinated with codes. Alternatively, as shown in FIG. 11, differential values (−4 to −2) having a high probability of appearance can be coordinated with codes having a small number of bits, as in the case of $A_B$. In contrast, for the other differential values, a table $B_B$ in which a predetermined procedure is coordinated to obtain a code can be used.

A procedure ("100+original" in FIG. 11;) for obtaining codes corresponding to differential values ("other" in FIG. 11) other than differential values having a high probability of appearance will now be described.

With this procedure, a code of a normalization coefficient for a differential value other than differential values having a high probability of appearance can be written by, as shown in FIG. 12, the 3 bits "100" (escape code) and a 6-bit index of the normalization coefficient to be encoded. The code is written in the order of $b_0$ to $b_8$. In other words, the normalization coefficient is encoded into 9 bits.

Using the table $B_B$, the normalization coefficients $B_0$ to $B_{26}$ are encoded. In this case, the total number of bits is, as indicated by the rightward arrow in FIG. 9, 100 bits. In other words, compared with a known case (162 bits), 62 bits can be saved.

A value corresponding to the "table $B_B$" in the drawing indicates the number of bits of codes of the normalization coefficients $B_0$ to $B_{26}$, which are obtained using the table $B_B$. The total (100) is indicated by the arrow. The same applies to other drawings.

FIG. 13 shows a table $C_B$ in which codes corresponding to differential values having a high probability of appearance are changed. The total number of bits of codes when the normalization coefficients $B_0$ to $B_{26}$ are encoded using the table $C_B$ is, as indicated by the rightward arrow in FIG. 9, 96 bits. Accordingly, the total number of bits of codes can be adjusted by changing differential values with a high probability of appearance and corresponding codes.

A value corresponding to the "table $C_B$" in the drawing indicates the number of bits of codes of the normalization coefficients $B_0$ to $B_{26}$, which are obtained using the table $C_B$. The total (96) is indicated by the arrow. The same applies to other drawings.

FIG. 14 shows a table $D_B$ in which another procedure for obtaining codes is coordinated with differential values other than differential values having a high probability of appearance.

According to the table $D_B$, a code of a normalization coefficient representing a differential value other than differential values having a high probability of appearance is regarded as data having an escape code representing the sign of the differential value ("1000" for the positive value and "1001" for the negative value), an escape code in accordance with the size of the differential value ("100"), and data of a size within a predetermined range based on the differential value. This data is written in order from $b_0$. In other words, a code of a normalization coefficient representing a differential value other than differential values having a high probability of appearance can have a variable length.

More specifically, when a differential value is from 4 to 7, the 4 bits "1000" and a value generated by performing variable-length encoding of the (differential value −4) by 2 bits to 4 bits are written in order from $b_0$. This data having a total of 6 bits to 8 bits is the encoded normalization coefficient.

When a differential value is from 8 to 11, the 4 bits "1000", the 3 bits "100", and a value generated by performing variable-length encoding of the (differential value −8) by 2 bits to 4 bits are written in order from $b_0$. This data having a total of 9 bits to 11 bits is the encoded normalization coefficient.

When a differential value is from 12 to 15, the 4 bits "1000", the 3 bits "100", and a value generated by performing variable-length encoding of the (differential value −12) by 2 bits to 4 bits are written in order from $b_0$. This data having a total of 12 bits to 14 bits is the encoded normalization coefficient.

When a differential value is from −7 to −4, the 4 bits "1001" and a value generated by performing variable-length encoding of the (differential value +4) by 2 bits to 4 bits are written in order from $b_0$. This data having a total of 6 bits to 8 bits is the encoded normalization coefficient.

When a differential value is from −12 to −8, the 4 bits "1001", the 3 bits "100", and a value generated by performing variable-length encoding of the (differential value +8) by 2 bits to 4 bits are written in order from $b_0$. This data having a total of 9 bits to 11 bits is the encoded normalization coefficient.

When a differential value is from −15 to −12, the 4 bits "1001", the 3 bits "100", and a value generated by performing variable-length encoding of the (differential value +12) by 2 bits to 4 bits are written in order from $b_0$. This data having a total of 12 bits to 14 bits is the encoded normalization coefficient.

The total number of bits of codes when the normalization coefficients $B_0$ to $B_{26}$ are encoded using the table $D_B$ is, as indicated by the rightward arrow in FIG. 9, 92 bits.

A value corresponding to the "table $D_B$" in the drawing indicates the number of bits of codes of the normalization coefficients $B_0$ to $B_{26}$, which are obtained using the table $D_B$. The total (92) is indicated by the arrow. The same applies to other drawings.

Figure 15:
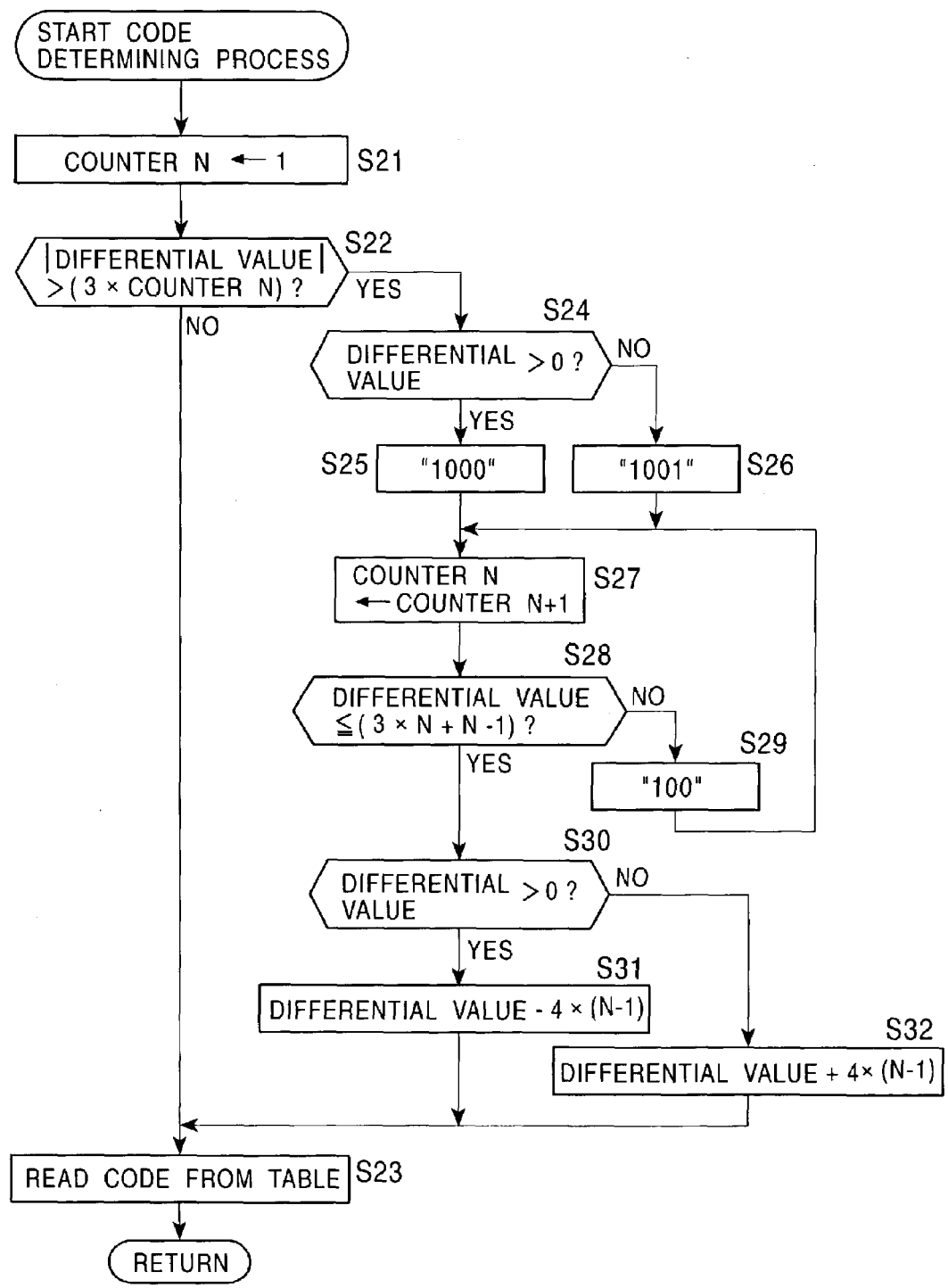
FIG. 15 is a flowchart illustrating the details of step S12 of FIG. 8.

The details of step S12 (FIG. 8) in which the encoder 61-2 uses the table $D_B$ to encode the normalization coefficients B will now be described with reference to a flowchart of FIG. 15.

In step S21, the encoder 61-2 initializes the value of a counter N to 1. In step S22, the encoder 61-2 determines whether or not the absolute value of the differential value computed in step S11 (FIG. 8) is greater than (3×the value of the counter N). If it is determined that the absolute value is not greater than (3×the value of the counter N), that is, if a differential value (−3 to 3) having a high probability of appearance is obtained, the encoder 61-2 proceeds to step S23.

In step S23, the encoder 61-2 refers to a table D and reads a code corresponding to the differential value having a high probability of appearance.

In contrast, if it is determined in step S22 that the absolute value of the differential value is greater than (3×the value of the counter N), that is, if a differential value other than that with a high profanity of appearance is obtained, the encoder 61-2 proceeds to step S24.

In step S24, the encoder 61-2 determines whether or not the differential value is a positive value. If it is determined that the differential value is a positive value, in step S25, the encoder 61-2 writes the 4 bits "1000" in order from $b_0$ of the bit configuration representing a code of the normalization coefficient B in the end (hereinafter referred to as the code bit configuration). In contrast, if it is determined in step S24 that the differential value is not a positive value (if the differential value is a negative value), in step S26, the encoder 61-2 writes the 4 bits "1001" in order from $b_0$ of the code bit configuration.

After the processing in step S25 or step S26, in step S27, the encoder 61-2 increments the value of the counter N by one and proceeds to step S28.

In step S28, the encoder 61-2 determines whether or not the absolute value of the differential value is less than or equal to (3×the value of the counter N+the value of the counter N−1). If it is determined that the absolute value is not less than or equal to (3×the value of the counter N+the value of the counter N−1), in step S29, the encoder 61-2 writes the 3 bits "100" subsequent to the code bit configuration. Subsequently, the processing returns to step S27, and the processing from step S27 onward is performed. Specifically, the 3 bits "100" is repeatedly written subsequent to the code bit configuration until it is determined in step S28 that the differential value is less than or equal to (3×the value of the counter N+the value of the counter N−1).

If it is determined in step S28 that the differential value is, less than or equal to (3×the value of the counter N+the value of the counter N−1), in step S30, the encoder 61-2 determines whether or not the differential value is a positive value. If it is determined that the differential value is a positive value, the encoder 61-2 proceeds to step S31.

In step S31, the encoder 61-2 uses (the differential value −4×(the value of the counter N−1)) as a new differential value and proceeds to step S23. In step S23, a code corresponding to the new differential value is read from the table and written subsequent to the code bit configuration. Accordingly, the encoding of the normalization coefficient is terminated.

In contrast, if it is determined in step S30 that the differential value is a negative value, the encoder 61-2 proceeds to step S32. In step S32, the encoder 61-2 uses (the differential value +4×(the value of the counter N−1)) as a new differential value and proceeds to step S23. In step S23, a code corresponding to the new differential value is read from the table and written subsequent to the code bit configuration. Accordingly, the encoding of the normalization coefficient is terminated.

If the encoding of the normalization coefficient is terminated in step S23, the processing is terminated. Subsequently, the processing proceeds to step S13 in FIG. 8.

FIG. 16 shows another table $E_B$.

According to the table $E_B$, for example, when a differential value is from 4 to 6, the 4 bits "1000" and a value generated by performing variable-length encoding of (the differential value −4) by 2 bits or 3 bits are written in order from $b_0$. This data having a total of 6 bits or 7 bits is the encoded normalization coefficient.

If the absolute value of a differential value is greater than or equal to 7, the 4 bits "1001" and the 6-bit normalization coefficient are written in order from $b_0$. This data having a total of 10 bits is the encoded normalization coefficient.

When a differential value is from −6 to −4, the 4 bits "1000" and a value generated by performing variable-length encoding of (the differential value +3) by 3 bits or 4 bits are written in order from $b_0$. This data having a total of 7 bits or 8 bits is the encoded normalization coefficient.

If the value of a differential value is less than or equal to −7, the 4 bits "1001" and the 6-bit normalization coefficient B are written in order from $b_0$. This data having a total of 10 bits is the encoded normalization coefficient.

In other words, according to the table $E_B$, the code of the normalization coefficient can have a variable-length or a fixed length depending on the size of the differential value.

The total number of bits of codes when the normalization coefficients $B_0$ to $B_{26}$ are encoded using the table $E_B$ is, as indicated by the rightward arrow in FIG. 9, 95 bits.

A value corresponding to the "table $E_B$" in the drawing indicates the number of bits of codes of the normalization coefficients $B_0$ to $B_{26}$, which are obtained using the table $E_B$. The total (95) is indicated by the arrow. The same applies to other drawings.

Figure 17:
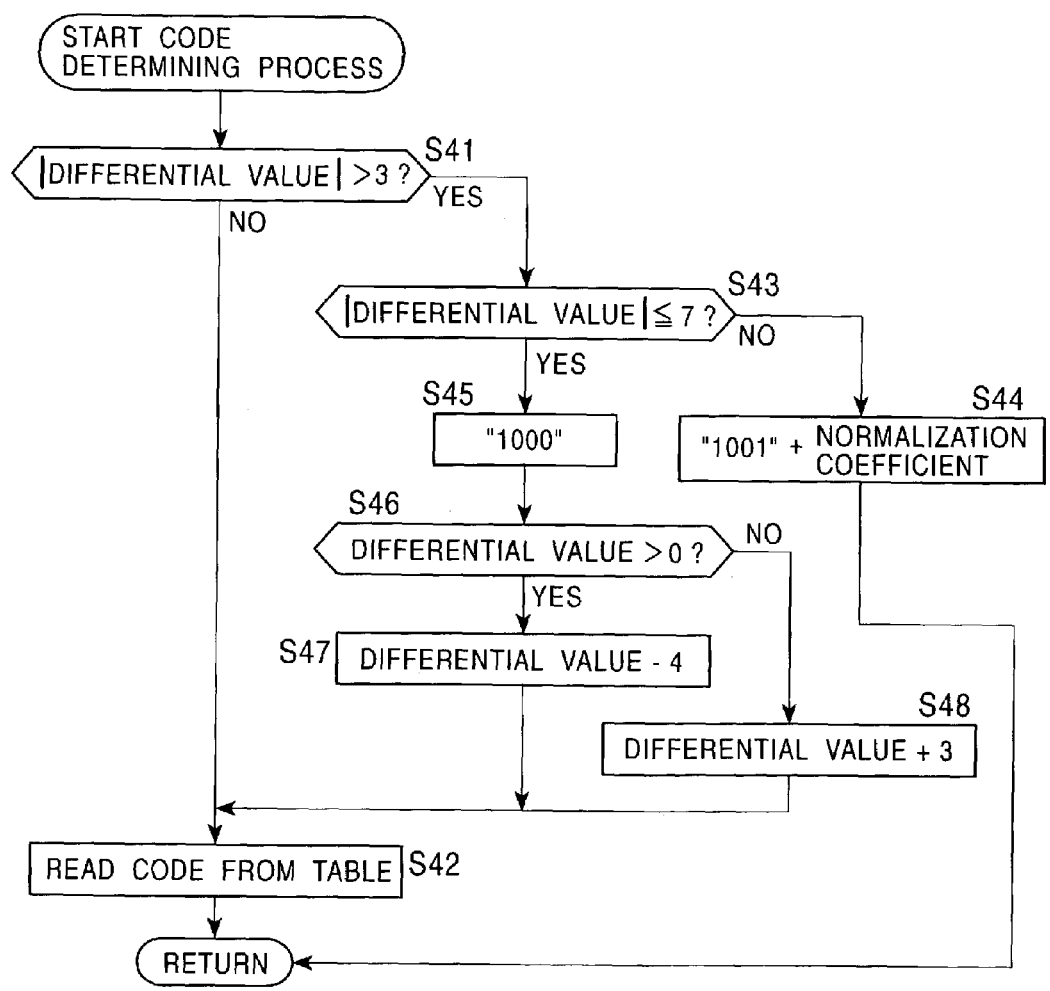
FIG. 17 is another flowchart illustrating the details of step S12 of FIG. 8.

The details of step S12 (FIG. 8) in which the normalization coefficients B are encoded using the table $E_B$ will now be described with reference to a flowchart of FIG. 17.

In step S41, the encoder 61-2 determines whether or not the absolute value of the differential value computed in step S11 (FIG. 8) is greater than 3. If it is determined that the absolute value is not greater than 3, that is, if a differential value (−3 to 3) having a high probability of appearance is obtained, the encoder 61-2 proceeds to step S42.

In step S42, the encoder 61-2 refer to a table E and reads codes corresponding to differential values having a high probability of appearance.

In contrast, if it is determined in step S41 that the absolute value of the differential value is greater than 3, that is, if the differential value other than that having a high probability of appearance is obtained, in step S43, the encoder 61-2 determines whether or not the absolute value of the differential value is less than or equal to 7. If it is determined that the absolute value is not less than or equal to 7 (greater than 7), the encoder 61-2 proceeds to step S44.

In step S44, the encoder 61-2 writes the 4 bits "1001" and the 6-bit normalization coefficient value in order from $b_0$ of the bit configuration (code bit configuration) representing the code of the normalization coefficient in the end. Accordingly, the encoding of the normalization coefficient is terminated.

If it is determined in step S43 that the absolute value of the differential value is less than or equal to 7, in step S45, the encoder 61-2 writes the 4 bits "1000" in order from $b_0$ of the code bit configuration.

In step S46, the encoder 61-2 determines whether or not the differential value is a positive value. If it is determined that the differential value is a positive value, in step S47, the encoder 61-2 regards (the differential value −4) as a new differential value and proceeds to step S42.

In contrast, if it is determined in step S46 that the differential value is a negative value, in step S48, the encoder 61-2 uses (the differential value +3) as a new differential value and proceeds to step S42.

When a code is read from the table in step S42 and the encoding of the normalization coefficient is completed, the processing is terminated. Subsequently, the encoder 61-2 proceeds to step S13 in FIG. 8.

An encoding method for the encoder 61-3 will now be described.

As described above, the normalization coefficients vary smoothly in the frequency direction. In many cases, the values decrease from lower to higher frequencies. In other words, by adding a weight value which increases step-by-step from lower to higher frequencies to each normalization coefficient, the differential value between normalization coefficients corresponding to encoding units in adjacent bands can be reduced, and hence the frequency of appearance of a differential value having a high frequency of occurrence of appearance can be further increased.

The encoder 61-3 adds a weight value which increases step-by-step from lower to higher frequencies to each of the normalization coefficients B. The encoder 61-3 computes the differential value between the normalization coefficients B, corresponding to encoding units in adjacent bands, to which the weight values are added (hereinafter referred to as weighted normalization coefficients BW). The encoder 61-3 allocates a code having a small number of bits to a differential value having a high probability of appearance to encode the normalization coefficients B.

Figure 18:
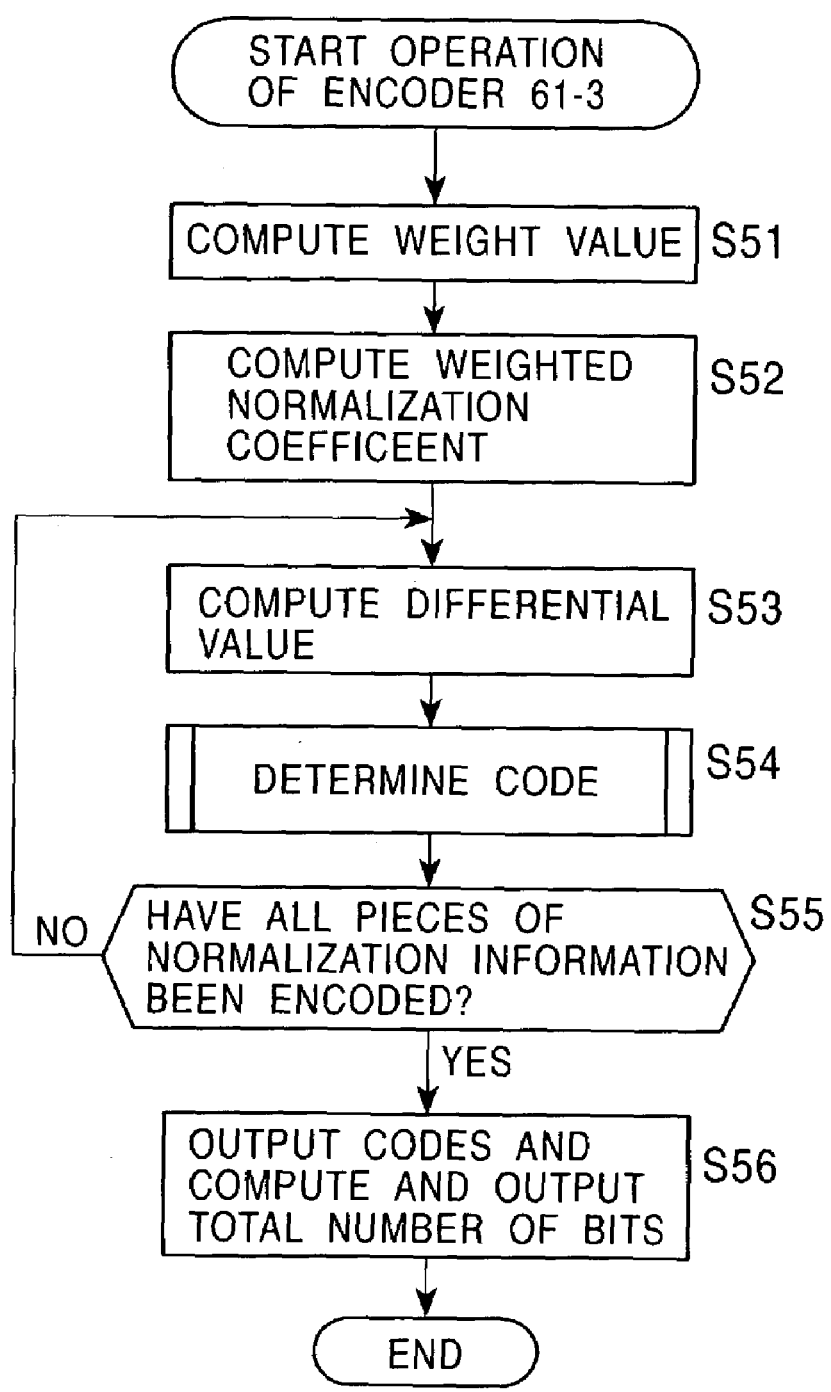
FIG. 18 is a flowchart illustrating the operation of an encoder 61-3.

The operation of the encoder 61-3 is shown in a flowchart of FIG. 18.

In step S51, the encoder 61-3 computes a weight value to be added to each normalization coefficient B. Specifically, for example, (i/slope of weight curve (3 in this example)) is computed, and an integer portion thereof is used as the weight value for the normalization coefficient $B_i$. In other words, as shown in FIG. 19, the weight value for the normalization coefficients $B_0$ to $B_2$ is 0; the weight value for the normalization coefficients $B_3$ to $B_5$ is 1; the weight value for the normalization coefficients $B_6$ to $B_8$ is 2; the weight value for the normalization coefficients $B_9$ to $B_{11}$ is 3; the weight value for the normalization coefficients $B_{12}$ to $B_{14}$ is 4; the weight value for the normalization coefficients $B_{15}$ to $B_{17}$ is 5; the weight value for the normalization coefficients $B_{18}$ to $B_{20}$ is 6; the weight value for the normalization coefficients $B_{21}$ to $B_{23}$ is 7; and the weight value for the normalization coefficients $B_{24}$ to $B_{26}$ is 8. The index values shown in FIG. 19 are the same as those shown in FIG. 5.

In step S52, the encoder 61-3 adds the weight values computed in step S51 to the corresponding normalization coefficients B, thus obtaining weighted normalization coefficients BW.

In step S53, the encoder 61-3 computes the differential value between the weighted normalization coefficient $BW_i$ obtained from the normalization coefficient $B_i$ to be encoded and the weighted normalization coefficient $BW_{i-1}$ obtained from the normalization coefficient $B_{i-1}$ corresponding to the encoding unit $A_{i-1}$ adjacent to the lower side of the encoding unit $A_i$ corresponding to the normalization coefficient $B_i$. For example, the differential value corresponding to the normalization coefficient $B_1$ is, as shown in FIG. 19, −1 (=53 (weighted normalization coefficient $BW_1$)−54 (weighted normalization coefficient $BW_0$)).

In steps from S54 to S56, processing similar to that in steps from S12 to S14 of FIG. 8 is performed, and a description thereof is omitted.

The total numbers of bits of codes obtained in cases in which the encoder 61-3 encodes the normalization coefficients $B_0$ to $B_{26}$ using the table $B_B$ (FIG. 11), the table $C_B$ (FIG. 13), the table $D_B$ (FIG. 14), and the table $E_B$ (FIG. 16) are, as indicated by the rightward arrows in FIG. 19, 104 bits, 90 bits, 89 bits, and 91 bits, respectively. In other words, compared with a known case (162 bits), 58 bits, 72 bits, 73 bits, or 71 bits can be saved. Also, compared with a case in which no weight value is added (FIG. 9), bits can be saved except for a case in which the table $B_B$ is used.

Prior to starting the encoding processing, which is described with reference to the flowchart of FIG. 6, the above-described encoder 61-1 can compute weight values by processing corresponding to step S51 described above and can compute weighted normalization coefficients BW by processing corresponding to step S52. In other words, in this case, processing in steps S1 to S11 is performed on the weighted normalization coefficients BW.

An encoding method for the encoder 61-4 (FIG. 4) will now be described.

Figure 20:
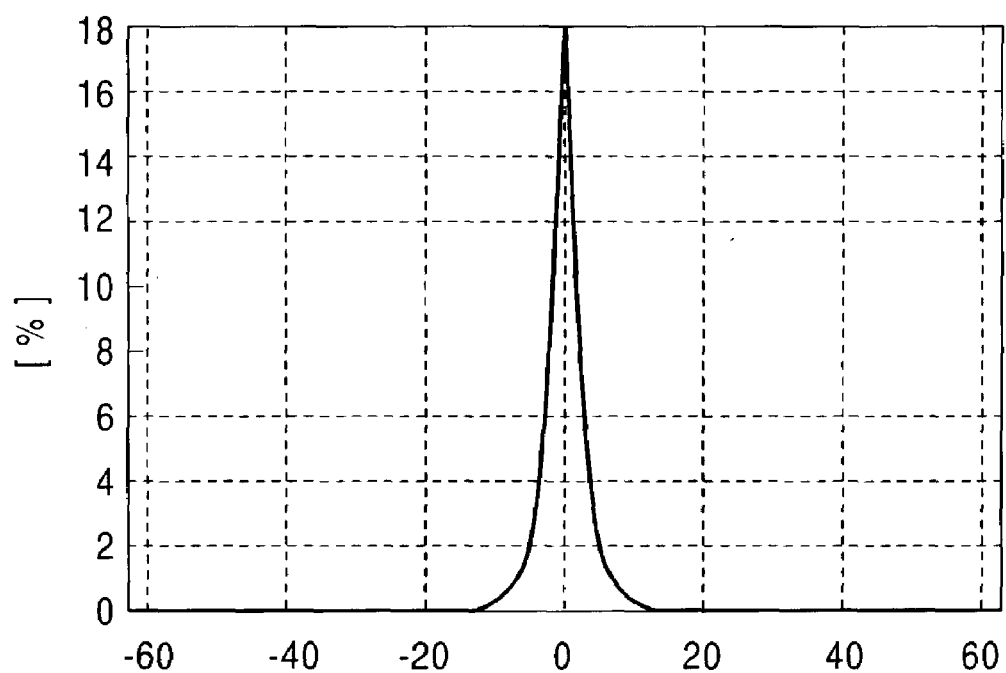
FIG. 20 is another illustration of a distribution of the differential values.

In many cases, audio signals smoothly vary in power with time. A particular biased distribution (having a high probability near 0), such as that shown in FIG. 20, can be obtained from differential values between normalization coefficients that are temporarily adjacent to each other.

Figure 21:
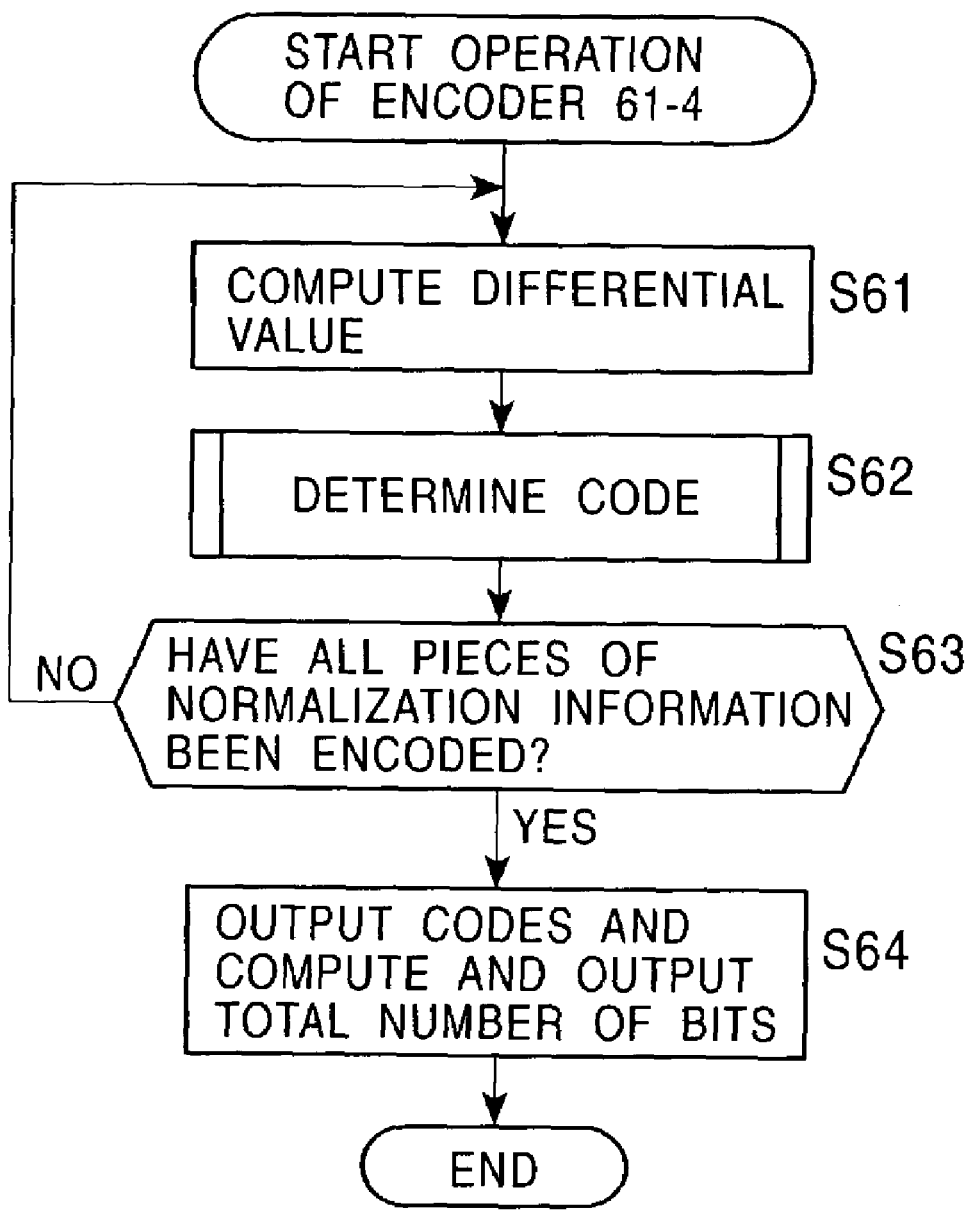
FIG. 21 is a flowchart illustrating the operation of an encoder 61-4.

The encoder 61-4 computes the differential value between normalization coefficients that are temporarily adjacent to each other and allocates a code having a small number of bits to a differential value having a high probability of appearance to encode normalization coefficients The operation of the encoder 61-4 is shown in a flowchart of FIG. 21.

In step S61, the encoder 61-4 computes the differential value between the normalization coefficient $B_i$ of the current frame and the normalization coefficient $B_i$ of a frame one frame temporarily prior to the current frame. For example, as shown in FIG. 22, the differential value corresponding to the normalization coefficient $B_1$ is −1 (=53 (normalization coefficient $B_1$ of the current frame)−54 (normalization coefficient $B_1$ of the frame one frame prior to the current frame)). The normalization integers B of the current frame shown in FIG. 22 are the same as those shown in FIG. 5.

In step S62 to S64, processing similar to that in steps S12 to S14 of FIG. 8 is performed, and a description thereof is omitted.

The total numbers of bits of codes obtained in cases in which the encoder 61-4 encodes the normalization coefficients $B_0$ to $B_{26}$ using the table $B_B$, the table $C_B$, the table $D_B$, and the table $E_B$ are, as indicated by the rightward arrows in FIG. 22, 96 bits, 105 bits, 93 bits, and 98 bits, respectively.

An encoding method for the encoder 61-5 will now be described.

Figure 23:
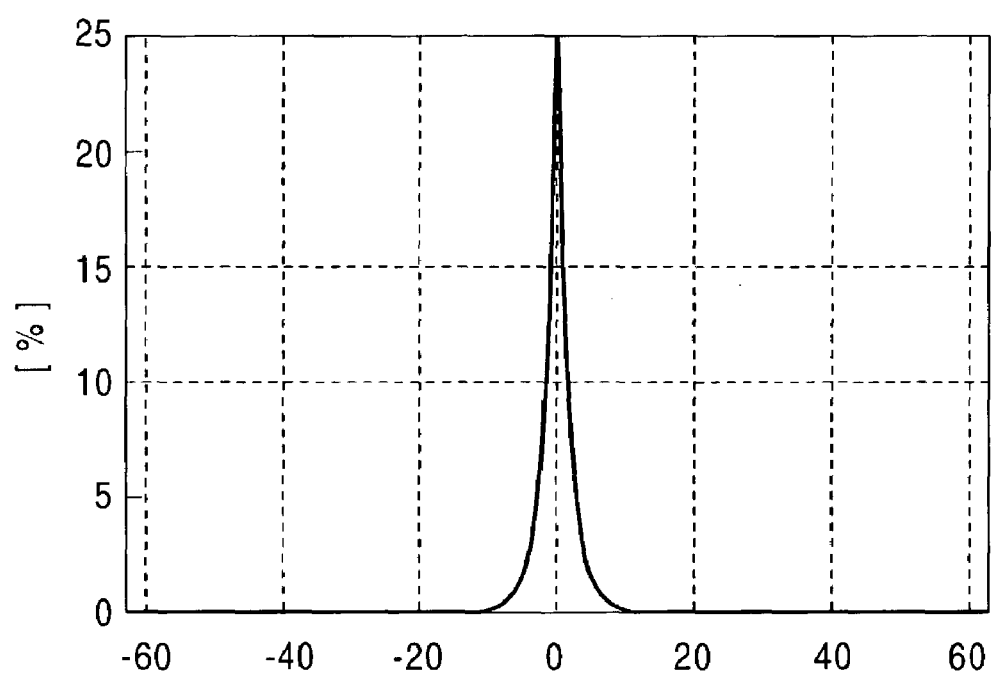
FIG. 23 is another illustration of a distribution of the differential values.

In many cases, left-signal and right-signal channels of a stereo audio signal have similar power (the correlation between channels is high). Thus, normalization coefficients $B_L$ of a left signal and normalization coefficients $B_R$ of a right signal are close to each other. As a result, as shown in FIG. 23, the differential values between the normalization coefficients $B_L$ of a left signal and the normalization coefficients $B_R$ of a right signal have a particular biased distribution (a distribution in which the differential values near 0 have high probabilities).

The encoder 61-5 computes the differential values between the normalization coefficients $B_L$ of a corresponding left signal and the normalization coefficients $B_R$ of a corresponding right signal and allocates a code having a small number of bits to a differential value having a high probability of appearance to encode the normalization coefficients B.

It is assumed that normalization coefficients $B_{L0}$ to $B_{L26}$ of encoding units $A_{L0}$ to $A_{L26}$ generated by separating a left signal into 27 bands and normalization coefficients $B_{R0}$ to $B_{R26}$ of encoding units $A_{R0}$ to $A_{R26}$ generated by separating a right signal into 27 bands are input to the encoder 61-5.

Figure 24:
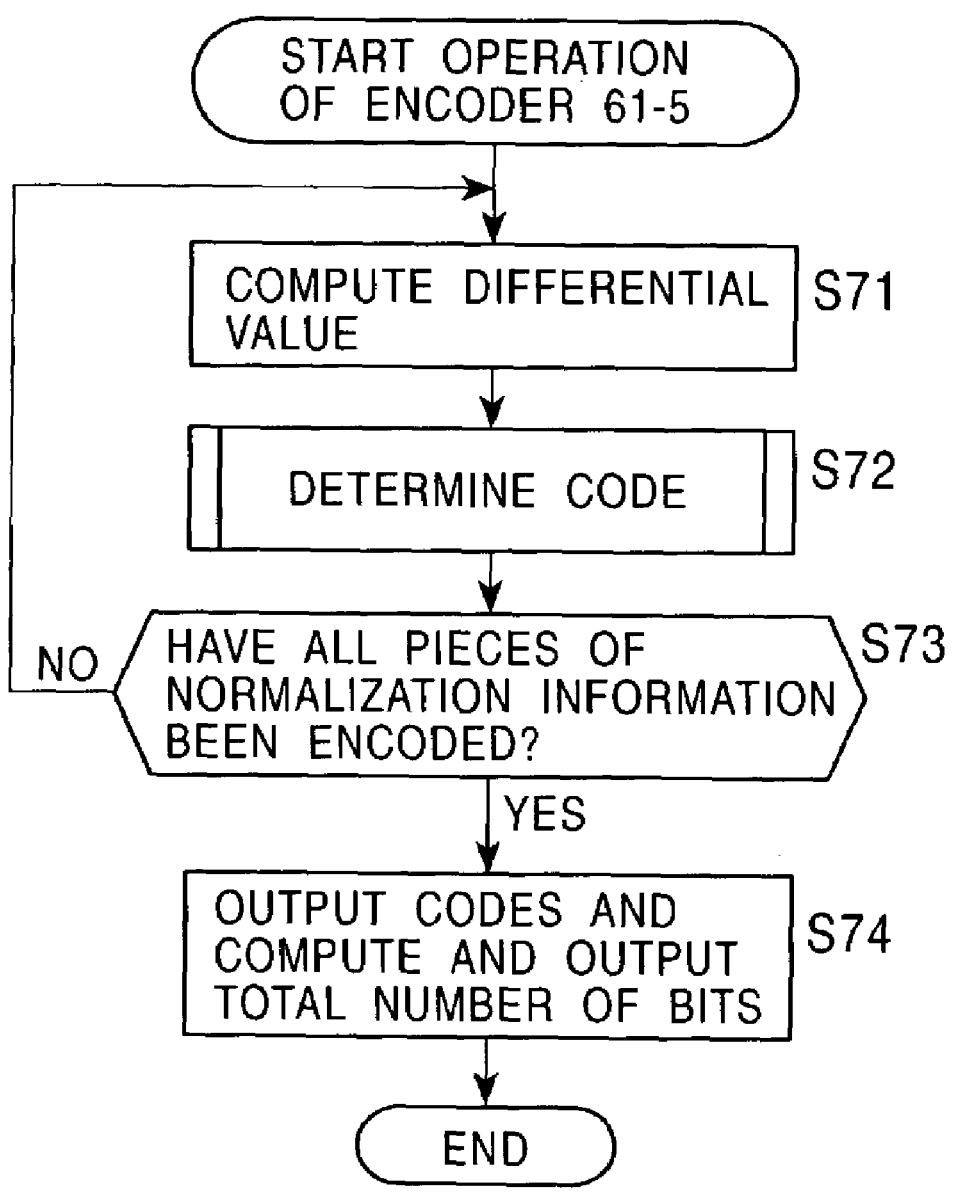
FIG. 24 is a flowchart illustrating the operation of an encoder 61-5.

The operation of the encoder 61-5 is shown in a flowchart of FIG. 24.

In step S71, the encoder 61-5 computes the corresponding differential values between the normalization coefficients $B_{Li}$ and the normalization coefficients $B_{Ri}$ to be encoded. For example, as shown in FIG. 25, the differential value corresponding to the normalization coefficient $B_{L1}$ and the normalization coefficient $B_{R1}$ is 1 (=54 (normalization coefficient $B_{L1}$)−53 (normalization coefficient $B_{R1}$)).

In steps S72 to S74, processing similar to that in steps S12 to S14 of FIG. 8 is performed, and a detailed description thereof is omitted.

The total numbers of bits of codes obtained in cases in which the encoder 61-5 encodes the normalization coefficients $B_{L0}$ to $B_{L26}$ and the normalization coefficients $B_{R0}$ to $B_{R26}$ using the table $B_B$, the table $C_B$, the table $D_B$, and the table $E_B$ are, as indicated by the rightward arrows in FIG. 25, 96 bits, 91 bits, 84 bits, and 84 bits, respectively.

An encoding method for the encoder 61-6 will now be described.

Figure 26:
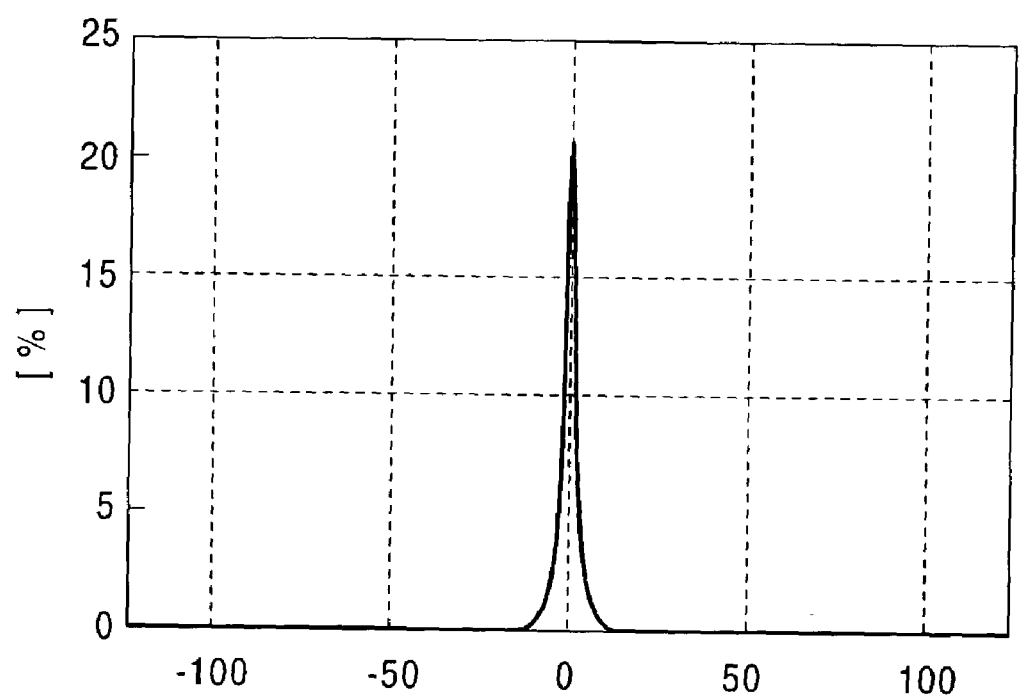
FIG. 26 is another illustration of a distribution of the differential values.

As described above, normalization coefficients are highly correlated between adjacent bands (frequency direction) and channels. When differential values in the frequency direction are computed from differential values between channels, the differential values have, as shown in FIG. 26, a particular biased distribution (a distribution in which the differential values near 0 have high probabilities).

The encoder 61-6 computes the differential values LR between the normalization coefficients $B_L$ of a corresponding left signal and the normalization coefficients $B_R$ of a corresponding right signal. Subsequently, the encoder 61-6 computes the differential values F in the frequency direction between these differential values LR. The encoder 61-6 allocates a code having a small number of bits to the differential value F having a high probability of appearance to encode the normalization coefficients B.

Figure 27:
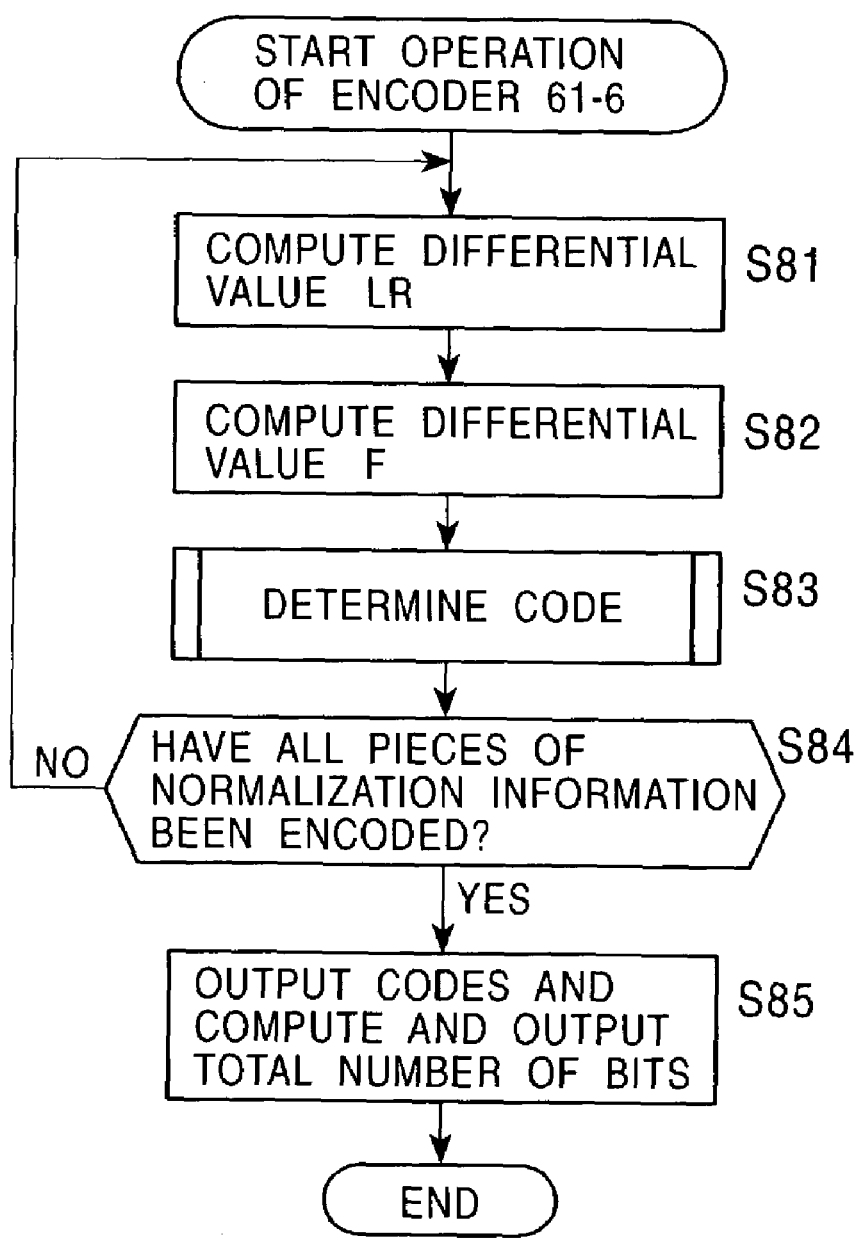
FIG. 27 is a flowchart illustrating the operation of an encoder 61-6.

The operation of the encoder 61-6 is shown in a flowchart of FIG. 27.

In step S81, the encoder 61-6 computes the differential values LR between the corresponding normalization coefficients $B_L$ and the normalization coefficients $B_R$. For example, as shown in FIG. 28, the differential value LR between the normalization coefficient $B_{L1}$ and the normalization coefficient $B_{R1}$ is 1 (=54 (normalization coefficient $B_{L1}$)−53 (normalization coefficient $B_{R1}$)).

In step S82, the encoder 61-6 computes the differential value F between the differential value LR between the normalization coefficient $B_{Li}$ and the normalization coefficient $B_{Ri}$ to be encoded and the differential value LR between the normalization coefficient $B_{Li-1}$ and the normalization coefficient $B_{Ri-1}$. The normalization coefficients $B_{Li-1}$ and the normalization coefficient $B_{Ri-1}$ correspond to encoding units $A_{Li-1}$ and $A_{Ri-1}$ adjacent to the lower side of an encoding unit $A_{Li}$ and an encoding unit $A_{Ri}$ corresponding to the normalization coefficient $B_{Li}$ and the normalization coefficient $B_{Ri}$. For example, as shown in FIG. 28, the differential value F corresponding to the normalization coefficient $B_{L1}$ and the normalization coefficient $B_{R1}$ is 0 (=1−1).

In steps S83 to S85, processing similar to that in steps S12 to S14 of FIG. 8 is performed, and a description thereof is omitted.

The total numbers of bits of codes obtained in cases in which the encoder 61-6 encodes the normalization coefficients $B_0$ to $B_{26}$ using the table $B_B$, the table $C_B$, the table $D_B$, and the table $E_B$ are, as indicated by the rightward arrows in FIG. 28, 114 bits, 90 bits, 89 bits, and 91 bits, respectively.

As described above, the encoders 61-1 to 61-6 of the normalization coefficient encoder 51 encode normalization coefficients using predetermined encoding methods.

The quantization accuracy information encoder 52 will now be described.

Figure 29:
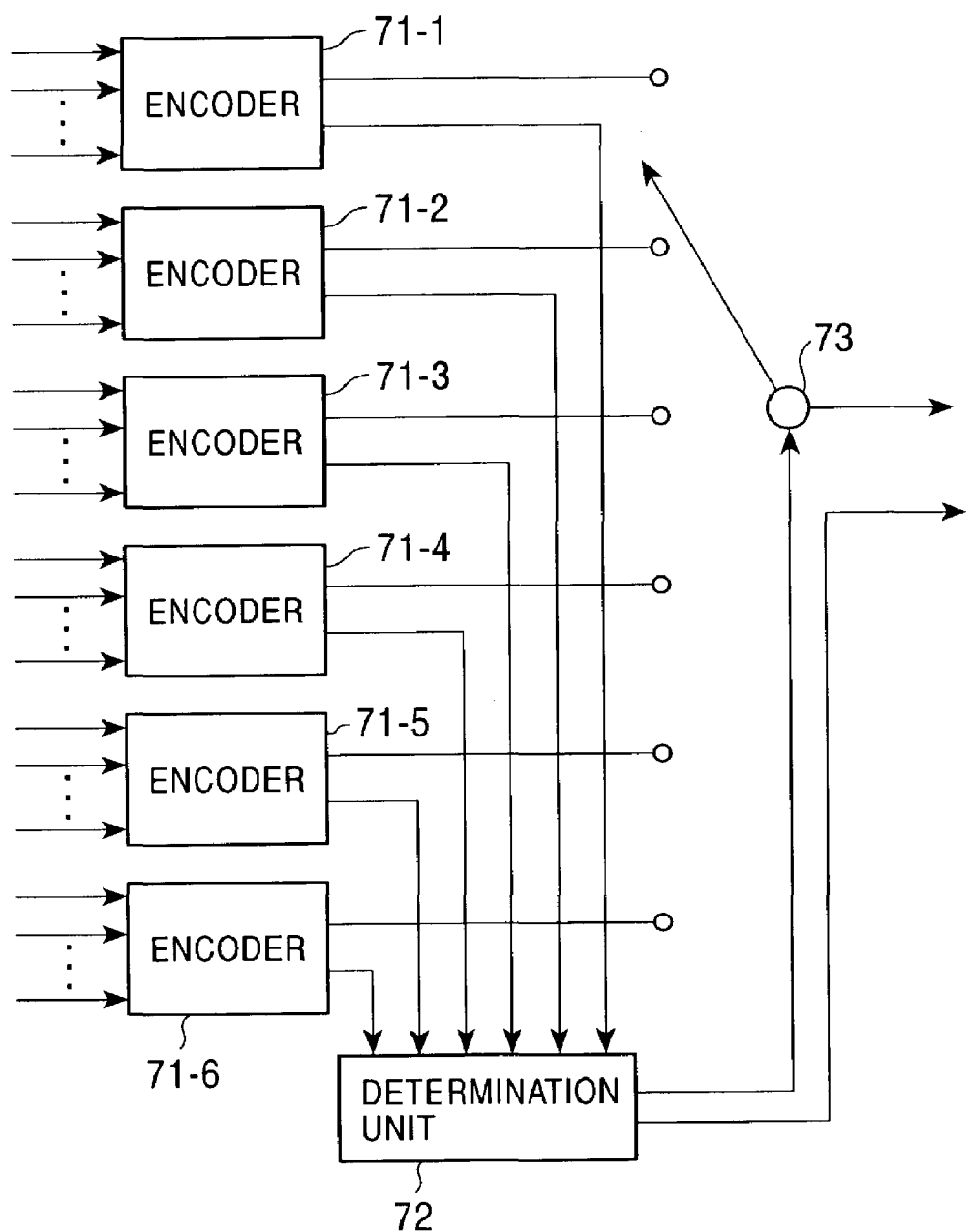
FIG. 29 is a block diagram showing an example of the configuration of a quantization accuracy information encoder 52.

FIG. 29 shows an example of the configuration of the quantization accuracy information encoder 52. In this case, the quantization accuracy information encoder 52 has six encoders 71-1 to 71-6. The number of encoders 71 is not limited to six. It is only required that there be a plurality of encoders 71.

The encoders 71-1 to 71-6 each encode quantization accuracy information $D_0$ to $D_{26}$ by methods described below and output the encoded quantization accuracy information $D_0$ to $D_{26}$ to terminals connected to a switch 73. Also, the encoders 71-1 to 71-6 each compute the total number of bits of codes obtained by encoding the quantization accuracy information $D_0$ to $D_{26}$ and output the computation results to a determination unit 72.

The determination unit 72 selects the encoder 71 that has output a minimum number of bits of the total number of bits of the codes from the encoders 71-1 to 71-7 and controls the switch 73 so that the code output by the selected encoder 71 can be output to the multiplexer 5. The determination unit 72 outputs information relating to an encoding method for the selected encoder 71 to the multiplexer 5.

Each of the encoders 71-1 to 71-7 will now be described.

An encoding method for the encoder 71-1 will now be described.

Generally, quantization accuracy information values do not change greatly at higher frequencies. Thus, pieces of quantization accuracy information for encoding units at higher frequencies often have similar values.

In encoding units in a predetermined band or higher, the encoder 71-1 subtracts, from the quantization accuracy information for each encoding unit, a minimum value of the quantization accuracy information of these encoding units. As a result, the encoder 71-1 encodes the quantization accuracy information and outputs the encoded quantization accuracy information. In this case, quantization accuracy information for an encoding unit below a predetermined band is not encoded and is output in its original form.

Figure 30:
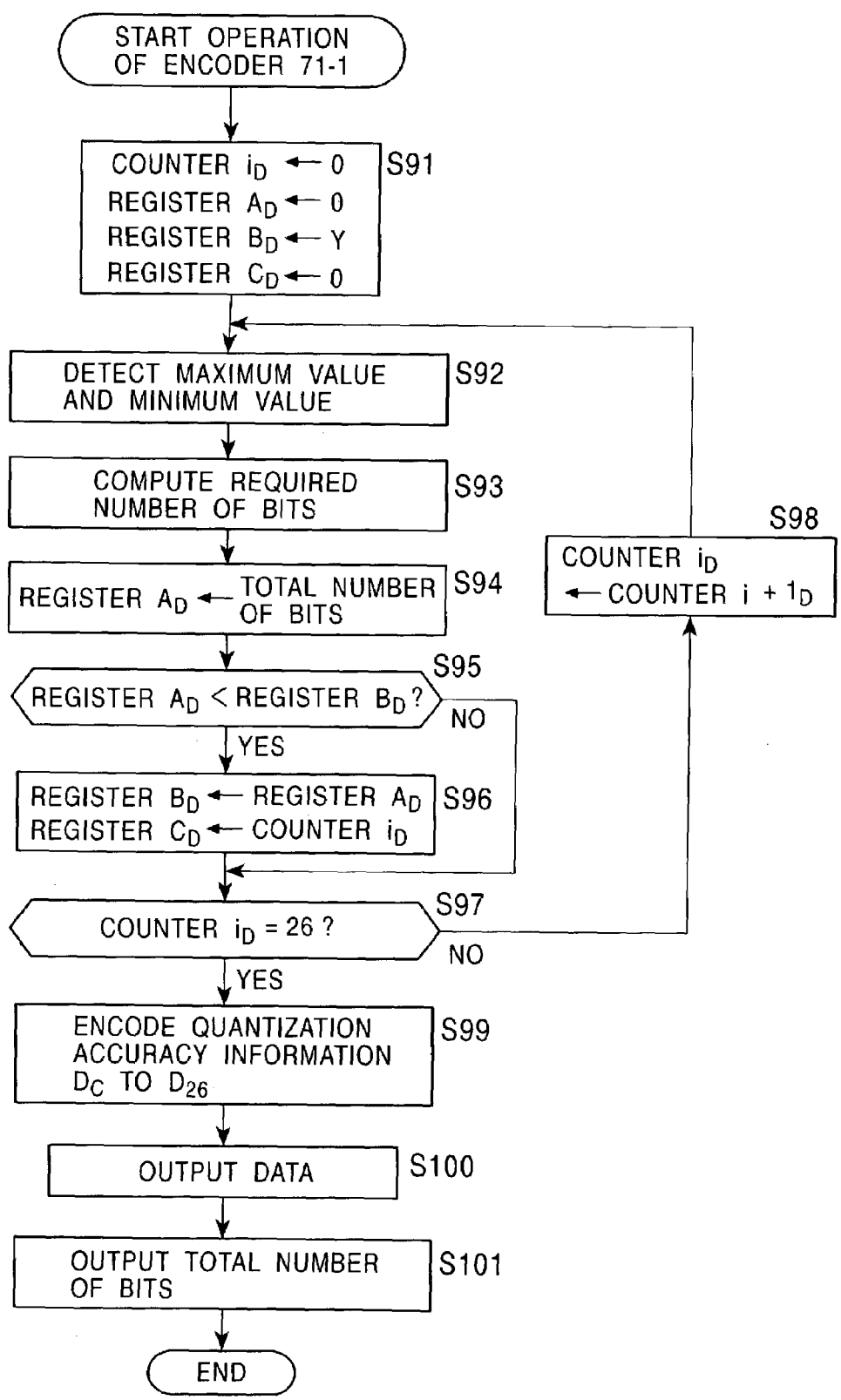
FIG. 30 is a flowchart illustrating the operation of an encoder 71-1.

The operation of the encoder 71-1 is shown in a flowchart of FIG. 30.

In step S91, the encoder 71-1 initializes the value of a built-in counter $i_D$ to 0, the value of a built-in register $A_D$ to 0, the value of a built-in register $B_D$ to the value Y, which is sufficiently greater than a value computed in the following step S94, and the value of a built-in register $C_D$ to 0.

In step S92, the encoder 71-1 detects a maximum value and a minimum value of quantization accuracy information $D_{i(i=0, 1, \ldots 26)}$ to $D_{26}$ (the quantization accuracy information corresponding to the encoding unit $A_{26}$ at the highest frequency) specified by the value of the counter $i_D$.

When the quantization accuracy information $D_0$ to $D_{26}$ have values (indexes) such as those shown in FIG. 31, for example, if the counter $i_D=14$, the value 2 is detected as the maximum value, and the value 1 is detected as the minimum value.

In step S93, the encoder 71-1 computes the difference between the maximum value and the minimum value detected in step S92 and obtains the number of bits that can represent the computation result as the required number of bits.

The difference between the maximum value 2 and the minimum value 1 when the counter $i_D=14$ is 1. Thus, 1 bit is computed as the required number of bits.

In step S94, the encoder 71-1 computes the total number of bits by computing the sum of the number of bits of data representing the value of the counter $i_D$, the number of bits of data representing the minimum value detected in step S92, the number of bits of data representing the required number of bits, which is obtained in step S93, the required number of bits×the number of pieces of the quantization accuracy information $D_i$ to $D_{26}$, and 3 bits×the number of pieces of the quantization accuracy information $D_0$ to $D_{i-1}$. The encoder 71-1 stores the computed total number of bits in the register $A_D$ (overwrites).

For example, when the counter $i_D=14$, 65 bits, which is the sum of 5 bits of data representing the value 14 of the counter $i_D$, 3 bits of data representing the minimum value 1, 2 bits of data representing 1 bit, i.e., the required number of bits, the required number of bits (2 bits)×13 (the number of pieces of the quantization accuracy information $D_{14}$ to $D_{26}$), and 3 bits×14 (the number of pieces of the quantization accuracy information $D_0$ and $D_{13}$), is regarded as the total number of bits and is stored in the register $A_D$.

In step S95, the encoder 71-1 determines whether or not the value of the register $A_D$ is less than the value of the register $B_D$. If it is determined that the value of the register $A_D$ is less than the value of the register $B_D$, in step S96, the encoder 71-1 stores the value of the register $A_D$ in the register $B_D$ (overwrites) and stores the value of the counter $i_D$ at that time in the register $C_D$ (overwrites).

In step S97, the encoder 71-1 determines whether or not the value of the counter $i_D$ is 26. If it is determined that the value of the counter $i_D$ is not 26, in step S98, the encoder 71-1 increments the value of the counter $i_D$ by one and returns to step S92.

Specifically, the processing in steps S92 to S98 is repeated until it is determined in step S97 that the value of the counter $i_D$ is 26. Thus, the minimum value of the total number of bits computed in step S94 is stored in the register $B_D$, and the value of the counter $i_D$ at that time is stored in the register $C_D$.

In the example shown in FIG. 31, the total number of bits is minimized when the counter $i_D=14$. Thus, the total number of bits (65) computed when the counter $i_D=14$ is registered in the register $B_D$, and 14 is registered in the register $C_D$.

When it is determined in step S97 that the value of the counter $i_D$ is 26, in step S99, the encoder 71-1 subtracts the minimum value of the quantization accuracy information $D_C$ to $D_{26}$ from each of the quantization accuracy information $D_C$ to $D_{26}$ specified by the value of the register $C_D$. As a result, the pieces of the quantization accuracy information $D_C$ to $D_{26}$ are encoded.

In this case, since the register $C_D=14$, the minimum value 1 is subtracted from each of the quantization accuracy information $D_{14}$ to $D_{26}$. In other words, the pieces of the quantization accuracy information $D_{14}$ to $D_{26}$ are encoded.

In step S110, the encoder 71-1 outputs, to corresponding terminals connected to the switch 73, the value of the register $C_D$ using data having a predetermined number of bits, the minimum value of the quantization accuracy information $D_C$ to $D_{26}$ using data having a predetermined number of bits, the required number of bits at that time using data having a predetermined number of bits, each code of the quantization accuracy information $D_C$ to $D_{26}$ computed in step S99 using data having the required number of bits, and the quantization accuracy information $D_0$ to $D_{C-1}$ using data having a predetermined number of bits.

In this case, the value of the register $C_D$, that is, 14, is output using 5-bit data; the minimum value 1 is output using 3-bit data; the required number of bits, that is, 1 bit, is output using 2-bit data; each code of the quantization accuracy information $D_{14}$ to $D_{26}$ is output using 1-bit data; and the quantization accuracy information $D_0$ to $D_{13}$ (the quantization accuracy information D (indexes) themselves) are each output using 3-bit data.

In step S101, the encoder 71-1 assumes the value of the register $B_D$ as the amount of encoding by the encoder 71-1 and outputs the value to the determination unit 72.

In this case, since the total number of bits (65) computed when the counter i=14 is registered in the register $B_D$, 65 is sent to the determination unit 72. In other words, compared with 81 bits in a known case, 16 bits (=81−65) can be saved while encoding the quantization accuracy information D.

An encoding method for the encoder 71-2 will now be described.

Figure 32:
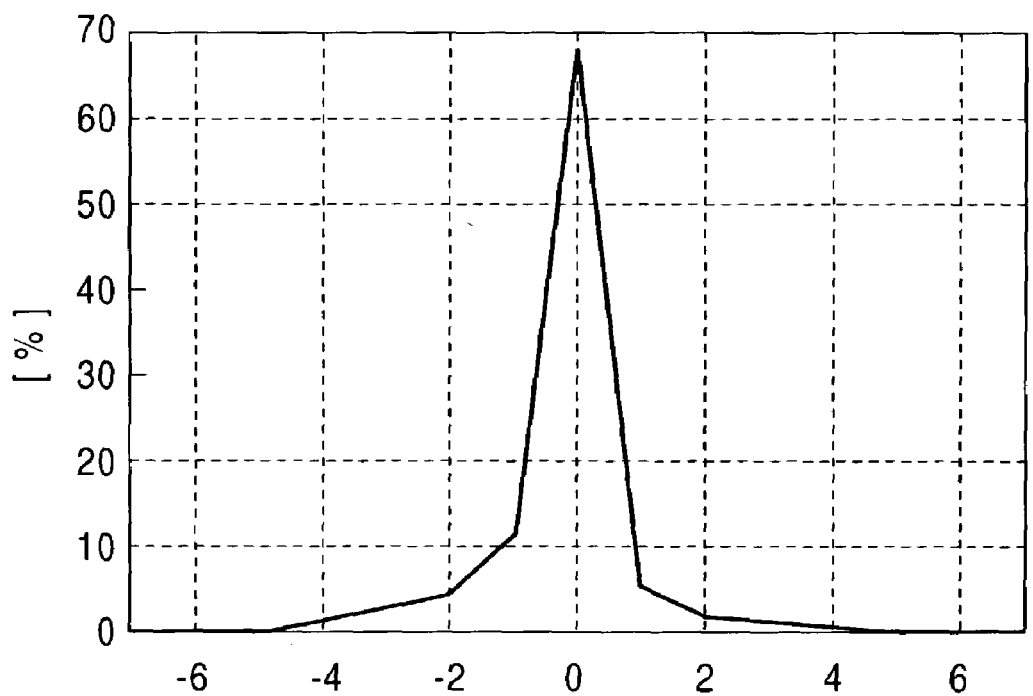
FIG. 32 is an illustration of another distribution of the differential values.

In many cases, as in normalization coefficients, quantization accuracy information smoothly varies in the frequency direction, and the correlation in the frequency direction is high. In other words, a particular biased distribution, such as that shown in FIG. 32, can be obtained from differential values between pieces of quantization accuracy information corresponding to encoding units in adjacent bands.

The encoder 71-2 computes the differential values between quantization accuracy information corresponding to encoding units in adjacent bands and allocates a code having a small number of bits to a differential value having a high probability of appearance. Accordingly, quantization accuracy information is encoded.

Figure 33:
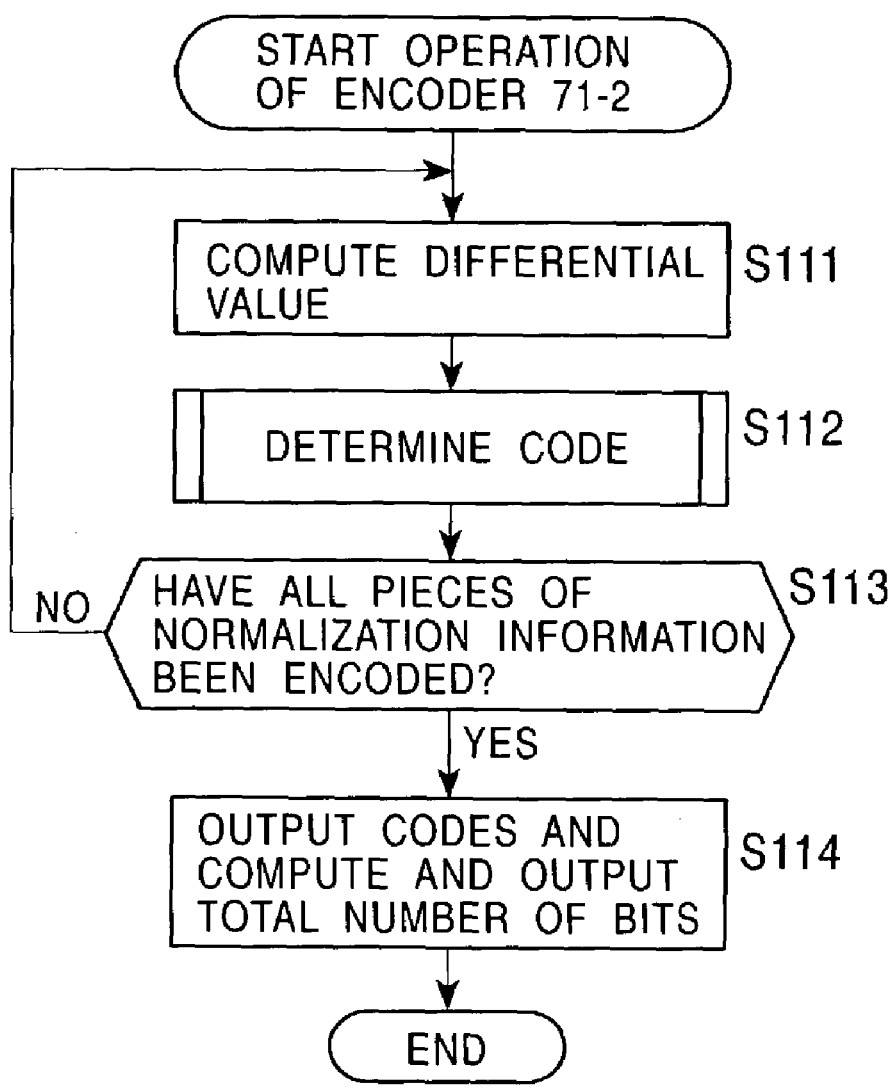
FIG. 33 is a flowchart illustrating the operation of an encoder 71-2.

The operation of the encoder 71-2 is shown in a flowchart of FIG. 33.

In step S111, the encoder 71-2 computes the differential value between quantization accuracy information $D_i$ to be encoded and quantization accuracy information $D_{i-1}$. For example, as shown in FIG. 34, the differential value corresponding to the quantization accuracy information $D_1$ is 0 (=7 (quantization accuracy information $D_1$)–7 (quantization accuracy information $D_0$)). Indexes in FIG. 34 are the same as those shown in FIG. 31.

In step S112 the encoder 71-2 determines codes for the quantization accuracy information $D_i$ using a table $A_D$ (FIG. 35), a table $B_D$ (FIG. 36), or a table $C_D$ (FIG. 37). Since the method for encoding the quantization accuracy information D using the table $A_D$, the table $B_D$, or the table $C_D$ is basically the same as that for encoding the normalization coefficients B described with reference to FIG. 8, a description thereof is omitted.

Although three tables are used in this case, all three, tables, some of these tables, or other tables can be used.

In step S113, the encoder 71-2 determines whether or not all the pieces of quantization accuracy information D have been encoded. If it is determined that not all the pieces of quantization accuracy information D have been encoded, the encoder 71-2 returns to step S111 and performs similar processing on the next piece of quantization accuracy information D.

If it is determined in step S113 that all the pieces of quantization accuracy information D have been encoded, in step S114, the encoder 71-2 outputs the code determined in step S112 to a terminal connected to the switch 73, computes the total number of bits, and outputs the computation result to the determination unit 72. Subsequently, the processing is terminated.

The total numbers of bits of codes obtained in cases in which the encoder 71-2 encodes the quantization accuracy information $D_0$ to $D_{26}$ using the tables $A_D$ to $C_D$ are, as indicated by the rightward arrows in FIG. 34, 49 bits, 39 bits, and 49 bits, respectively. In other words, compared with a known case (81 bits), 32 bits, 42 bits, or 32 bits can be saved.

When the total number of bits of the entirety is small, pieces of quantization accuracy information D corresponding to encoding units at higher frequencies tend to indicate 0 or 1.

When pieces of quantization accuracy information D, indicating 0 or 1 are continuous, the encoder 71-2 may not encode these pieces of quantization accuracy information D.

For example, as shown in FIG. 38, when a series of pieces of quantization accuracy information $D_{16}$ to $D_{26}$ indicate 1, the quantization accuracy information $D_{16}$ to $D_{26}$ are not encoded. When all pieces of the quantization accuracy information $D_0$ to $D_{26}$ are encoded using the table $B_D$, the total number of bits is 39 bits (the value indicated by the rightward arrow corresponding to the "table $B_D$ (no cut)" in the drawing). In this case, when the quantization accuracy information $D_{16}$ to $D_{26}$ are not encoded, the total number of bits is 32 (=27+5) bits (the value indicated by the rightward arrow corresponding to the "table $B_D$ (cutting)" in the drawing). In other words, the bits to be used to encode the quantization accuracy information can be saved further. It is regarded that 5 bits is the number of bits of information (such as 16) indicating the quantization accuracy information $D_{16}$ in the lowest band of the corresponding encoding unit of the series of the quantization accuracy information $D_{16}$ to $D_{26}$ indicating 0 or 1.

The same applies to a case, as shown in FIG. 39, in which a continuous series of pieces of quantization accuracy information $D_{18}$ to $D_{26}$ have the index 0. When the quantization accuracy information $D_{18}$ to $D_{26}$ are not encoded, the total number of bits is 35 bits.

As shown in FIG. 40, when a continuous series of mixed pieces of quantization accuracy information D indicate 0 or 1, these mixed pieces of quantization accuracy information D indicating 0 or 1 can be encoded by 1 bit. In other words, the total number of bits in this case is 41 (23+5+13). Is is regarded that 23 bits is the total number of bits of codes in a case in which the quantization accuracy information $D_0$ to $D_{13}$ are encoded using the table $B_D$; 5 bits is the number of bits of information (for example, 14) indicating information (for example, 14) indicating the quantization accuracy information $D_{14}$ in the lowest band of the corresponding unit A of the continuous series of the mixed pieces of quantization accuracy information $D_{14}$ to $D_{26}$ indicating 0 or 1; and 13 is the total number of bits of each code (1 bit) for the quantization accuracy information $D_{14}$ to $D_{26}$.

As shown in FIG. 41, a continuous series of mixed pieces of quantization accuracy information $D_8$ to $D_{26}$ indicating 0 to 3 can be encoded by 2 bits. In other words, the total number of bits in this case is 59 (=16+5+38). It is regarded that 16 bits is the total number of bits of codes in a case in which the quantization accuracy information $D_0$ to $D_7$ are encoded using the table $A_D$; 5 bits is the number of bits of information (for example, 8) indicating the quantization accuracy information $D_8$; and 38 bits is the total number of bits of each code (2 bits) for the quantization accuracy information $D_8$ to $D_{26}$.

In the encoding processing by the above-described encoder 71-1, as shown in FIGS. 38 to 41, a continuous series of pieces of quantization accuracy information indicating 0 or 1 may not be encoded, or a continuous series of pieces of quantization accuracy information indicating a predetermined value may be encoded by a predetermined number of bits. Similarly in the encoding processing by the encoders 61 of the normalization coefficient encoder 51, a continuous series of pieces of normalization coefficients information indicating 0 or 1 may not be encoded, or a continuous series of pieces of normalization coefficients information indicating a predetermined value may be encoded by a predetermined number of bits.

An encoding method for the encoder 71-3 will now be described.

As described above, in many cases, quantization accuracy information varies smoothly in the frequency direction. If the number of bits to be encoded is small, quantization accuracy information often decreases from low to high frequencies. Furthermore, in many cases, quantization accuracy information of the encoding unit A at low frequencies has a high value (index) such as 5, 6, or 7. In contrast, in many cases, quantization accuracy information D of an encoding unit at high frequencies has a low value (index) such as 0, 1, or 2.

The encoder 71-3 subtracts a weighting curve with a predetermined slope (coefficient) from each piece of quantization accuracy information, thereby reducing the differential value between quantization accuracy information of encoding units in adjacent bands and increasing the probability of appearance of the differential value having a high probability of appearance. As a result, the quantization accuracy information can be encoded using a smaller number of bits.

Specifically, as shown in FIG. 42, if a weight value for quantization accuracy information $D_0$ and $D_1$ is 5, 5 is subtracted from the quantization accuracy information $D_0$ and $D_1$. If a weight value for quantization accuracy information $D_2$ and $D_3$ is 4, 4 is subtracted from the quantization accuracy information $D_2$ and $D_3$. If a weight value for quantization accuracy information $D_4$ and $D_5$ is 3, 3 is subtracted from the quantization accuracy information $D_4$ and $D_5$. If a weight value for quantization accuracy information $D_6$ and $D_7$ is 2, 2 is subtracted from the quantization accuracy information $D_6$ and $D_7$. If a weight value for quantization accuracy information $D_8$ and $D_9$ is 1, 1 is subtracted from the quantization accuracy information $D_8$ and $D_9$. Since a weight value for quantization accuracy information $D_{10}$ to $D_{26}$ is 0, the quantization accuracy information $D_{10}$ to $D_{26}$ are unaltered.

The total numbers of bits of codes in cases in which the encoder 71-3 encodes the quantization accuracy information $D_0$ to $D_{26}$ using the table $A_D$ (FIG. 35) and the table $B_D$ (FIG. 36) are, as indicated by the rightward arrows in FIG. 42, 47 bits and 38 bits, respectively. Compared with a known case (81 bits), 34 bits or 43 bits can be saved.

In the encoding processing by the above-described encoder 71-3, as shown in FIGS. 38 to 41, a continuous series of pieces of quantization accuracy information having 0 or 1 may not be encoded, or a continuous series of pieces of quantization accuracy information having a predetermined value may be encoded by a predetermined number of bits.

Prior to starting the encoding processing, which is described with reference to the flowchart of FIG. 30, the above-described encoder 71-1 can compute weight values and can subtract the weight values from corresponding pieces of quantization accuracy information. In this case, processing in steps S91 to S101 is performed on the quantization accuracy information from which the weight values are subtracted.

An encoding method for the encoder 71-4 will now be described.

Figure 43:
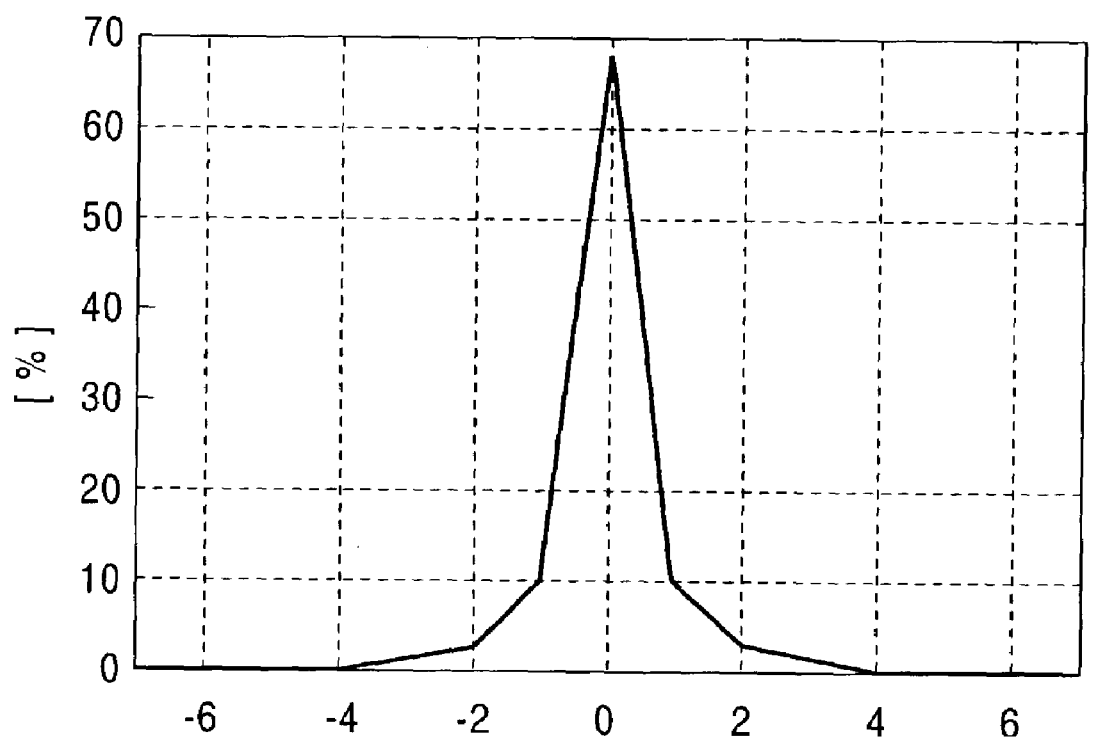
FIG. 43 is an illustration of another distribution of the differential values.

As in the normalization coefficients, in many cases, time correlation between pieces of quantization accuracy information is high. A particular biased distribution (a distribution in which differential values near 0 have high probabilities), such as that shown in FIG. 43, can be obtained from differential values between pieces of quantization accuracy information, which are temporarily adjacent to each other.

The encoder 71-4 computes the differential value between pieces of quantization accuracy information, which are temporarily adjacent to each other, and allocates a code having a small number of bits to a differential value having a high probability of appearance to encode the quantization accuracy information.

Since the operation of the encoder 71-4 is basically the same as that of the encoder 61-4 of the normalization coefficient encoder 51, a detailed description thereof is omitted. The total number of bits of codes in a case in which the encoder 71-4 encodes the quantization accuracy information $D_0$ to $D_{26}$ using the table $A_D$ is, as indicated by the rightward arrow in FIG. 44, 45 bits. Compared with a known case (81 bits), 36 bits can be saved.

In the encoding processing by the encoder 71-4, as shown in FIGS. 38 to 41, a continuous series of pieces of quantization accuracy information having 0 or 1 may not be encoded, or a continuous series of quantization accuracy information having a predetermined number may be encoded by a predetermined number of bits.

An encoding method for the encoder 71-5 will now be described.

Figure 45:
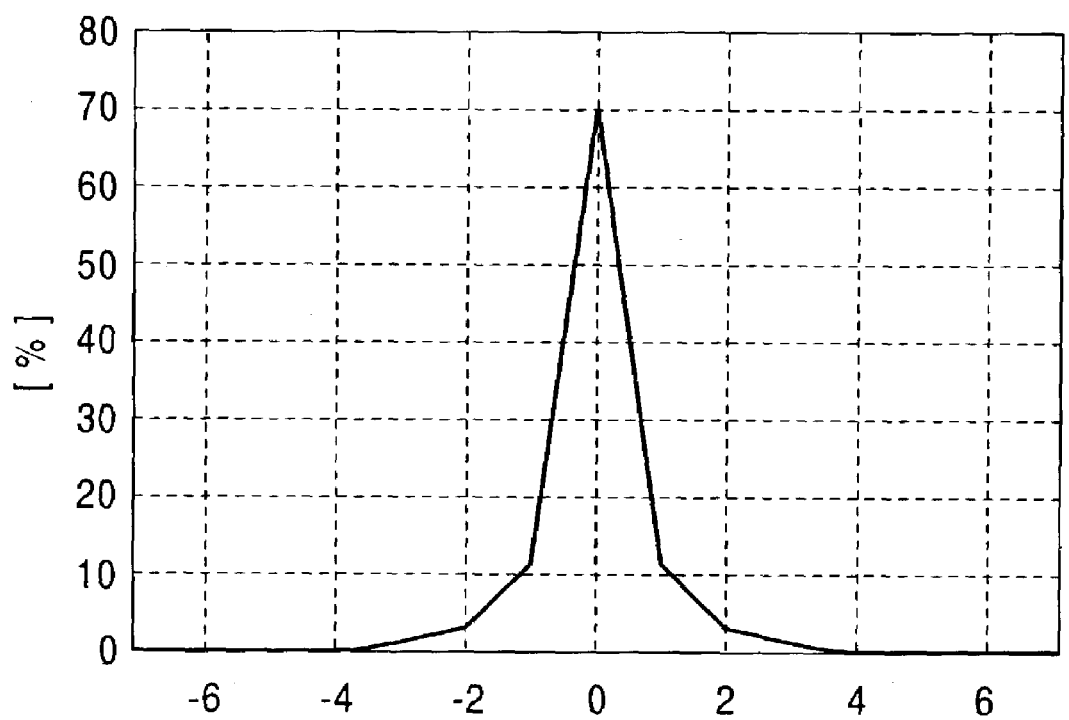
FIG. 45 is an illustration of another distribution of the differential values.

In many cases, correlation between left-signal and right-signal channels of quantization accuracy information is high. Thus, a particular biased distribution (a distribution in which differential values near 0 have high probabilities), such as that shown in FIG. 45, can be obtained from the differential values.

Since the operation of the encoder 71-5 is basically the same as that of the encoder 61-5 of the normalization coefficient encoder 51, a detailed description thereof is omitted. The total number of bits of codes in a case in which the encoder 71-5 encodes the quantization accuracy information $D_0$ to $D_{26}$ using the table $A_D$ is, as indicated by the rightward arrow in FIG. 46, 49 bits. Compared with a known case (81 bits), 32 bits can be saved.

In the encoding processing by the encoder 71-5, as shown in FIGS. 38 to 41, a continuous series of pieces of quantization accuracy information having 0 or 1 may not be encoded, or a continuous series of quantization accuracy information having a predetermined number maybe encoded by a predetermined number of bits.

An encoding method for the encoder 71-6 will now be described.

Figure 47:
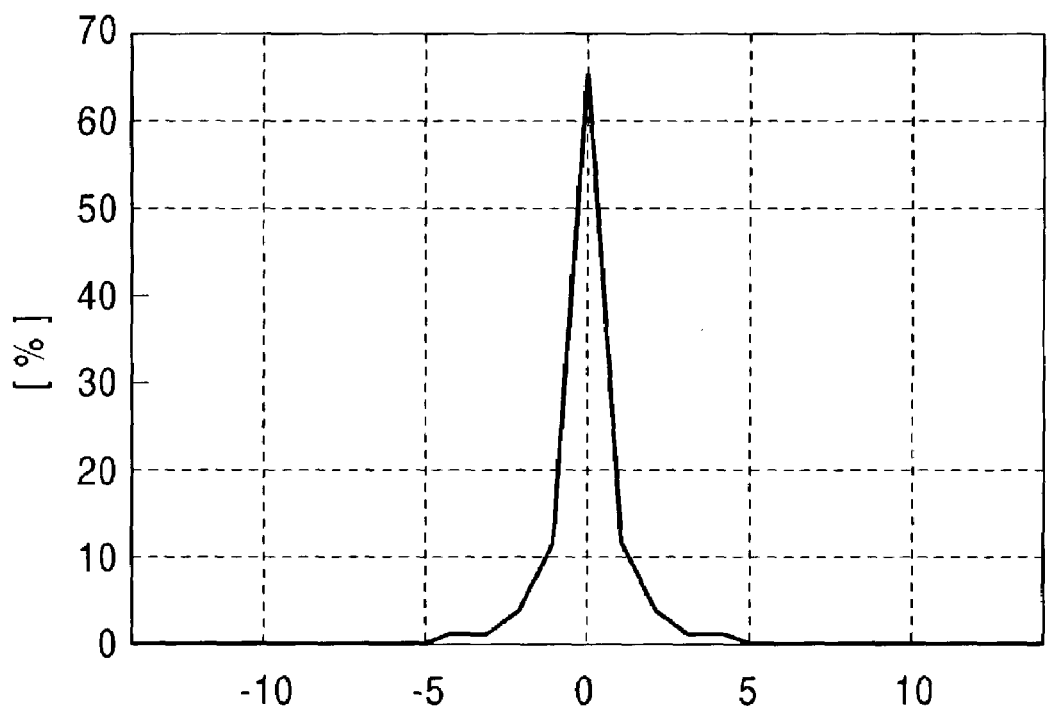
FIG. 47 is an illustration of another distribution of the differential values.

As described above, pieces of quantization accuracy information D are highly correlated between adjacent bands (frequency direction) and channels. When differential values in the frequency direction are computed from differential values between channels, the differential values have, as shown in FIG. 47, a particular biased distribution (a distribution in which the differential values near 0 have high probabilities).

The encoder 71-6 computes the differential values LR between the quantization accuracy information $D_L$ of a corresponding left signal and a right signal $D_R$. Subsequently, the encoder 71-6 computes the differential values F in the frequency direction between these differential values LR. The encoder 71-6 allocates a code having a small number of bits to the differential value F having a high probability of appearance to encode the quantization accuracy information D.

Since the operation of the encoder 71-6 is basically the same as that of the encoder 61-6 of the normalization coefficient encoder 51, a detailed description thereof is omitted. The total number of bits of codes in a case in which the encoder 71-6 encodes the quantization accuracy information $D_0$ to $D_{26}$ using the table A is, as indicated by the rightward arrow in FIG. 48, 59 bits. Compared with a known case, 22 bits can be saved.

In the encoding processing by the encoder 71-6, as shown in FIGS. 38 to 41, a continuous series of pieces of quantization accuracy information having 0 or 1 may not be encoded, or a continuous series of quantization accuracy information having a predetermined number may be encoded by a predetermined number of bits.

Figure 2:
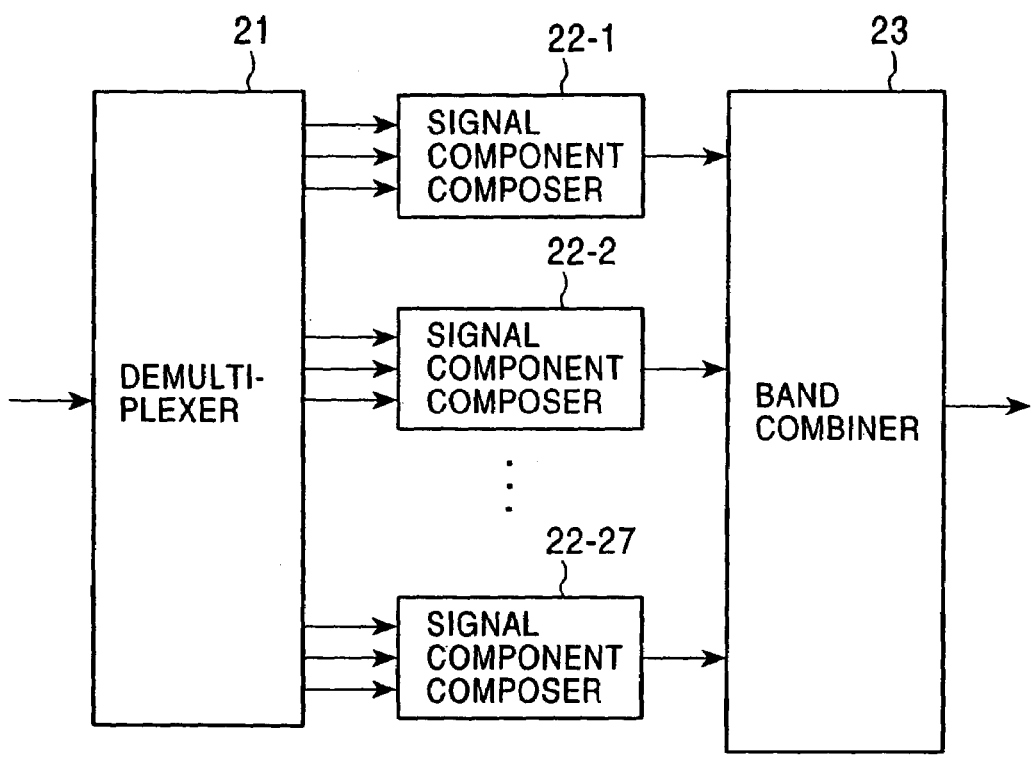
FIG. 2 is a block diagram showing an example of the configuration of a known decoding device.
Figure 49:
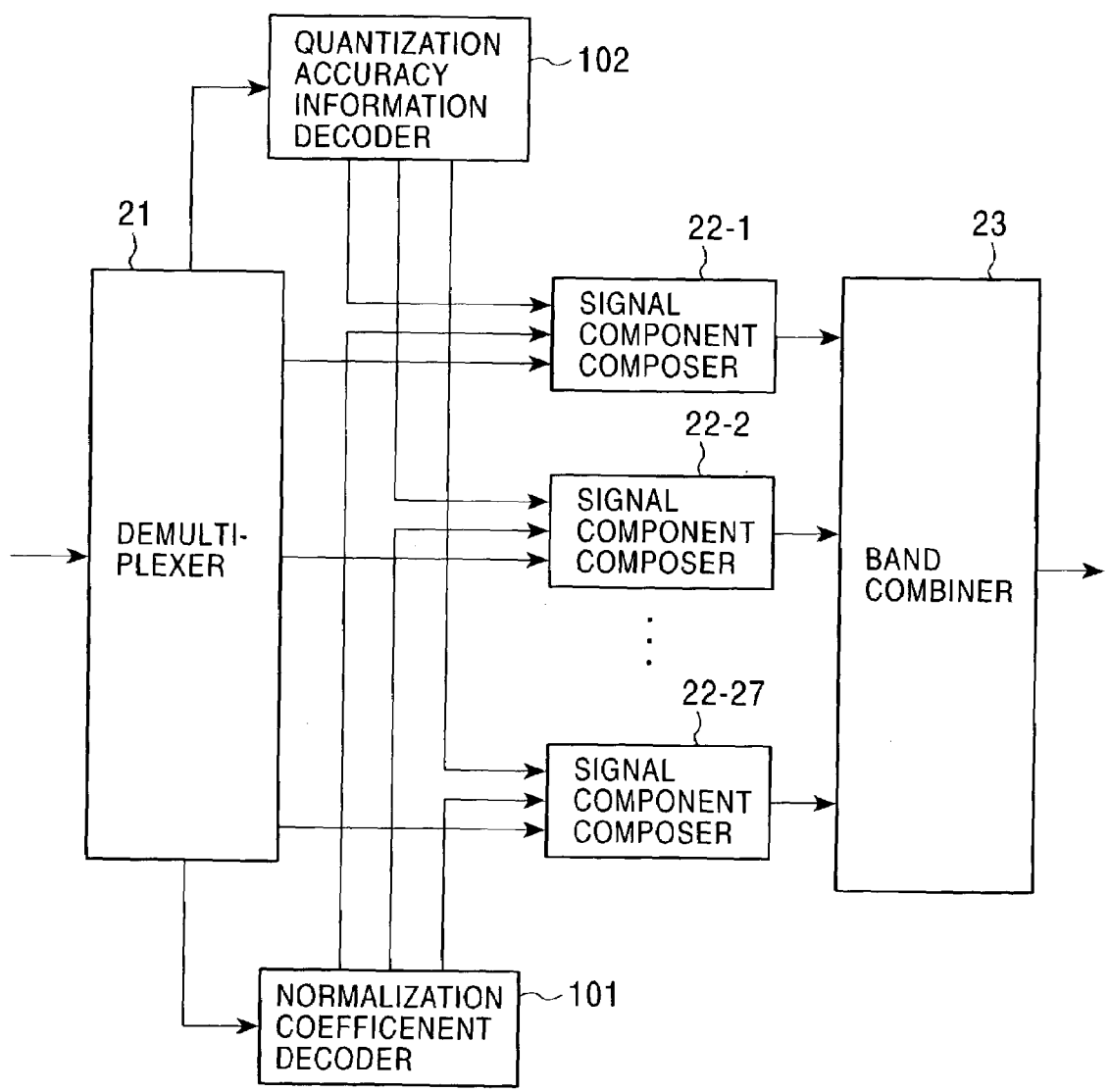
FIG. 49 is a block diagram showing an example of the configuration of a decoding device to which the present invention is applied.

FIG. 49 shows an example of the configuration of a decoding device to which the present invention is applied. In this decoding device, a normalization coefficient decoder 101 and a quantization accuracy information decoder 102 are added to a decoding device shown in FIG. 2. Since the remaining portion is similar to that shown in FIG. 2, a description thereof is appropriately omitted.

A demultiplexer 21 decodes encoded data into codes generated by encoding the normalization coefficients $B_0$ to $B_{26}$ (hereinafter referred to as encoded normalization coefficients $U_B$), information relating to methods for encoding the normalization coefficients B (hereinafter referred to as encoding information $W_B$), codes generated by encoding the quantization accuracy information $D_0$ to $D_{26}$ (hereinafter referred to as encoded quantization accuracy information $U_D$), information relating to methods for encoding the quantization accuracy information D (hereinafter referred to as encoding information $W_D$), and the quantization coefficients $F_0$ to $F_{26}$.

The demultiplexer 21 outputs the encoded normalization coefficients $U_B$ and the encoding information $W_B$ to the normalization coefficient decoder 101 and outputs the encoded quantization accuracy information $U_D$ and the encoding information $W_D$ to the quantization accuracy information decoder 102.

The demultiplexer 21 outputs the quantization coefficients $F_0$ to $F_{26}$ to corresponding signal component composers 22-1 to 22-27.

The normalization coefficient decoder 101 decodes the encoded normalization coefficients $U_B$ from the demultiplexer 21 by a decoding method corresponding to the decoding information $W_B$ and outputs the resultant normalization coefficients $B_0$ to $B_{26}$ to the corresponding signal component composers 22-1 to 22-26.

The quantization accuracy information decoder 102 decodes the encoded quantization accuracy information $U_D$ from the demultiplexer 21 by a decoding method corresponding to the encoding information $W_D$ and outputs the resultant quantization accuracy information $D_0$ to $D_{26}$ to the corresponding signal component composers 22-1 to 22-27.

The signal component composers 22-1 to 22-27 dequantize the quantization coefficients $F_0$ to $F_{26}$ from the demultiplexer 21 in accordance with quantization steps corresponding to the quantization accuracy information $D_0$ to $D_{26}$ from the quantization accuracy information decoder 102, multiply the resultant normalized data $C_0$ to $C_{26}$ by values corresponding to the normalization coefficients $B_0$ to $B_{26}$ from the normalization coefficient decoder 101, thereby decoding signals of encoding units in each band. The signals are output to a band combiner 23.

Figure 50:
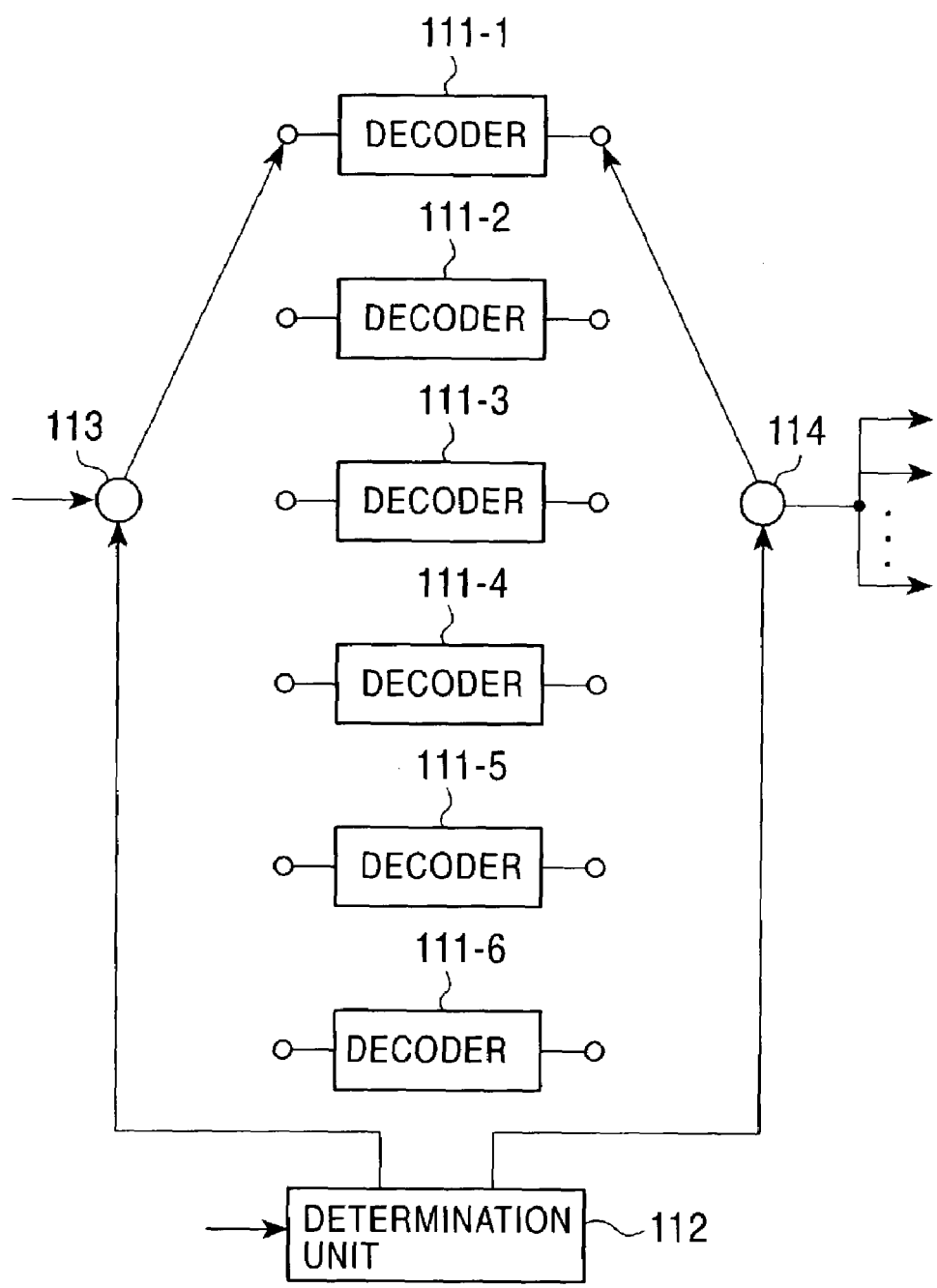
FIG. 50 is a block diagram showing an example of the configuration of a normalization coefficient decoder 101.

FIG. 50 shows an example of the configuration of the normalization coefficient decoder 101. In this case, the normalization coefficient decoder 101 has six decoders 111-1 to 111-6. The number of decoders 111 is not limited to six. It is only required that there be a plurality of decoders 111.

The encoded normalization coefficients $U_B$ are appropriately input to the decoders 111-1 to 111-6. The decoders 111-1 to 111-6 each perform decoding processing corresponding to the encoding processing by the encoders 61-1 to 61-6 of the normalization coefficient encoder 51 of the encoding device and each output the decoding results to terminals connected to a switch 114.

A determination unit 112 determines the encoding contents of the encoded normalization coefficients $U_B$ (for example, which decoder of the decoders 61-1 to 61-6 has encoded the normalization coefficients and which table is used to encode the normalization coefficients) and, based on the determination results, selects a decoder to perform decoding processing and a table to be used to perform decoding.

The determination unit 112 controls a switch 113 so that the encoded normalization coefficients $U_B$ can be input to the selected decoder (any of 111-1 to 111-6) and controls the switch 114 so that the output of the selected decoder can be output to the signal component composers 22.

Figure 51:
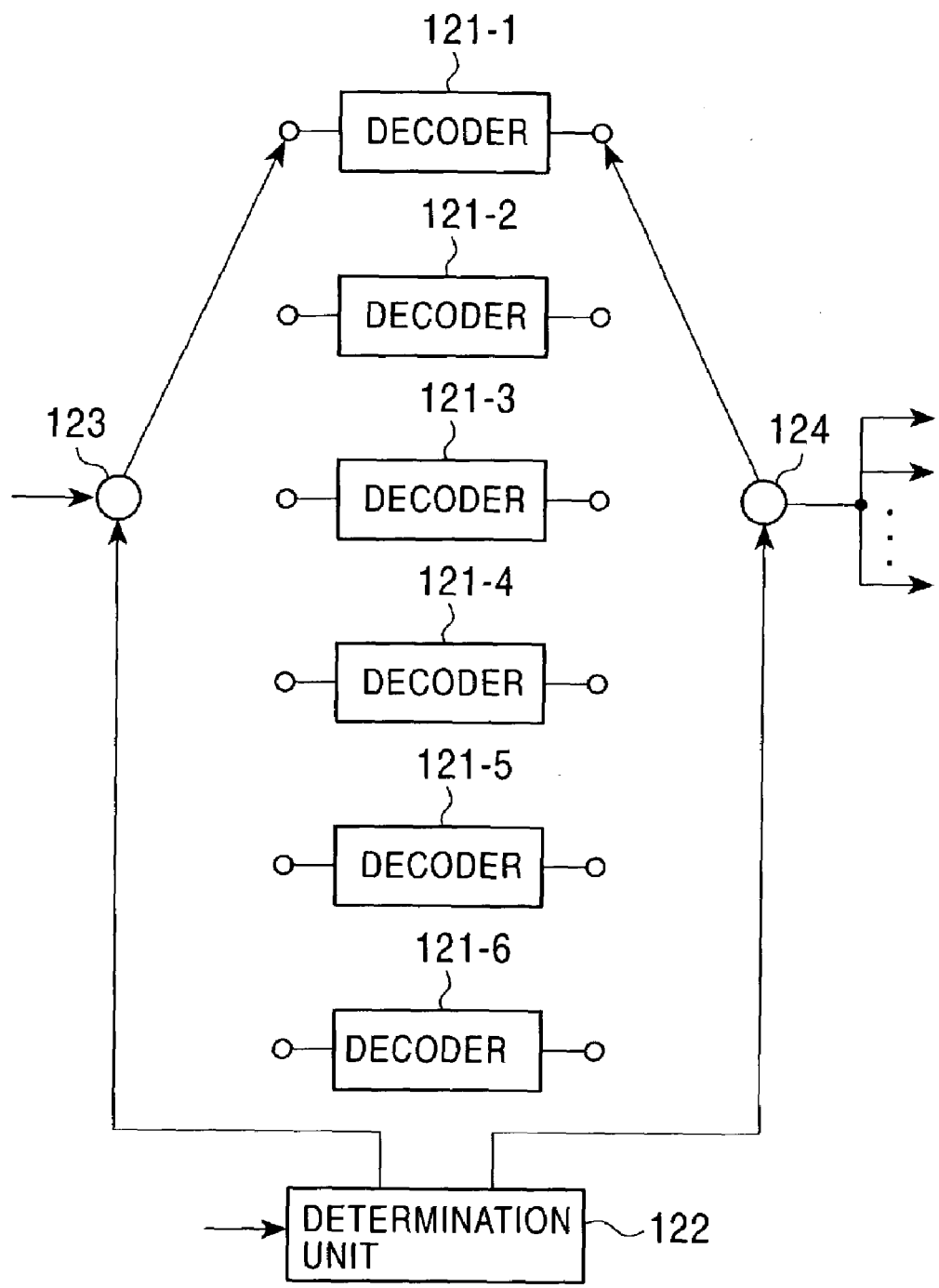
FIG. 51 is a block diagram showing an example of the configuration of a quantization accuracy information decoder 102.

FIG. 51 shows an example of the configuration of the quantization accuracy information decoder 102. In this case, the quantization accuracy information decoder 102 has six decoders 121-1 to 121-6. The number of decoders 121 is not limited to six. It is only required that there be a plurality of decoders 121.

The encoded quantization accuracy information $U_D$ is appropriately input to the decoders 121-1 to 121-6. The decoders 121-1 to 121-6 each perform decoding processing corresponding to the encoding processing by the encoders 71-1 to 71-6 of the quantization accuracy information encoder 52 of the encoding device and each output the decoding results to terminals connected to a switch 124.

A determination unit 122 determines the encoding contents of the encoded quantization accuracy information $U_D$ (for example, which one of the decoders 71 has encoded the quantization accuracy information and which table is used to encode the quantization accuracy information) and, based on the determination results, selects a decoder to perform decoding processing and a table to be used to perform decoding.

The determination unit 112 controls a switch 123 so that the encoded quantization accuracy information $U_D$ can be input to the selected decoder and controls the switch 124 so that the output of the selected decoder can be output to the signal component composers 22.

The operation of the normalization coefficient decoder 101 will now be described.

Figure 52:
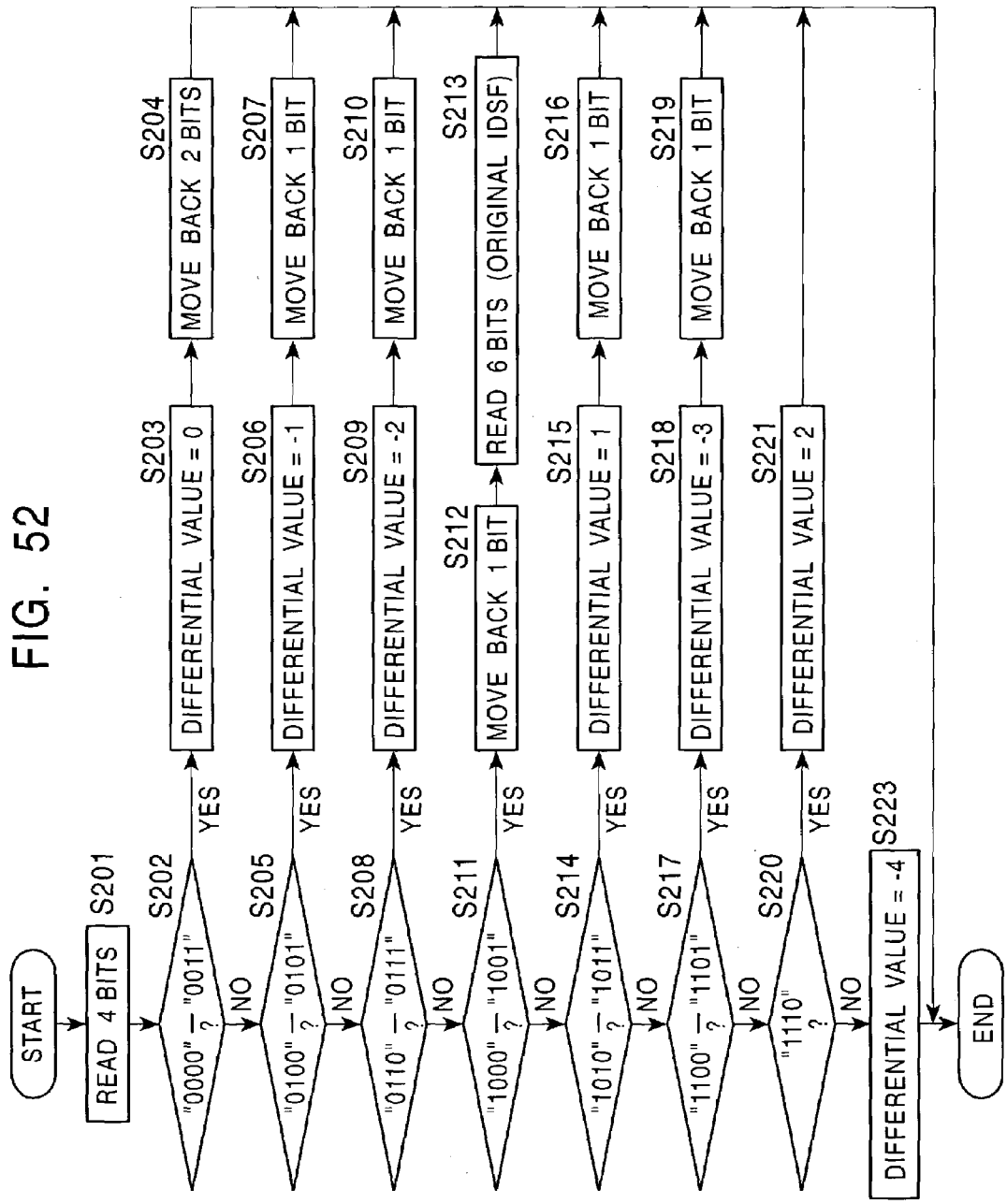
FIG. 52 is a flowchart illustrating the operation of the normalization coefficient decoder 101.

Referring to a flowchart of FIG. 52, for example, a case in which a process of decoding, by the normalization coefficient decoder 101 (decoder 111), codes encoded using the table $B_B$ will now be described.

In the table $B_B$, the escape code "100" has 3 bits, and a code corresponding to a differential value having a high probability of appearance has a maximum of 4 bits. In step S201, the normalization coefficient decoder 101 reads the first four bits of the encoded normalization coefficients $U_B$.

In step S202, the normalization coefficient decoder 101 determines whether or not data written on the 4 bits, which are read in step S201, corresponds to any of "0000" to "0011". If it is determined that the data corresponds to any of "0000" to "0011", the normalization coefficient decoder 101 proceeds to step S203. In step S203, since the differential value encoded into "00" is 0 in the table $B_B$, it is determined that the differential value=0, and the normalization coefficient decoder 101 proceeds to step S204.

In step S204, since the differential value 0 is encoded by 2 bits, the normalization coefficient decoder 101 moves the data reading start position backwards by 2 bits, which is obtained by subtracting 2 bits from 4 bits.

If it is determined in step S202 that the data written on the 4 bits corresponds to none of "0000", to "0011", in step S205, the normalization coefficient decoder 111 determines whether or not the data corresponds to any of "0100", to "0101". If it is determined that the data corresponds to any of "0100" to "0101", the normalization coefficient decoder 111 proceeds to step S206.

In step S206, since the differential value encoded into "010", is −1 in the table $B_B$, the normalization coefficient decoder 101 determines that the differential value=−1.

In step S207, since the differential value −1 is encoded by 3 bits, the normalization coefficient decoder 101 moves the data reading start position backwards by 1 bit, which is obtained by subtracting 3 bits from 4 bits.

If it is determined in step S205 that the data written on the 4 bits corresponds to none of "0100" to "0101", in step S208, the normalization coefficient decoder 101 determines whether or not the data corresponds to any of "0110" to "0111". If it is determined that the data corresponds to any of "0110" to "0111", the normalization coefficient decoder 101 proceeds to step S209.

In step S209, if the normalization coefficient decoder 101 uses the table $B_B$, since the differential value −2 is encoded into "011", it is determined that the differential value=−2.

In step S210, since the differential value −2 is encoded by 3 bits, the normalization coefficient decoder 101 moves the data reading start position backwards by 1 bit, which is obtained by subtracting 3 bits from 4 bits.

If it is determined in step S208 that the data written on 4 bits corresponds to none of "0110" to "0111", in step S211, the normalization coefficient decoder 101 determines whether or not the data corresponds to any of "1000" to "1001". If it is determined that the data corresponds to any of "1000" to "1001", the normalization coefficient decoder 101 proceeds to step S212.

In step S212, the normalization coefficient decoder 101 determines that the escape code "101" (3 bits) in the table $B_B$ is used, moves the data reading start position backwards by 1 bit, which is obtained by subtracting 3 bits from four bits, and proceeds to step S213. In step S213, the normalization coefficient decoder 101 reads 6-bit data from a bit at the moved reading start position (the last bit of the 4 bits read in step S201) as the normalization coefficients B.

If it is determined in step S211 that the data written on the 4 bits corresponds to none of "1000" to "1001", the normalization coefficient decoder 101 proceeds to step S214. In step S214, the normalization coefficient decoder 101 determines whether or not the data corresponds to any of "1010" to "1011". If it is determined that the data corresponds to any of "1010" to "1011", the normalization coefficient decoder 101 proceeds to step S215.

In step S215, since the differential value encoded into "101" is 1 in the table $B_B$, the normalization coefficient decoder 101 determines that the differential value=1.

In step S216, since the differential value 1 is encoded by 3 bits, the normalization coefficient decoder 101 moves the data reading start position backwards by 1 bit, which is obtained by subtracting 3 bits from 4 bits.

If it is determined in step S214 that the data written by the 4 bits corresponds to none of "1010" to "1011", in step S217, the normalization coefficient decoder 101 determines whether or not the data corresponds to any of "1100" to "1101". If it is determined that the data corresponds to any of "1100" to "1101", the normalization coefficient decoder 101 proceeds to step S218.

In step S218, since the differential value encoded into "110" is −3 in the table $B_B$, the normalization coefficient decoder 101 determines that the differential value=−3.

In step S219, since the differential value −3 is encoded by 3 bits, the normalization coefficient decoder 101 moves the data reading start position backwards by 1 bit, which is obtained by subtracting 3 bits from 4 bits.

If it is determined in step S217 that data written on the 4 bits corresponds to none of "1100" to "1101", in step S220, the normalization coefficient decoder 101 determines whether or not the data corresponds to "1110". If it is determined that the data corresponds to "1110", the normalization coefficient decoder 101 proceeds to step S221.

In step S221, since the differential value encoded into "1110" is 2 in the table $B_B$, the normalization coefficient decoder 101 determines that the differential value=2.

If it is determined in step S220 that the data written on the 4 bits does not correspond to "1110", the normalization coefficient decoder 101 proceeds to step S223. In step S223, since the differential value encoded into "1111" is −4 in the table $B_B$, the normalization coefficient decoder 101 determines that the differential value=−4.

When the processing in step S204, step S207, step S210, step S213, step S216, step S219, step S221, or step S223 is performed, the processing is terminated.

The present invention can be applied to an audio recorder/player.

A series of the above-descried processes can be performed by hardware or by software. When the series of processes is to be performed by software, a program forming the software is installed in a computer, and the program is run on the computer. As a result, the functions of the foregoing encoding device and the decoding device are realized.

Figure 53:
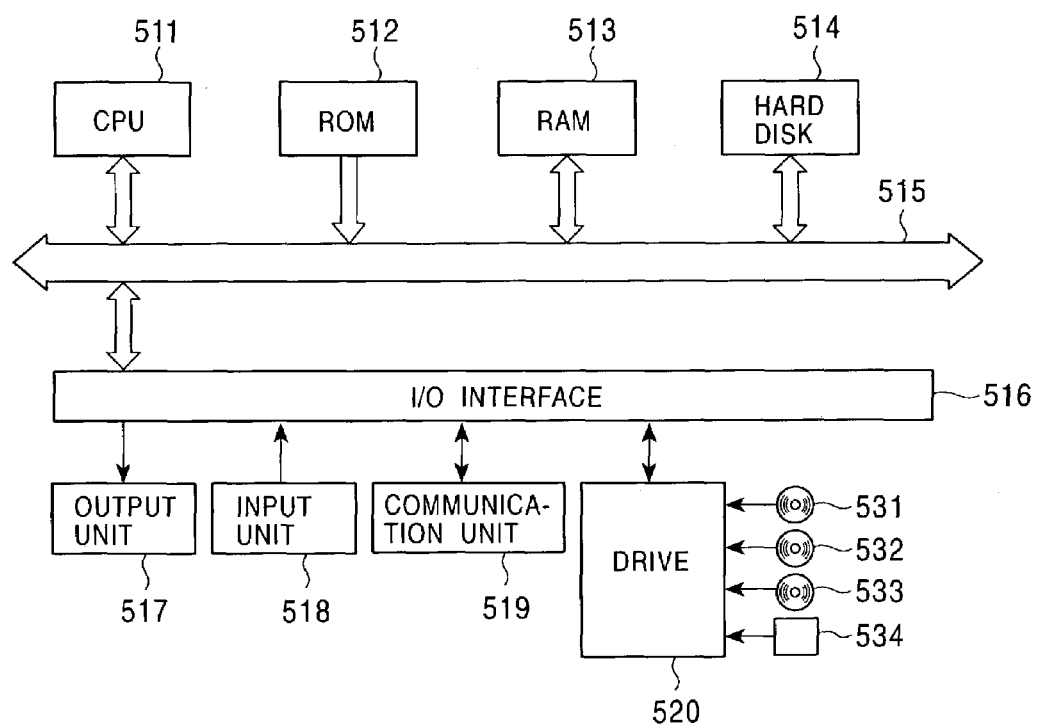
FIG. 53 is a block diagram showing an example of the configuration of a computer 501.

FIG. 53 is a block diagram showing the configuration of an embodiment of a computer 501 functioning as the foregoing encoding device and the decoding device. An input/output (I/O) interface 516 is connected through a bus 515 to a CPU (Central Processing Unit) 511. If a command is input through the I/O interface 516 by a user from an input unit 518 including a keyboard and a mouse, the CPU 511 loads a program stored in a recording medium such as a ROM (Read Only Memory) 512, a hard disk 514, or a magnetic disk 531, an optical disk 532, a magneto-optical disk 533, or a semiconductor memory 534 mounted on a drive 520 into a RAM (Random Access Memory) 513 and executes the program. As a result, the above-described various processes can be performed. Also, the CPU 511 outputs the processing results through the I/O interface 516 to an output unit 517 including an LCD (Liquid Crystal Display) if necessary. The program can be stored beforehand in the hard disk 514 or the ROM 512 and can be provided together with the computer 501 to the user. Also, the program can be provided as a packaged media such as the magnetic disk 531, the optical disk 532, the magneto-optical disk 533, or the semiconductor memory 534. It is also possible to provide the program from a satellite or a network to the hard disk 514 through a communication unit 519.

In the present description, steps for writing a program provided by a recording medium not only include time-series processing performed in accordance with the described order but also include parallel or individual processing, which may not necessarily be performed in time series.

INDUSTRIAL APPLICABILITY

According to a first encoding apparatus and method and to a first recording medium of the present invention, an input acoustic time-series signal is separated into N bands to generate N band signals. A predetermined normalization coefficient for each of the band signals is generated. The band signals are normalized on the basis of the generated normalization coefficients. Quantization accuracy information for each of the band signals is generated. Each of the normalized band signals is quantized on the basis of the quantization accuracy information. The N generated normalization coefficients are encoded. One of normalization coefficient encoding methods is selected on the basis of the amount of encoding in a case in which the N normalization coefficients are encoded. The N normalization coefficients, which are encoded using the selected normalization coefficient encoding method, and each of the band signals are multiplexed. Accordingly, the encoding efficiency can be improved.

According to a second encoding device and method and to a second recording medium of the present invention, an input acoustic time-series signal is separated into N bands to generate N band signals. A predetermined normalization coefficient for each of the band signals is generated. The band signals are normalized on the basis of the generated normalization coefficients. Quantization accuracy information for each of the band signals is generated. Each of the normalized band signals is quantized on the basis of the quantization accuracy information. The N pieces of generated quantization accuracy information are encoded. One of quantization accuracy information encoding methods is selected on the basis of the amount of encoding in a case in which the N pieces of quantization accuracy information are encoded. The N pieces of quantization accuracy information, which are encoded using the selected quantization accuracy information encoding method, and each of the band signals are multiplexed. Accordingly, the encoding efficiency can be improved.

According to a first decoding device and method and to a third recording medium of the present invention, the multiplexing of at least one band signal with quantization accuracy information and with an encoded normalization coefficient for each band signal is demultiplexed. The demultiplexed normalization coefficient is decoded. Each band signal is dequantized on the basis of the quantization accuracy information, and the dequantized signal is denormalized on the basis of the normalization coefficient, whereby an acoustic time-series signal is generated. Bands of generated band signals are combined. Accordingly, the encoding efficiency can be improved.

According to a second decoding device and method and to a fourth recording medium of the present invention, the multiplexing of at least one band signal with a normalization coefficient and with encoded quantization accuracy information for each band signal is demultiplexed. The demultiplexed quantization accuracy information is decoded. Each band signal is dequantized on the basis of the quantization accuracy information, and the dequantized signal is denormalized on the basis of the normalization coefficient, whereby an acoustic time-series signal is generated. Bands of generated band signals are combined. Accordingly, the encoding efficiency can be improved.

What is claimed is:

1. An encoding device for encoding an acoustic time-series signal, comprising:
   band separating means for separating an input acoustic time-series signal into N bands and generating N band signals;
   normalization coefficient generating means for generating a predetermined normalization coefficient for each of the band signals;
   normalization means for normalizing the band signals on the basis of the generated normalization coefficients;
   quantization accuracy information generating means for generating quantization accuracy information for each of the band signals;
   quantization means for quantizing each of the normalized band signals on the basis of the quantization accuracy information;
   a plurality of normalization coefficient encoding means for encoding the N normalization coefficients, which are generated by the normalization coefficient generating means;
   first selection means for selecting one of the normalization coefficient encoding means on the basis of the amount of encoding in a case in which the N normalization coefficients are encoded by each of the normalization coefficient encoding means; and
   multiplexing means for multiplexing the N normalization coefficients, which are encoded using the normalization coefficient encoding means selected by the first selection means, and each of the band signals, which are output by the quantization means.

2. An encoding device according to claim 1, wherein the band separating means generates the N band signals by converting the input acoustic time-series signal into frequency components and separating a resultant spectral signal into N bands.

3. An encoding device according to claim 1, wherein at least one of the normalization coefficient encoding means comprises:
   second selection means for selecting L indexes at high frequencies from among indexes of the N normalization coefficients;
   computation means for detecting a maximum value and a minimum value of the L selected indexes and computing the difference between the maximum value and the minimum value;
   encoding means for encoding each of the L normalization coefficients at high frequencies by representing, using a predetermined number of bits, a value obtained by subtracting the minimum value from each of the L selected indexes at high frequencies; and
   output means for outputting, when the normalization coefficient encoding means is selected, information indicating that the L indexes are specified, the predetermined number of bits, the minimum value, indexes of (N-L) normalization coefficients unselected by the selection means, and the L encoded normalization coefficients.

4. An encoding device according to claim 3, further comprising:
   weighting means for adding a predetermined weight value to each index of the normalization coefficients so as to increase the correlation between the indexes of the normalization coefficients,
   wherein the encoding means encodes the indexes weighted by the weighting means.

5. An encoding device according to claim 1, wherein at least one of the normalization coefficient encoding means comprises:
   differential value computing means for computing a differential value between an index of each of the normalization coefficients and an index of another normalization coefficient that is highly correlated with the index of each of the normalization coefficients; and
   encoding means for encoding the differential value, which is computed by the differential value computing means.

6. An encoding device according to claim 5, wherein the normalization coefficient encoding means comprises:
   table maintaining means for maintaining a table in which a differential value having a high frequency of occurrence of being computed by the differential value computing means is associated with a code having a small number of bits, and the encoding means encodes the differential value, which is computed by the differential value computing means, by reading, from the table, a code corresponding to the differential value.

7. An encoding device according to claim 6,
wherein the table includes codes corresponding to all differential values that can be computed by the computing means.

8. An encoding device according to claim 6,
wherein the table only includes a code corresponding to a differential value having a high frequency of occurrence, and
for a differential value other than that with a high frequency of occurrence, the encoding means encodes the differential value by outputting an index for the differential value subsequent to a predetermined escape code.

9. An encoding device according to claim 8,
wherein, for a differential value other than that with a high frequency of occurrence, the encoding means repeatedly outputs a second escape code, the number of repetitions being based on the size of the absolute value of the differential value, subsequent to a first escape code that depends on the sign of the differential value and reads, from the table, a code corresponding to a value obtained by subtracting a predetermined number based on the size of the absolute value of the differential value from the differential value to encode the differential value.

10. An encoding device according to claim 8,
wherein, when a differential value other than that with a high frequency of occurrence is within a predetermined range, the encoding means reads, from the table, a code corresponding to a value obtained by subtracting a predetermined number that depends on the sign of the differential value from the differential value and outputs the code subsequent to a first escape code, and, when the differential value other than that with a high frequency of occurrence is not within the predetermined range, the encoding means outputs an index for the differential value subsequent to a second escape code to encode the differential value.

11. An encoding device according to claim 5,
wherein a normalization coefficient in a band adjacent to a band corresponding to each of the normalization coefficients is used as another normalization coefficient highly correlated with each of the normalization coefficients.

12. An encoding device according to claim 5,
wherein, when all indexes of the normalization coefficients in a band higher than a particular band indicate 0 or 1, the normalization coefficient encoding means does not encode differential values at frequencies higher than the particular band.

13. An encoding device according to claim 5,
wherein, when the differential value between indexes of the normalization coefficients in a band higher than a particular band is within a predetermined range, the normalization coefficient encoding means makes the code length of each of the normalization coefficients at frequencies higher than the particular band a predetermined value smaller than the code length of the normalization coefficient at frequencies lower than the particular band.

14. An encoding device according to claim 5, further comprising weighting means for adding a predetermined weight value to each index of the normalization coefficients so as to increase the correlation between the indexes of the differential values between the normalization coefficients,
wherein the encoding means encodes the indexes weighted by the weighting means.

15. An encoding device according to claim 14,
wherein the weighting means adds a step-by-step weight that gradually increases as the band becomes higher.

16. An encoding device according to claim 5,
wherein a normalization coefficient that is temporarily adjacent to a band corresponding to each of the normalization coefficients is used as another normalization coefficient highly correlated with each of the normalization coefficients.

17. An encoding device according to claim 5,
wherein the acoustic time-series signal is a left signal or a right signal of a stereo audio signal, and
the differential value computing means computes the differential value between a normalization coefficient of the left signal and a normalization coefficient of the right signal.

18. An encoding method for encoding an acoustic time-series signal, comprising:
a band separating step of separating an input acoustic time-series signal into N bands and generating N band signals;
a normalization coefficient generating step of generating a predetermined normalization coefficient for each of the band signals;
a normalization step of normalizing the band signals on the basis of the generated normalization coefficients;
a quantization accuracy information generating step of generating quantization accuracy information for each of the band signals;
a quantization step of quantizing each of the normalized band signals on the basis of the quantization accuracy information;
a plurality of normalization coefficient encoding steps of encoding the N normalization coefficients, which are generated in the normalization coefficient generating step;
a selection step of selecting one of the normalization coefficient encoding steps on the basis of the amount of encoding in a case in which the N normalization coefficients are encoded in each of the normalization coefficient encoding steps; and
a multiplexing step of multiplexing the N normalization coefficients, which are encoded using the normalization coefficient encoding step selected in the selection step, and each of the band signals, which are output in the quantization step.

19. A computer-readable recording medium having a computer-readable program recorded therein, the program comprising:
a band separating step of separating an input acoustic time-series signal into N bands and generating N band signals;
a normalization coefficient generating step of generating a predetermined normalization coefficient for each of the band signals;
a normalization step of normalizing the band signals on the basis of the generated normalization coefficients;
a quantization accuracy information generating step of generating quantization accuracy information for each of the band signals;

a quantization step of quantizing each of the normalized band signals on the basis of the quantization accuracy information;

a plurality of normalization coefficient encoding steps of encoding the N normalization coefficients, which are generated in the normalization coefficient generating step;

a selection step of selecting one of the normalization coefficient encoding steps on the basis of the amount of encoding in a case in which the N normalization coefficients are encoded in each of the normalization coefficient encoding steps; and a multiplexing step of multiplexing the N normalization coefficients, which are encoded using the normalization coefficient encoding step selected in the selection step, and each of the band signals, which are output in the quantization step.

20. An encoding device for encoding an acoustic time-series signal, comprising:

band separating means for separating an input acoustic time-series signal into N bands and generating N band signals;

normalization coefficient generating means for generating a predetermined normalization coefficient for each of the band signals;

normalization means for normalizing the band signals on the basis of the generated normalization coefficients;

quantization accuracy information generating means for generating quantization accuracy information for each of the band signals;

quantization means for quantizing each of the normalized band signals on the basis of the quantization accuracy information;

a plurality of quantization accuracy information encoding means for encoding the N pieces of quantization accuracy information, which are generated by the quantization accuracy information generating means;

first selection means for selecting one of the quantization accuracy information encoding means on the basis of the amount of encoding in a case in which the N pieces of quantization accuracy information are encoded by each of the quantization accuracy information encoding means; and multiplexing means for multiplexing the N pieces of quantization accuracy information, which are encoded using the quantization accuracy information encoding means selected by the first selection means, and each of the band signals, which are output by the quantization means.

21. An encoding device according to claim 20, wherein the band separating means generates the N band signals by converting the input acoustic time-series signal into frequency components and separating a resultant spectral signal into N bands.

22. An encoding device according to claim 20, wherein at least one of the quantization accuracy information encoding means comprises:

second selection means for selecting L indexes at high frequencies from among indexes of the N pieces of quantization accuracy information;

computation means for detecting a maximum value and a minimum value of the L selected indexes and computing the difference between the maximum value and the minimum value;

encoding means for encoding each of the L normalization coefficients at high frequencies by representing, using a predetermined number of bits, a value obtained by subtracting the minimum value from each of the L selected indexes at high frequencies; and output means for outputting, when the quantization accuracy information encoding means is selected, information indicating that the L indexes are specified, the predetermined number of bits, the minimum value, indexes of (N-L) pieces of quantization accuracy information unselected by the selection means, and the L pieces of encoded quantization accuracy information.

23. An encoding device according to claim 22, further comprising:

weighting means for adding a predetermined weight value to each index of the pieces of quantization accuracy information so as to increase the correlation between the indexes of the pieces of quantization accuracy information, wherein the encoding means encodes the indexes weighted by the weighting means.

24. An encoding device according to claim 20, wherein at least one of the quantization accuracy information encoding means comprises:

differential value computing means for computing a differential value between an index of each of the pieces of quantization accuracy information and an index of another piece of quantization accuracy information that is highly correlated with the index of each of the pieces of quantization accuracy information; and encoding means for encoding the differential value, which is computed by the differential value computing means.

25. An encoding device according to claim 24, wherein the quantization accuracy information encoding means comprises:

table maintaining means for maintaining a table in which a differential value having a high frequency of occurrence of being computed by the differential value computing means is associated with a code having a small number of bits, and the encoding means encodes the differential value, which is computed by the differential value computing means, by reading, from the table, a code corresponding to the differential value.

26. An encoding device according to claim 25, wherein the table includes codes corresponding to all differential values that can be computed by the computing means.

27. An encoding device according to claim 25, wherein the table only includes a code corresponding to a differential value having a high frequency of occurrence, and for a differential value other than that with a high frequency of occurrence, the encoding means encodes the differential value by outputting an index for the differential value subsequent to a predetermined escape code.

28. An encoding device according to claim 27, wherein, for a differential value other than that with a high frequency of occurrence, the encoding means repeatedly outputs a second escape code, the number of repetitions being based on the size of the absolute value of the differential value, subsequent to a first escape code that depends on the sign of the differential value and reads, from the table, a code corresponding to a value obtained by subtracting a predetermined number based on the size of the absolute value of the differential value from the differential value to encode the differential value.

29. An encoding device according to claim 27,
wherein, when a differential value other than that with a high frequency of occurrence is within a predetermined range, the encoding means reads, from the table, a code corresponding to a value obtained by subtracting a predetermined number that depends on the sign of the differential value from the differential value and outputs the code subsequent to a first escape code, and, when the differential value other than that with a high frequency of occurrence is not within the predetermined range, the encoding means outputs an index for the differential value subsequent to a second escape code to encode the differential value.

30. An encoding device according to claim 24,
wherein quantization accuracy information in a band adjacent to a band corresponding to each of the pieces of quantization accuracy information is used as another piece of quantization accuracy information highly correlated with each of the pieces of quantization accuracy information.

31. An encoding device according to claim 24,
wherein, when all indexes of the pieces of quantization accuracy information in a band higher than a particular band indicate 0 or 1, the quantization accuracy information encoding means does not encode differential values at frequencies higher than the particular band.

32. An encoding device according to claim 24,
wherein, when the differential value between indexes of the pieces of quantization accuracy information in a band higher than a particular band is within a predetermined range, the quantization accuracy information encoding means makes the code length of each of the pieces of quantization accuracy information at frequencies higher than the particular band a predetermined value smaller than the code length of the quantization accuracy information at frequencies lower than the particular band.

33. An encoding device according to claim 24, further comprising weighting means for adding a predetermined weight value to each index of the pieces of quantization accuracy information so as to increase the correlation between the indexes of the differential values between the pieces of quantization accuracy information,
wherein the encoding means encodes the indexes weighted by the weighting means.

34. An encoding device according to claim 33,
wherein the weighting means adds a step-by-step weight that gradually increases as the band becomes higher.

35. An encoding device according to claim 24,
wherein quantization accuracy information that is temporarily adjacent to a band corresponding to each of the pieces of quantization accuracy information is used as another piece of quantization accuracy information highly correlated with each of the pieces of quantization accuracy information.

36. An encoding device according to claim 24,
wherein the acoustic time-series signal is a left signal or a right signal of a stereo audio signal, and
the differential value computing means computes the differential value between quantization accuracy information of the left signal and quantization accuracy information of the right signal.

37. An encoding method for encoding an acoustic time-series signal, comprising:
a band separating step of separating an input acoustic time-series signal into N bands and generating N band signals;
a normalization coefficient generating step of generating a predetermined normalization coefficient for each of the band signals;
a normalization step of normalizing the band signals on the basis of the generated normalization coefficients;
a quantization accuracy information generating step of generating quantization accuracy information for each of the band signals;
a quantization step of quantizing each of the normalized band signals on the basis of the quantization accuracy information;
a plurality of quantization accuracy information encoding steps of encoding the N pieces of quantization accuracy information, which are generated in the quantization accuracy information generating step;
a selection step of selecting one of the quantization accuracy information encoding steps on the basis of the amount of encoding in a case in which the N pieces of quantization accuracy information are encoded in each of the quantization accuracy information encoding steps; and
a multiplexing step of multiplexing the N pieces of quantization accuracy information, which are encoded using the quantization accuracy information encoding step selected in the selection step, and each of the band signals, which are output in the quantization step.

38. A computer-readable recording medium having a computer-readable program recorded therein, the program comprising:
a band separating step of separating an input acoustic time-series signal into N bands and generating N band signals;
a normalization coefficient generating step of generating a predetermined normalization coefficient for each of the band signals;
a normalization step of normalizing the band signals on the basis of the generated normalization coefficients;
a quantization accuracy information generating step of generating quantization accuracy information for each of the band signals;
a quantization step of quantizing each of the normalized band signals on the basis of the quantization accuracy information;
a plurality of quantization accuracy information encoding steps of encoding the N pieces of quantization accuracy information, which are generated in the quantization accuracy information generating step;
a selection step of selecting one of the quantization accuracy information encoding steps on the basis of the amount of encoding in a case in which the N pieces of quantization accuracy information are encoded in each of the quantization accuracy information encoding steps; and
a multiplexing step of multiplexing the N pieces of quantization accuracy information, which are encoded using the quantization accuracy information encoding step selected in the selection step, and each of the band signals, which are output in the quantization step.

* * * * *